US010133733B2

(12) United States Patent
Nathan et al.

(10) Patent No.: US 10,133,733 B2
(45) Date of Patent: Nov. 20, 2018

(54) SYSTEMS AND METHODS FOR AN AUTONOMOUS AVATAR DRIVER

(71) Applicant: Botanic Technologies, Inc., Emeryville, CA (US)

(72) Inventors: Paco Xander Nathan, Austin, TX (US); Cathi Joann Cox, Los Angeles, CA (US); Florian Thomas Leibert, Am Weigert (DE); Mark Stephen Meadows, Emeryville, CA (US); Jan Susan Mallis, East Ballina (AU)

(73) Assignee: BOTANIC TECHNOLOGIES, INC., Emeryville, CA (US)

( * ) Notice: Subject to any disclaimer, the term of this patent is extended or adjusted under 35 U.S.C. 154(b) by 0 days.

(21) Appl. No.: 14/536,626

(22) Filed: Nov. 9, 2014

(65) Prior Publication Data

US 2015/0066484 A1    Mar. 5, 2015

Related U.S. Application Data

(63) Continuation of application No. 11/960,507, filed on Dec. 19, 2007, now abandoned, which is a (Continued)

(51) Int. Cl.
*G06F 17/27* (2006.01)
*G06T 13/00* (2011.01)

(52) U.S. Cl.
CPC ........ *G06F 17/279* (2013.01); *G06F 17/2705* (2013.01); *G06F 17/275* (2013.01); *G06T 13/00* (2013.01)

(58) Field of Classification Search
CPC ......... G06F 17/2881; A63F 2300/1081; G10L 15/26
(Continued)

(56) References Cited

U.S. PATENT DOCUMENTS 6,233,545 B1 * 5/2001 Datig ................. G06N 3/004
704/2
6,570,555 B1    5/2003 Prevost et al.
(Continued)

OTHER PUBLICATIONS

Non-Final Office Action dated Apr. 22, 2017 for U.S. Appl. No. 11/960,507 of Nathan et al. filed Dec. 19, 2017.
(Continued)

*Primary Examiner* — Richemond Dorvil
*Assistant Examiner* — Mark Villena
(74) *Attorney, Agent, or Firm* — Perkins Coie LLP

(57) ABSTRACT

The autonomous avatar driver is useful in association with language sources. A sourcer may receive dialog from the language source. It may also, in some embodiments, receive external data from data sources. A segmentor may convert characters, represent particles and split dialog. A parser may then apply a link grammar, analyze grammatical mood, tag the dialog and prune dialog variants. A semantic engine may lookup token frames, generate semantic lexicons and semantic networks, and resolve ambiguous co-references. An analytics engine may filter common words from dialog, analyze N-grams, count lemmatized words, and analyze nodes. A pragmatics analyzer may resolve slang, generate knowledge templates, group proper nouns and estimate affect of dialog. A recommender may generate tag clouds, cluster the language sources into neighborhoods, recommend social networking to individuals and businesses, and generate contextual advertising. Lastly, a response generator may generate responses for the autonomous avatar using the analyzed dialog. The response generator may also incorporate the generated recommendations.

22 Claims, 40 Drawing Sheets

Related U.S. Application Data continuation-in-part of application No. 11/682,813, filed on Mar. 6, 2007, now abandoned.

(58) Field of Classification Search
USPC ............ 704/9, 275; 725/34; 706/17; 463/35; 345/467
See application file for complete search history.

(56) References Cited

U.S. PATENT DOCUMENTS

| | | | |
|---|---|---|---|
| 7,136,818 B1* | 11/2006 | Cosatto et al. ............... 704/275 |
| 2002/0054072 A1* | 5/2002 | Hayes-Roth ......... G06Q 10/107 715/727 |
| 2002/0198697 A1* | 12/2002 | Datig .................... G06N 3/004 704/1 |
| 2003/0028498 A1* | 2/2003 | Hayes-Roth .................... 706/17 |
| 2003/0046689 A1* | 3/2003 | Gaos .............................. 725/34 |
| 2003/0137537 A1* | 7/2003 | Guo et al. ...................... 345/751 |
| 2003/0144055 A1* | 7/2003 | Guo et al. ........................ 463/35 |
| 2003/0191627 A1* | 10/2003 | Au ..................... G06F 17/2785 704/9 |
| 2004/0075677 A1* | 4/2004 | Loyall .................... G10L 13/00 715/706 |
| 2004/0249510 A1* | 12/2004 | Hanson .................. G06F 19/00 700/245 |
| 2005/0080629 A1* | 4/2005 | Attwater et al. .............. 704/275 |
| 2006/0040718 A1* | 2/2006 | Davis ................................ 463/9 |
| 2006/0074689 A1* | 4/2006 | Cosatto ................... G06T 13/40 704/275 |
| 2006/0122834 A1 | 6/2006 | Bennett |
| 2006/0136223 A1* | 6/2006 | Brun ..................... G06F 17/289 704/277 |
| 2006/0149558 A1 | 7/2006 | Kahn et al. |
| 2006/0217963 A1* | 9/2006 | Masuichi ............ G06F 17/2836 704/7 |
| 2006/0271364 A1* | 11/2006 | Mirkovic ................ G06F 17/28 704/239 |
| 2006/0282317 A1* | 12/2006 | Rosenberg ...................... 705/14 |
| 2007/0061152 A1* | 3/2007 | Doi .......................... G10L 15/26 704/277 |
| 2007/0061352 A1* | 3/2007 | Dimitrova ......... G06F 17/30746 |
| 2007/0094007 A1* | 4/2007 | Huang ............... G06F 17/2755 704/9 |
| 2007/0288404 A1* | 12/2007 | Kacmarcik .................... 706/11 |
| 2008/0221892 A1 | 9/2008 | Nathan et al. |
| 2009/0058860 A1* | 3/2009 | Fong et al. .................. 345/467 |

OTHER PUBLICATIONS

Non-Final Office Action dated Mar. 24, 2010 for U.S. Appl. No. 11/682,813 of Nathan et al. filed Mar. 6, 2007.

U.S. Appl. No. 11/682,813 of Nathan et al. filed Mar. 6, 2007.

Novischi, A. et al., "Question Answering with Lexical Chains Propagating Verb Arguments", Proceedings of the 21st Int'l. Conference on Computational Linguistics and 44th Annual Meeting of the ACL, Jul. 2006, pp. 897-904.

\* cited by examiner

SYSTEMS AND METHODS FOR AN AUTONOMOUS AVATAR DRIVER

CROSS REFERENCE TO RELATED APPLICATIONS

This application is a continuation application of application Ser. No. 11/960,507, filed on Dec. 19, 2007, entitled "Systems and Methods for an Autonomous Avatar Driver" which is a continuation-in-part of application Ser. No. 11/682,813, filed on Mar. 6, 2007, entitled "Systems and Methods for Natural Language Processing", both of which are hereby fully incorporated by reference.

BACKGROUND OF THE INVENTION

The present invention relates to a system and method for autonomous avatar driver, and more particularly an autonomous avatar driver capable of natural language processing for improved data querying and enhanced knowledge representation for avatars, virtual healthcare advisors, virtual personal assistants and non player characters within video games, Massively Multiplayer Online Games (MMOGs), virtual worlds, online social networks, and virtual classrooms. The autonomous avatar driver may also be enabled to mine dialog for data that may then be utilized to generate recommendations to a user.

The number of active subscribers to MMOGs is at least 10 million people. Each person pays $15 and up a month to play these games, and maybe and additional 20 million people login occasionally. Estimates are that players spent about $1 billion in real money in 2005 on virtual goods and services for MMOGs combined. Moreover, at least 1.5 million people subscribe to virtual worlds. In January, 2006, inside one such virtual social world, people spent nearly $5 million in some 4.2 million transactions buying or selling clothes, buildings, and the like. Moreover, participants in web communities number in the multiple tens of millions. Additionally, traditional video games have sold over $30 billion in goods since 2000.

Many of these games and virtual environments are coming to rely on believable characters as an integral part of the story, and as video game players come to expect increasingly believable scenarios, the characters must improve as well. Integral to believable characters is their ability to comprehend conversation and exhibit a knowledge base.

Currently, knowledge representation is fatally limited by resource and financial shortcomings. Data required for knowledge representation may be incorporated into databases in particular formats to be usable for knowledge representation. Such a system is cumbersome, requiring large numbers of man-hours, often with costly specialists, and huge amounts of storage for the data. Infallibly, despite these huge expenditures, the data set created for the knowledge representation will be incomplete, leading to palpable gaps in the "knowledge" of the character.

A natural language process that is able to examine external data sources, and glean relevant data may provide far more cost efficient, complete and adaptable data sources for knowledge representation is currently lacking. For games, virtual worlds and narratives, such knowledge representation may become essential to the success of the product.

Moreover, personal avatars may likewise benefit from knowledge representation as knowledgeable personal assistants, and more fully developed player characters. The present invention allows for this level of expanded knowledge representation.

Additionally, a natural language interface may allow substantially improved searching for relevant frequently asked questions and general data queries. Such improvements have considerable implications for education, healthcare and corporate relations. Current data queries examine matches of words rather than matches of meaning Natural language processing may improve these searching methods by incorporating semantics.

Additionally, such advanced contextual search techniques may be extended to avatar dialog to generate highly targeted data mining. Such data mining may be useful for advertisement, user recommendations and statistical data farming.

It is therefore apparent that an urgent need exists for a system and method for an automated avatar driver with contextual recommendation ability. This system would be able to provide highly believable virtual personalities for personal and corporate use.

SUMMARY OF THE INVENTION

To achieve the foregoing and in accordance with the present invention, systems and methods for an autonomous avatar driver are provided. Such systems and methods are useful for providing a highly believable virtual avatar, or character, with interactive ability and knowledge representation and recommendation ability.

The autonomous avatar driver is useful in association with language sources. A sourcer may receive dialog from the language source. It may also, in some embodiments, receive external data from data sources.

A segmentor may segment the dialog. The segmentor may include a particle representor, a character converter and a splitter for splitting dialog. A parser may then parse the segmented dialog. The parser may include a linker for linking grammar, a grammatical mood analyzer, a tagger for tagging the dialog and a variant pruner.

After parsing the dialog a semantic engine may analyze the parsed dialog for semantics. The semantics engine may include a token framer, a lemmatizer configured to draw from semantic lexicons, a semantic network generator and a co-reference resolver for resolving co-reference ambiguity.

An analytics engine may then analyze the semantically analyzed dialog for analytics. The analytics engine may include a common word filter, a token frame statistics engine, and an N-gram analyzer configured to analyze N-grams for word popularity. The token frame statistics engine may count lemmatized words, and perform nodal analysis.

Then a pragmatics analyzer may analyze the analytically analyzed dialog for pragmatics. The pragmatics analyzer may include a slang resolver, a knowledge template resolver configured to generate knowledge templates, a proper noun grouper and an affect estimator configured to estimate emotion of the dialog.

A recommender may then generate recommendations from the pragmatically analyzed dialog. The recommender may include a cloud aggregator for generating aggregate tag clouds, a hood cluster or for clustering the end users into neighborhoods based upon dialog parsed from them, a social network recommender for recommending social networking to individuals and businesses, and a contextual advertising generator.

Lastly, a response generator may generate responses for the autonomous avatar using the pragmatically analyzed dialog. The response generator may also incorporate the generated recommendations from the recommender.

Currently "automated" avatars are limited to closed systems of limited referencing data. Moreover, there has been little to no extension of natural language processing into virtual environments for enhanced data retrieval or "intelligent" avatars and virtual personalities. Thus, traditional "automated" avatars are highly limited to narrow contextual situations. These traditional avatars are not believable and limited in functionality. The present invention discloses systems and methods for expanding avatar functionality, utility and believability.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, one embodiments will now be described, by way of example, with reference to the accompanying drawings, in which.

DETAILED DESCRIPTION OF THE INVENTION

I. Overview of Autonomous Avatar Driver

Figure 1A:
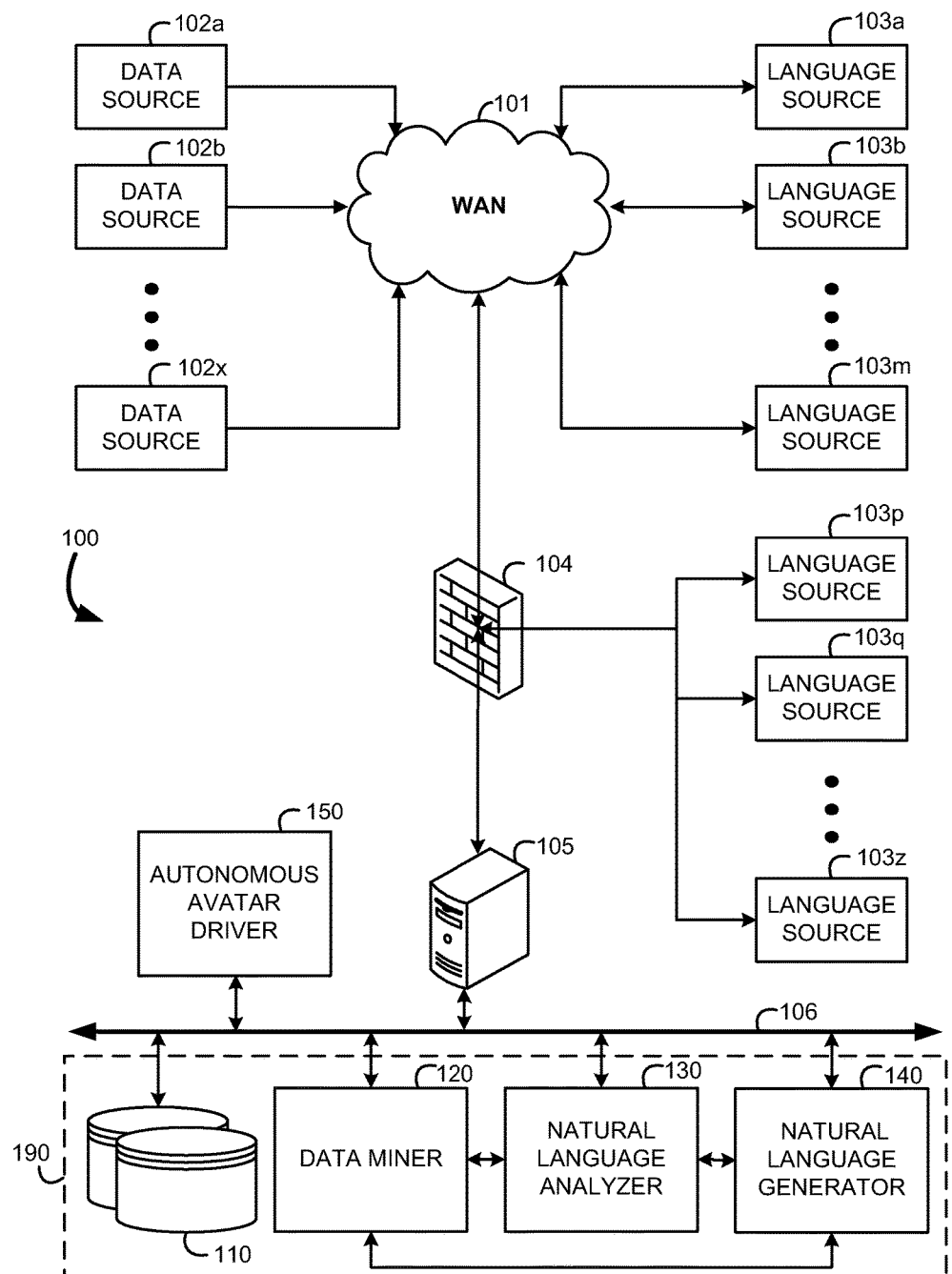
FIG. 1A shows a schematic block diagram illustrating an autonomous avatar driver with a natural language processor system with knowledge representation in accordance with some embodiments of the present invention.

The present invention will now be described in detail with reference to several embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. The features and advantages of the present invention may be better understood with reference to the drawings and discussions that follow.

The present invention relates to systems and methods for autonomous avatar driver that provides for enhanced functionality, utility and believability for avatars, and recommendation ability. Such autonomous avatar drivers are useful for generating believable avatars in conjunction with Massively Multiplayer Online Games (MMOGs), virtual social worlds, online web communities, corporate web sites, health care and educational programs and websites. Believability of the avatars is due to their ability to respond to language, also referred to as dialogue, also known in the art as "natural language", in a spontaneous manner, and their ability to provide an extensive knowledge base, referred to as knowledge representation. Moreover, such natural language processors allow for semantic searches, searches that query not only the words provided but the meaning, thereby making the search more efficient, intuitive and useful.

As known to those skilled in the art, an avatar is a virtual representation of an individual within a virtual environment. Avatars often include physical characteristics, statistical attributes, inventories, social relations, emotional representations, and weblogs (blogs) or other recorded historical data. Avatars may be human in appearance, but are not limited to any appearance constraints. Avatars may be personifications of a real world individual, such as a Player Character (PC) within a MMOG, or may be an artificial personality, such as a Non-Player Character (NPC). Additional artificial personality type avatars include personal assistants, guides, educators, answering servers and information providers. Additionally, some avatars may have the ability to be automated some of the time, and controlled by a human at other times. Such Quasi-Player Characters (QPCs) may perform mundane tasks automatically, but more expensive human agents take over in cases of complex problems.

The avatar driven by the autonomous avatar driver is generically defined. The avatar may be a character, non-player character, quasi-player character, agent, personal assistant, personality, guide, representation, educator or any additional virtual entity within virtual environments. Avatars may be as complex as a 3D rendered graphical embodiment that includes detailed facial and body expressions, or may be as simple as a faceless, non-graphical widget, capable of limited, or no function beyond the natural language processor. In a society of ever increasing reliance and blending between real life and our virtual lives, the ability to have believable and useful avatars is highly desirable and advantageous.

To facilitate discussion, FIG. 1A shows a schematic block diagram illustrating an Autonomous Avatar Driver System 100 with knowledge representation in accordance with some embodiments of the present invention.

Central to the Autonomous Avatar Driver System 100 is the Autonomous Avatar Driver 150. The Autonomous Avatar Driver 150 and Natural Language Processor 190 are seen coupled to a Local Area Network (LAN) 106 in a network operations center (NOC). Alternatively, in some embodiments the Natural Language Processor 190 and/or Autonomous Avatar Driver 150 may be located at Language Sources 103a to 103m. Moreover, the Autonomous Avatar Driver 150 and/or Natural Language Processor 190 may be located at hosting systems. Host systems may include corporate servers, game systems, MMOG's, websites or other virtual environments. The Language Sources 103a, 103b to 103m may be connected to the LAN 106 through a Wide Area Network (WAN) 101. The most common WAN 101 is the internet; however any WAN, such as a closed gamming network, is intended to be considered as within the scope of the WAN 101. In some embodiments, Language Sources 103p, 103q to 103z may couple directly to the LAN 106. Language Sources 103a to 103z provide language to the Natural Language Processor 190 for processing. Language may be in the form of text, or in some embodiments may include audio files and graphical representations, including facial features and body language. The Natural Language Processor 190 includes a Natural Language Analyzer 130, Data Miner 120, Databases 110 and Natural Language Generator 140.

A Firewall 104 separates the WAN 101 and Language Sources 103p, 103q to 103z from the LAN 106. The Firewall 104 is coupled to a Server 105, which acts as an intermediary between the Firewall 104 and the LAN 106.

Data Sources 102a, 102b to 102x may be coupled to the WAN 101 for access by the Autonomous Avatar Driver 150 and/or Natural Language Processor 190. Data Sources 102a to 102x provide external data for use by the Autonomous Avatar Driver 150 and/or Natural Language Processor 190 for the knowledge representation. Additionally, Databases 110 may be coupled to the LAN 106 with for storing frequently utilized data, and for dialogue storage. Together, Data Sources 102a to 102x and the Databases 110 provide the statistical information and data required for accurate language processing and knowledge representation. The Databases 110 may include, but are not limited to four child databases. These databases include a dictionary, wordnet, part-of-speech tags (or speech tags), and conversation history. These Databases 110 provide the resources necessary for basic natural language processing with a persistent conversation memory. Additional databases may be included as is desired, since it is the intention of the invention to be amorphic and adaptable as technology and resources become available.

The Autonomous Avatar Driver 150 as disclosed may be coupled to the Natural Language Analyzer 130, Data Miner 120 and Natural Language Generator 140. In some embodiments, the Autonomous Avatar Driver 150 may utilize these components to drive the avatar. In some alternate embodiments, the Autonomous Avatar Driver 150 may include alternate components that are capable of language analysis and response.

The Natural Language Analyzer 130 may be coupled to a Data Miner 120 and Natural Language Generator 140. The Natural Language Analyzer 130, as will be seen, generates a wealth of data regarding conversations including the meaning, moods and responses to the language, or dialogue. Such data may be extremely valuable for the generation of highly targeted advertising, statistical information, marketing data, sociological research data, political barometer, and many other areas of interest. The Data Miner 120 allows for the searching and congregation of said content-dense data for these purposes.

The Natural Language Generator 140 is capable of receiving semantics, in the form of lexical chains, grammatical moods and represented knowledge, to generate an appropriate response. In some embodiments, the Natural Language Generator 140 returns text. In alternate embodiments the Natural Language Generator 140 may return a response in the native form of the Language Source 103*a* to 103*z*. Thus, in some embodiments voice synthesizer capabilities may be included in the Natural Language Generator 140. In some embodiments, it is advantageous to include a system within the Natural Language Generator 140 that is capable of identifying taboo or undesired language and prevent such language from being part of responses. This feature is very important when dealing with children, or other individuals sensitive to particular conversations. Additionally, the Natural Language Generator 140 may, in some embodiments, be designed to incorporate personalized product placement for advertising purposes when relevant to the conversation. In fact, in some embodiments, the Natural Language Generator 140 may be designed to steer conversations toward product placement, political views, etc. In such a way, avatars incorporating such a Natural Language Processor 190 may become highly specialized and sophisticated advertising media.

Additionally, in some embodiments, the Natural Language Generator 140 may include an accompanying graphical generator. Said graphical generator may provide graphical representations, movements, facial features, stance, gestures or other visual stimulus appropriate to the generated language. Such a system may be desirable for very personalized interaction; however, such a system requires large computations and bandwidth to be practical for multiple avatars. As such, said system for graphical generation is best utilized when the Autonomous Avatar Driver System 100 is hosted on an individual's system in order to run a personal avatar, or on a corporate server for the corporate avatar.

Alternatively, in some embodiments, the graphical generator may output a set of mood indicators that may then be utilized by the avatar host to generate movements that correspond to the given mood of the language. For example a series of predetermined mood categories may be assigned, and each mood category includes a numerical tag. The host system may have postures, facial features and physical movements corresponding to each of the mood categories. The graphical generator outputs the numerical mood tag, and the host system is then able to produce a range of graphics appropriate to the language. Such a system minimizes computations required by the graphical generator and minimizes required bandwidth. Moreover, in some embodiments, the graphical generator may provide a series of graphical indicators to more finely tune graphical representations. For instance the graphical generator may output a first variable relating to the general mood, and subsequent variables, each more finely tuning the graphical representations. The advantage of such a system is that the complexity of host graphical representations may vary greatly in their level of detail and range of emotional states. As such, the host system may utilize outputs, and ignore subsequent tuning variables as they become ineffectual within said host system. The advantage of such a system is the ability of a standard output by the graphical generator, yet having each host system receiving the level of graphical detail desired.

II. Natural Language Processor System and Method

Figure 1B:
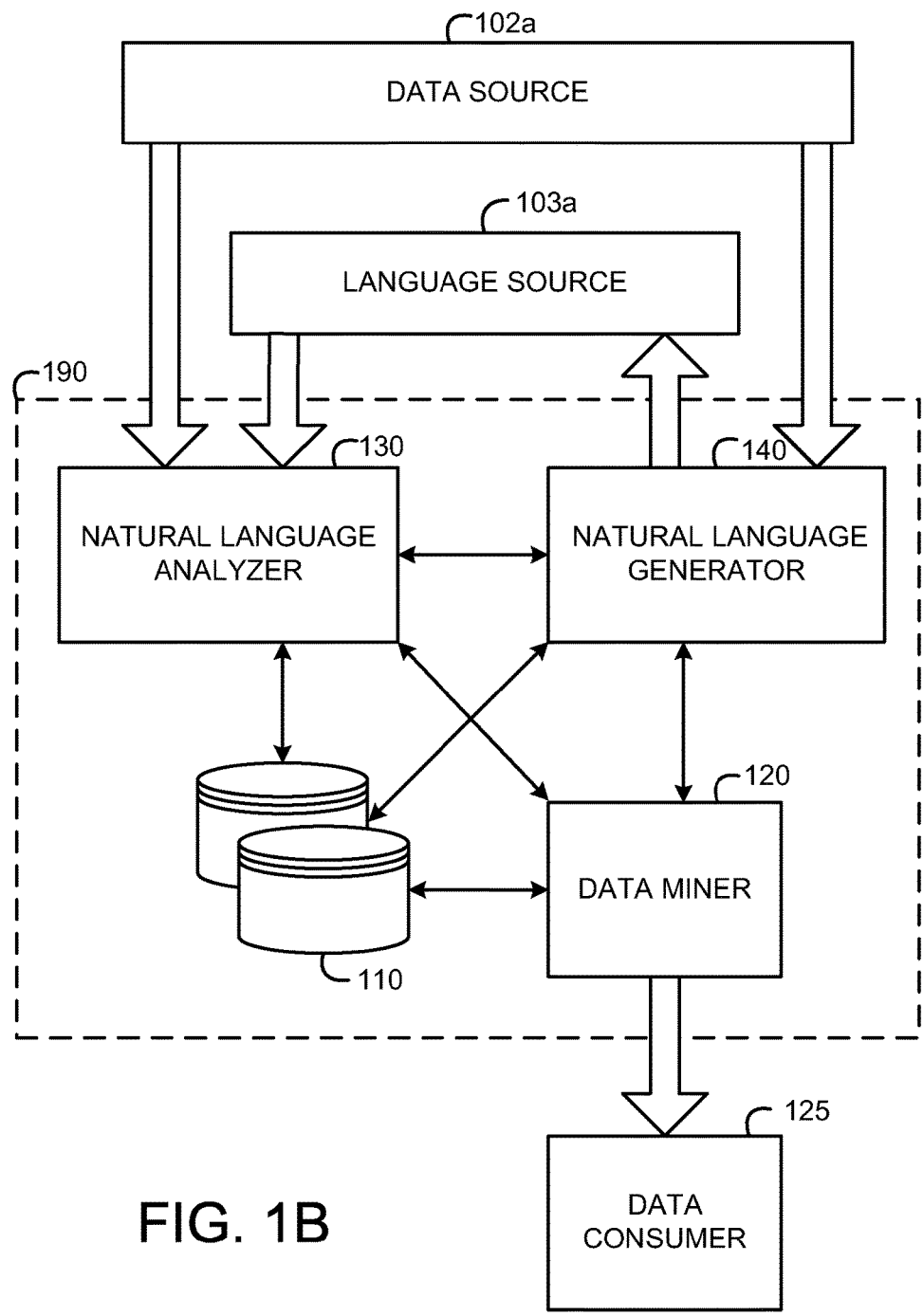
FIG. 1B shows an exemplary functional block diagram of the natural language processor in accordance with some embodiments of the present invention.

FIG. 1B shows an exemplary functional block diagram of the Natural Language Processor 190 as involved in the Autonomous Avatar Driver System 100 of FIG. 1. Exemplary Language Source 130*a* may be seen providing language to the Natural Language Processor 190. The language is received by the Natural Language Analyzer 130, which analyzes the language for semantics. The Natural Language Analyzer 130 is coupled to the Natural Language Generator 140, the Databases 110 and the Data Miner 120. Moreover, the exemplary Data Source 102*a* provides data to the Natural Language Analyzer 130. The Natural Language Analyzer 130 may utilize the Databases 110 for analyzing the language semantics. Additionally, the Natural Language Analyzer 130 may provide semantic information from the analyzed language to the Data Miner 120 and the Natural Language Generator 140.

The Natural Language Generator 140 is coupled to the Natural Language Analyzer 130, the Databases 110 and the Data Miner 120. Moreover, the exemplary Data Source 102*a* provides data to the Natural Language Generator 140. The Natural Language Generator 140 may utilize the Databases 110 for generating return language. Additionally, the Natural Language Generator 140 may provide semantic information from the generated language to the Data Miner 120. The generated language may be provided to the exemplary Language Source 130*a*. In this way, the Natural Language Processor 190 is capable of semantically relevant conversation, with knowledge representation.

The Data Miner 120, aside from gaining semantic information from the Natural Language Generator 140 and Natural Language Analyzer 130 may query the Databases 110 in some embodiments. The Data Miner 120 is capable of providing the mined data to Data Consumers 125. Such Data Consumers 125 include research groups, advertisers, educators, marketing analysts, political analysts, quality control analysts, and opinion based review groups, among many others. Such Data Consumers 125 may provide an important source of revenue in some embodiments, as well as providing service data for the end users.

Figure 2:
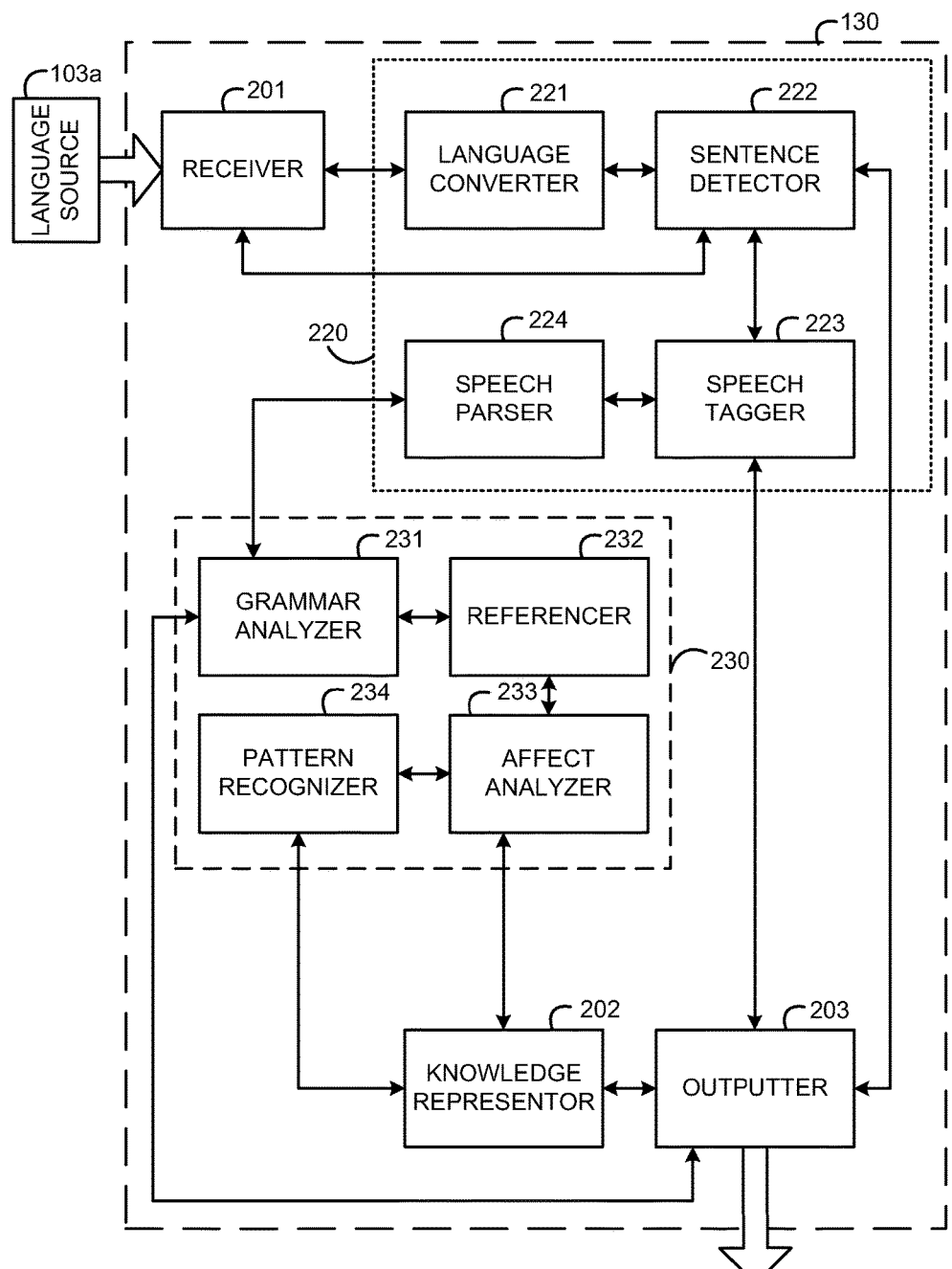
FIG. 2 shows an exemplary functional block diagram of the natural language analyzer of FIG. 1.

FIG. 2 shows a functional block diagram of the Natural Language Analyzer 130 of FIG. 1. Within natural language processing there are terms well known to those skilled in the art that are worth a cursory definition. A 'lemma' is a set of lexical forms with the same stem, the same part-of-speech and the same word-sense. A 'lexeme' is a pairing of a particular orthographic form with a symbolic meaning representation. Moreover, a finite list of lexemes is referred to as a 'lexicon'. Lastly, 'types' refers to the total number of distinct words in a corpus.

A Receiver 201 receives the Language from the Language Source 103a to 103z from over the network. The Receiver 201 may also identify the format of the language. In some embodiments the Receiver 201 may include a spelling checker; however, as it will be seen, improper grammar, slang and typos are anticipated and dealt with by the Natural Language Analyzer 130. The Receiver 201 is coupled to the Language Preparer 220 which includes the Language Converter 221, Sentence Detector 222, Part-of-Speech Tagger (or Speech Tagger) 223 and Speech Parser (or Parser) 224. The Receiver 201 couples directly with the Language Converter 221 and the Sentence Detector 222. When the received dialogue, or language, is in a native format compatible with the Natural Language Analyzer 130 the Receiver 201 may provide the language directly to the Sentence Detector 222. In some embodiments the native language for the Natural Language Analyzer 130 includes text files. Alternatively, if the corpus is in a nonnative format, such as a rich text, audio file or graphical file, the dialog is first analyzed by the Language Converter 221. In some embodiments, the Language Converter 221 may receive a plurality of language formats and convert them to a text format. In said Language Converter 221, voice recognition software may be required. Additionally, in some embodiments the Language Converter 221 may include image recognition in order to interpret body language, sign language and facial features for conversion into the native language for the Natural Language Analyzer 130. After nonnative language is analyzed by the Language Converter 221 the text equivalent of the language is processed by the Sentence Detector 222.

It should be mentioned that the instant invention is designed to be able to analyze, mine and generate in a variety of languages. The base architecture of the Autonomous Avatar Driver System 100 is nearly identical regardless of whether the Language Sources 103a to 103z are in English, German or Japanese, to name a few applicable languages. The instant invention utilizes statistical learning, dictionaries and grammatical rules; as such, as long as the appropriate training corpuses are available the system may be utilized across a variety of languages.

In some embodiments a translation matrix may be utilized in order to provide semantic consistency, and when it is desirous for the input language format to differ from the output language format. Such a translation matrix may exist on the front end, translating the incoming language. Alternatively, in some embodiments, said translation matrix may exist after the Natural Language Analyzer 130 in order to translate the semantic meaning of the received language. Alternatively, in some embodiments, said translation matrix may exist before the Natural Language Generator 140, thereby enabling all analysis to be performed within the native language format, and only language generation is performed in the output language format. Alternatively, in some embodiments, said translation matrix may exist after the Natural Language Generator 140, thereby enabling all natural language processing to be performed within the native language format, and only language output is in the output language format. Moreover, a combination of translation matrices may be utilized in some embodiments.

The Sentence Detector 222 is coupled with the Language Converter 221 and the Part-of-Speech Tagger (or Speech Tagger) 223. The Sentence Detector 222 utilizes algorithms to determine separate sentences. The sentences are made up of elements, which include words and symbols. The Speech Tagger 223 first cleans up the raw text by tokenizing it. Tokenization includes replacing certain elements with tokens. The tokens delineate meanings of the elements that they replace. Additionally, tokenization ensures that special characters are separated from the words in the sentence so that the elements may be parsed easier.

The Speech Tagger 223 then annotates each element with a tag that classifies the element with pre-defined categories. The Speech Tagger 223 is usually trained with a training set of data since it relies upon statistics in order to determine the meaning of ambiguous words. There are different standards for Part-of-Speech tags; however, in some embodiments the Penn Treebank structure is utilized. Table 1 shows the tags of the Penn Treebank

TABLE 1

Part-of-Speech Tags

| # | Tag | Part-of-Speech |
|---|---|---|
| 1. | CC | Coordinating conjunction |
| 2. | CD | Cardinal number |
| 3. | DT | Determiner |
| 4. | EX | Existential there |
| 5. | FW | Foreign word |
| 6. | IN | Preposition, subordinating conjunction |
| 7. | JJ | Adjective |
| 8. | JJR | Adjective, comparative |
| 9. | JJS | Adjective, superlative |
| 10. | LS | List item marker |
| 11. | MD | Modal |
| 12. | NN | Noun, singular or mass |
| 13. | NNS | Noun, plural |
| 14. | NP | Proper noun, singular |
| 15. | NPS | Proper noun, plural |
| 16. | PDT | Predeterminer |
| 17. | POS | Possessive ending |
| 18. | PP | Personal pronoun |
| 19 | PP$ | Possessive pronoun |
| 20. | RB | Adverb |
| 21. | RBR | Adverb, comparative |
| 22. | RBS | Adverb, superlative |
| 23. | RP | Particle |
| 24. | SYM | Symbol |
| 25. | TO | to |
| 26. | UH | Interjection |
| 27. | VB | Verb, base form |
| 28. | VBD | Verb, past tense |
| 29. | VBG | Verb, gerund or present participle |
| 30. | VBN | Verb, past participle |
| 31. | VBP | Verb, non-3rd person singular present |
| 32. | VBZ | Verb, 3rd person singular present |
| 33. | WDT | Wh-determiner |
| 34. | WP | Wh-pronoun |
| 35. | WP$ | Possessive wh-pronoun |
| 36. | WRB | Wh-adverb |

The Speech Tagger 223 may output the tagged sentence via the Outputter 203, or may continue through the Speech Parser 224, which is coupled to the Speech Tagger 223. Speech Parser 224 chunks, or parses, the sentences into discrete, non-overlapping grammatical chunks. Each chunk is a partial structure of the sentence. Chunking is important for downstream semantic analysis and pattern recognition. After Chunking is performed, the chunks are annotated for property based searching and improved information extraction. Examples of chunking rules utilized by the Speech Parser 224 are illustrated below in Table 2:

TABLE 2

Chunk Types by Annotation

| Annotation | Chunk Type Definition |
| --- | --- |
| S | Sentence |
| NP | Noun Phrase |
| VP | Verb Phrase |
| PP | Prepositional Phrase |
| AP | Adjective Phrase |
| S | NP + VP |
| VP | Verb |
| VP | Verb + NP |
| VP | Verb + NP + PP |
| VP | Verb + PP |
| PP | Preposition + NP |
| NP | Pronoun/Proper Noun/Det Nominal |
| NP | (Det) (Card) (Ord) (Quant) (AP) Nominal |
| Nominal | Noun Nominal/Noun/Nominal PP (PP) (PP) |
| Nominal | Nominal GerundVP |
| GerundVP | GerundV + NP/GerundV + PP/Gerund + Verb/Gerund + Verb + NP + PP |

The Speech Parser 224 may output the chunked sentence via the Outputter 203 or may continue through the Semantic Analyzer 230, which is coupled to the Speech Parser 224. The Semantic Analyzer 230 includes a Grammar Analyzer 231, a Referencer 232, an Affect Analyzer 233 and a Pattern Recognizer 234. The Grammar Analyzer 231 is coupled to the Speech Parser 224, the Referencer 232 and the Outputter 203. Grammar Analyzer 231 determines the grammatical mood of the sentence. Examples of grammatical moods assigned by the Grammar Analyzer 231 are illustrated below in Table 3:

TABLE 3

Grammatical Moods

| Grammatical Mood | Definition |
| --- | --- |
| Declarative structure | NP + VP |
| Imperative structure | VP |
| Interrogative structure (yes/no) | Aux NP + VP |
| Interrogative structure (who/what/where/when/why) | Wh-NP + VP/Wh-NP + Aux NP + VP |

In some embodiments, additional definitions of grammatical moods may be utilized by the Grammar Analyzer 231; however in some other embodiments the grammatical moods illustrated in Table 3 are sufficient, and any dialogue that does not fit into one of the previous definitions may be assumed to be a declarative grammatical mood. Such an assumption generally proves computationally effective, as well as accurate enough for most circumstances.

Of course, in some embodiments the Grammar Analyzer 231 may utilize a statistical engine, which may incorporate training, in order to statistically determine the grammatical mood, as apposed to a rule based engine as described above. Alternatively, a hybrid rule and statistical engine may be utilized, wherein the rules are utilized for simple sentence structures, but learned statistical methods may be utilized for more complicated or less determinable sentences. Such a system may be of particular use when slang is highly prevalent within the language. The advantages of such a system include the incorporation of learning, or statistical tuning, in order to improve accuracy.

The Grammar Analyzer 231 is also coupled to the Outputter 203, such as to output the grammatical mood of the sentence. Grammatical moods may result in prioritization of discourse; for example imperative structured sentences may require an action or trigger an event.

The Referencer 232 may reference dictionaries and thesauruses in order to reference the elements of the sentence for semantics. Additionally, in some embodiments, the Referencer 232 may cross reference graphical cues, such as gestures, with language pronouns in order to delineate the meaning of ambiguous pronouns. The Referencer 232 is then coupled to the Affect Analyzer 233.

The Affect Analyzer 233 utilizes the results of the Referencer 232 and the grammatical mood from the Grammar Analyzer 231 in order to infer the affect of the sentence. Graphical recognition may be of particular use by the Affect Analyzer 233 to infer the language affect. Additionally, in some embodiments, tactic responses may be utilized to analyze affect. Tactic responses, as is known to those skilled in the art, includes the usage of information, such as the rate of typing, change in voice pitch, thermal readings of skin, electrical conductivity of skin, etc. in order to help infer the users' emotional state for the purposes of affect analysis. Such tactic response devices may be as simple as analyzing the rhythm of typing, or may include external peripheral devices worn by the users. The Affect Analyzer 233 may provide cues as to the appropriate disposition of return language to the Natural Language Generator 140. Results from the Affect Analyzer 233 may proceed directly to the Knowledge Representor 202 or may proceed through the Pattern Recognizer 234.

Pattern Recognizer 234 utilizes statistics, through a statistical engine, to determine meaning of the language. As such, the Pattern Recognizer 234 may be trained. In some embodiments it may be advantageous to train the Pattern Recognizer 234 within the environment that it will function, in order to incorporate the slang of that environment. Within the gamming community entire dialects of speech have developed, often differing between game to game, and even separate factions within single games. It would be advantageous to have the Natural Language Analyzer 130 enabled to process slang, and the Natural Language Generator 140 configured to use said slang, in order to enhance the believability of the avatar. Additionally, it is important to note that these dialects and slang language adapt rapidly, therefore a constant training of the Pattern Recognizer 234 may be beneficial. The Pattern Recognizer 234 may generate a lexical chain in order to convey the meaning of the language dialogue. Lexical chains, well known to those skilled in the art, are strings of words designed to convey meanings of bodies of text, and are designed to eliminate incongruities and ambiguities. The lexical chains generated by the Pattern Recognizer 234 may be processed through the Knowledge Representor 202.

The Knowledge Representor 202 utilizes knowledge templates in order to query Data Sources 102a to 102x and Databases 110 in order to provide a more enriching and believable conversation with the avatar. The Databases 110 may include previous conversation logs, providing a level of personal 'memory' for the avatar. In this way, previous conversations and happenings may be 'recalled' by the avatar. Moreover, external Data Sources 102a to 102x may provide a vast wealth of information about virtually any topic, upon which the avatar may draw from in order to effectuate a believable dialogue. Data Sources 102a to 102x may include reference sources such a Wikipedia® and IMDb®. Due to the relatively standardized formatting of such Data Sources 102a to 102x, knowledge templates may be uniquely designed to access a particular Data Sources 102a to 102x. However, once the knowledge template for any Data Sources 102a to 102x is generated, any topic contained within the Data Sources 102a to 102x may be analyzed by the knowledge template to provide meaningful information for the Knowledge Representor 202 of the Natural Language Analyzer 130. The results of the Knowledge Representor 202 may be sent to the Outputter 203 for downstream applications.

Figure 3:
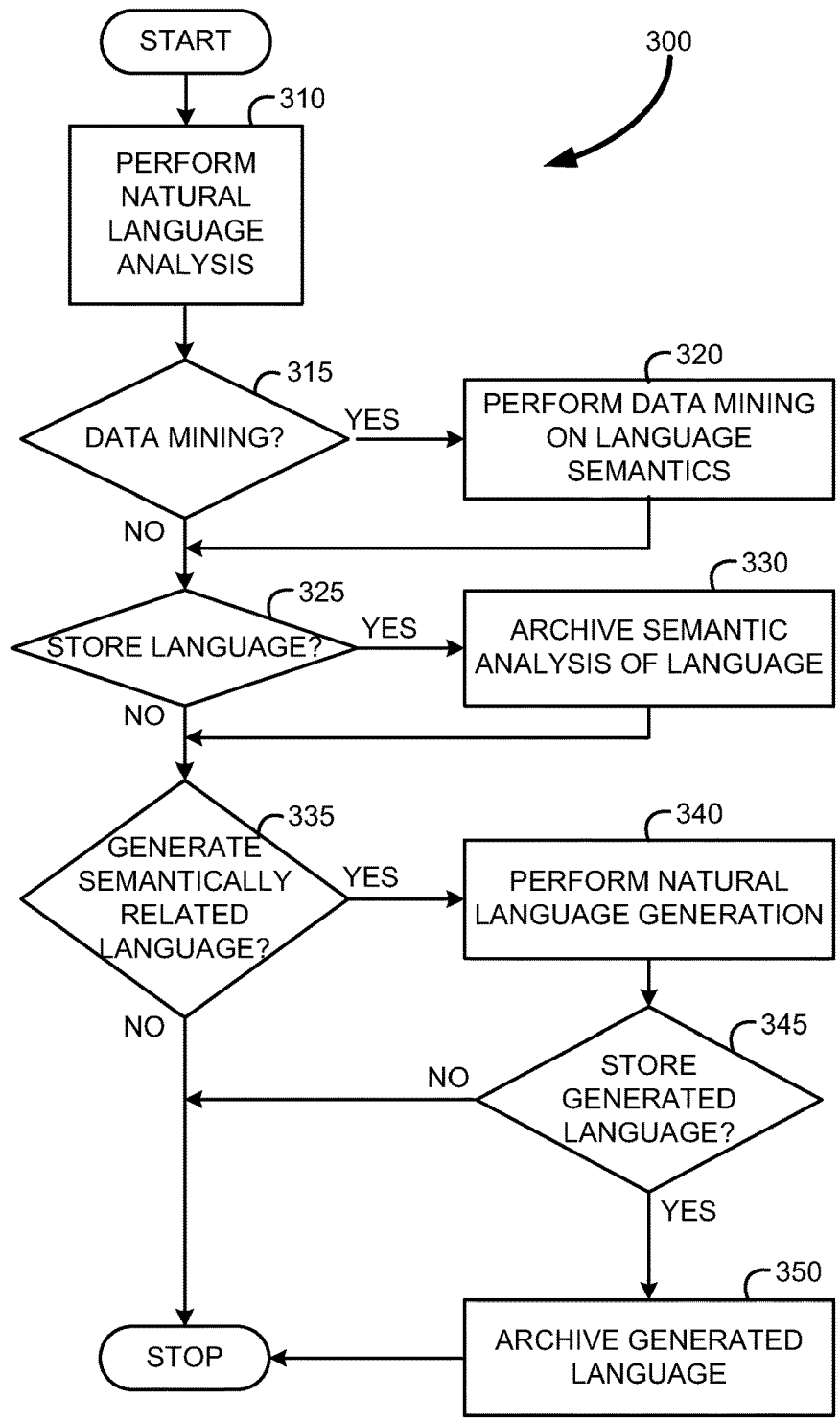
FIG. 3 shows a flow chart illustrating the natural language processing for the natural language processor system of FIG. 1.

FIG. 3 shows a flow chart illustrating the natural language processing shown generally at 300. In step 310 the language received from the Language Source 103a to 103z is analyzed for knowledge representation and semantics by the Natural Language Analyzer 130. Then, in step 315, a decision is made whether to perform data mining on the analyzed language. If data mining is desired, then the semantics of the analyzed language are mined for the pertinent data, at step 320. Such data may then be stored for future uses or supplied to the Data Consumers 125. The process then proceeds to step 325, where a decision is made whether to store the results of the natural language analysis.

Otherwise, if at step 315, data mining is not desired, the process proceeds directly to step 325, where a decision is made whether to store the results of the natural language analysis. If it is decided to store the natural language analysis at step 325, then the semantics may be stored, or archived, within the Databases 110 at step 330. Stored analyzed language may be subsequently data mined. Also, in some embodiments, the stored analyzed language may be retrieved in future interactions, providing an avatar with a 'memory' of previous conversations, and thus resulting in enhanced believability of the avatar. Also, the stored analyzed language may be subsequently cross referenced in order to provide semantics for future ambiguities. For example, the use of ambiguous pronouns in future language may rely upon the previous language semantics in order to resolve said ambiguity. Often these stored semantics may be annotated with the time, location, identity of Language Source 103a to 103z and any additional relevant information. In some embodiments, the entire corpus of the received language may be linked to the semantic analysis results. In such a way, a subsequent search may be performed on semantics, and the relevant conversations may be received. The process then proceeds to step 335, where a decision is made whether to generate semantically related return language.

Otherwise, if at step 325, storing the results of the natural language analysis is not desired, the process proceeds directly to step 335, where a decision is made whether to generate semantically related return language. If generating semantically related return language is desired, the Natural Language Generator 140 may generate language, at step 340, that utilizes the semantics and knowledge representation from the Natural Language Analyzer 130, from step 310, along with cross referenced information from the Databases 110. Said generated semantically related language may then be output to the Language Source 103a to 103z. In this manner return dialogue may be provided, enabling believable conversation.

The process then proceeds to step 345, where a decision is made whether to store the generated semantically related language. If storing the generated language is desired, the generated language may be stored, or archived, in the Databases 110 at step 350. Similarly to the analyzed language, stored generated language may be utilized for subsequent data mining and cross referencing. After storage of the generated language, the process ends.

Else, if at step 345, storing the generated language is not required, then the process ends.

Else, if at step 335, generating semantically related language is not desired, the process ends.

Figure 4:
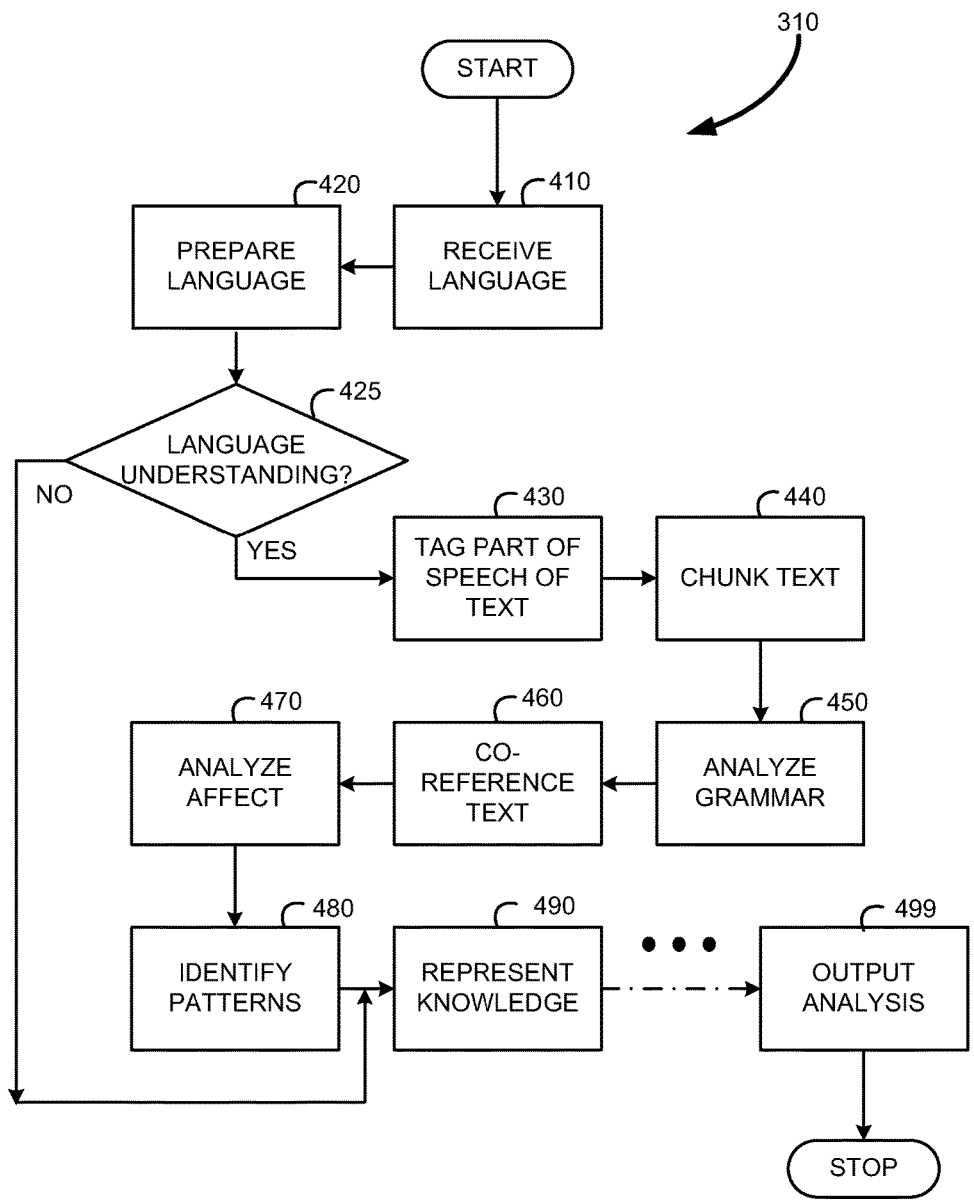
FIG. 4 shows a flow chart illustrating the process for processing language for knowledge representation and semantics for the natural language processor system of FIG. 1.

FIG. 4 shows a flow chart illustrating the process for analyzing language for knowledge representation and semantics shown generally at 310. In step 410 the language is received. Then, at step 420, the language is prepared. Preparation includes conversion, sentence identification and tokenization. At step 425 a decision is made whether the received language will be understood for semantics, or simply analyzed for knowledge representation.

If semantic understanding is desired, the language is tagged at step 430. In some embodiment, Part-of-Speech tagging occurs according to Table 1. The part-of-speech tags database is utilized for tagging. At step 440 the text is chunked, or parsed, into the non-overlapping substructures of the sentence. At step 450, each sentence in the language is analyzed for grammatical mood. At step 460, the text is referenced across dictionaries, WordNet, and any applicable reference corpus. Then, at step 470, the affect of the text is analyzed. Semantics are determined at step 480 by utilizing statistical pattern recognition. Then knowledge representation is performed at step 490. In FIG. 4, additional language analyses may occur after step 490, and before outputting in step 499. The illustration is intended to reflect this adaptability of language analysis. The result of the natural language analysis is then output at step 499.

Else, if semantic understanding is not required at step 425, then knowledge representation is performed at step 490. In FIG. 4, additional language analyses may occur after step 490, and before outputting in step 499. The illustration is intended to reflect this adaptability of language analysis. The result of the natural language analysis is then output at step 499.

At this point, it should be noted that the Natural Language Processor 190, and methods thereof, disclosed within this application are very modular in nature. Where some embodiments including all of the stated components and steps are discussed, additional embodiments may exist that do not include all of the disclosed components and method steps. Similarly, the components and steps for the Natural Language Processor 190 listed are not intended to be an exhaustive list, as additional refinements become feasible and necessary.

Figure 5:
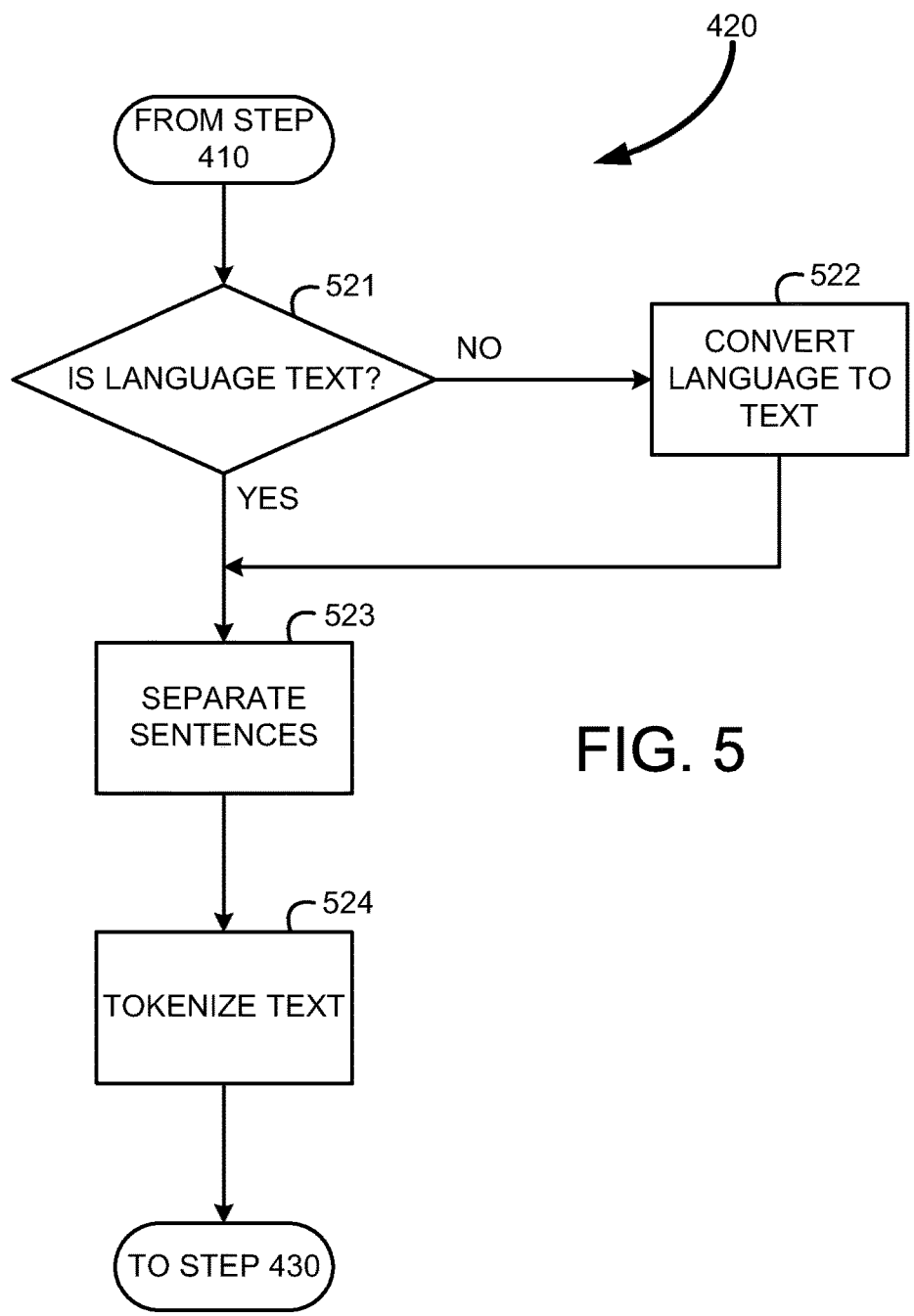
FIG. 5 shows a flow chart illustrating the process for preparing language for the natural language processor system of FIG. 1.

FIG. 5 shows a flow chart illustrating the process for preparing language shown generally at 420. The beginning of this process is from step 410, of FIG. 4. At step 521, an inquiry is made as to if the language is in a text format. If the language is in an acceptable text format, the text sentences are separated, at step 523. Then, at step 524, the text is tokenized, wherein any special characters are removed and replaced with meaningful tokens. Tokenization cleans the text for downstream processing. Then the process ends by returning to step 430, of FIG. 4.

Else, if the language is not in an acceptable text format, at step 521, the language is converted into an acceptable text format at step 522. Text-to-text format conversions are relatively rapid and straightforward; however, it is intended in some embodiments of the invention, to also receive audio or waveform files and utilize speech recognition software in order to convert the language into text. Moreover, in some embodiments of the invention graphical input is intended to be received, such as sign language, body language and facial expressions. As such, a image recognition system may be utilized to convert graphical information into text for semantic analysis. The text sentences are then separated, at step 523. Then, at step 524, the text is tokenized, wherein any special characters are removed and replaced with meaningful tokens. Then the process ends by returning to step 430, of FIG. 4.

Figure 6:
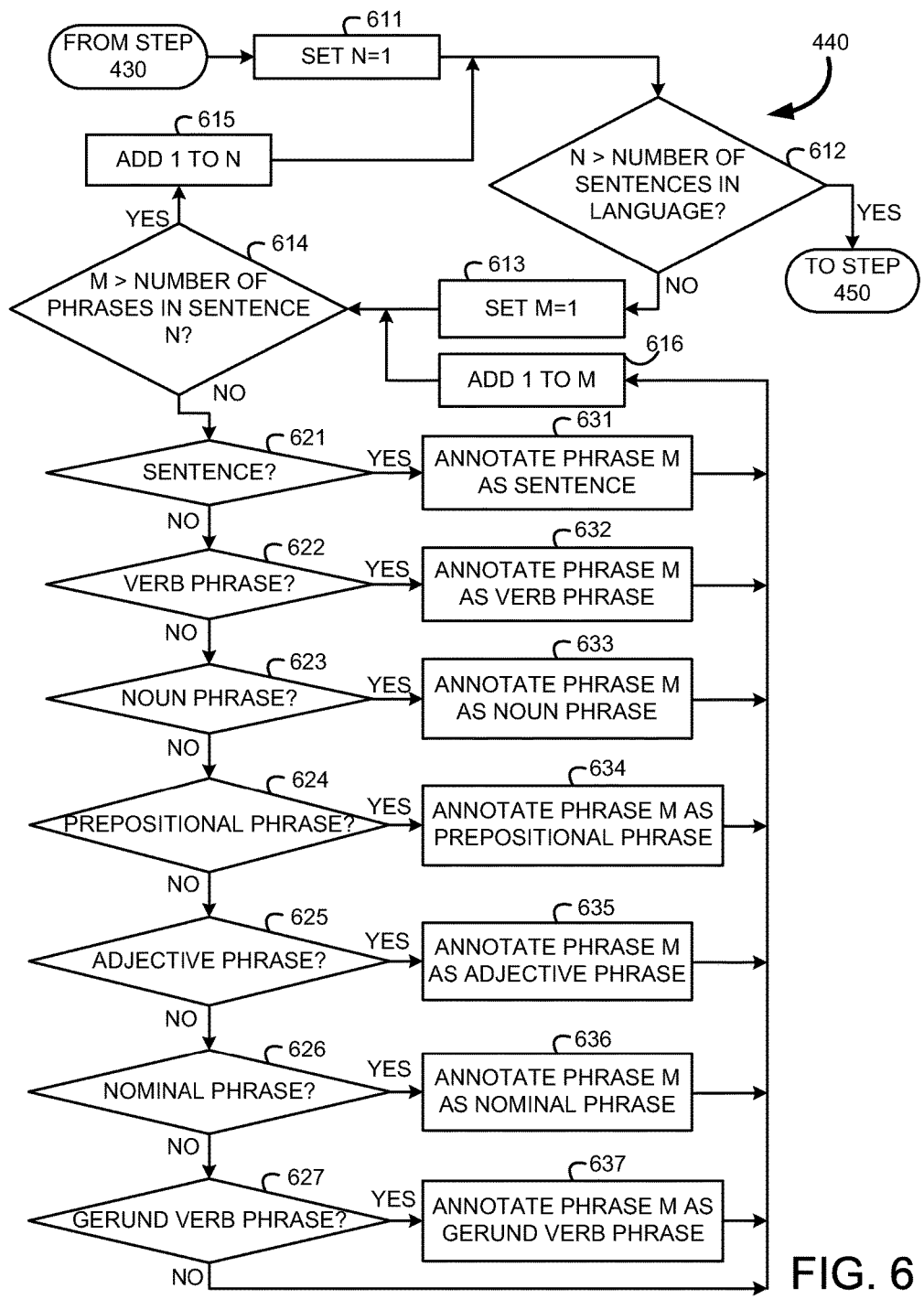
FIG. 6 shows a flow chart illustrating the process for chunking text for the natural language processor system of FIG. 1.

FIG. 6 shows a flow chart illustrating the process for chunking text shown generally at 440. The beginning of this process is from step 430, of FIG. 4. At step 611, a placeholder N is set to a base value of 1. Then at step 612 the placeholder N is compared to the number of sentences in the text. If N is greater that the total sentences in the text, then the process ends by returning to step 450 of FIG. 4. This ensures that all sentences within the corpus are chunked prior to the progression of the natural language processing.

Otherwise, if, at step 612, N is less than the total number of sentences within the text, a second placeholder M is set to 1 at step 613. Then at step 614 the placeholder M is compared to the number of phrases in sentence N. If M is greater than the total phrases in the sentence N, then 1 is added to N in step 615. This ensures that all phrases within sentence N are chunked prior to the chunking of subsequent sentences. The process then continues at step 612, where the increased placeholder N is compared to the number of sentences in the text.

Else, if, at step 614, M is less than the total phrases in sentence N, a query is made to determine if phrase M is a sentence at step 621. The rules utilized to chunk may be referred to above at Table 2. If the phrase M is a sentence, it is annotated as such at step 631. Then at step 616, 1 is added to M and the process then continues to step 614, where the increased placeholder M is compared to the number of phrases in sentence N.

Otherwise, if, at step 621 the phrase is not a sentence, a query is made to determine if phrase M is a verb phrase at step 622. If the phrase M is a verb phrase, it is annotated as such at step 632. Then at step 616, 1 is added to M and the process then continues to step 614, where the increased placeholder M is compared to the number of phrases in sentence N.

Otherwise, if, at step 622 the phrase is not a verb phrase, a query is made to determine if phrase M is a noun phrase at step 623. If the phrase M is a noun phrase, it is annotated as such at step 633. Then at step 616, 1 is added to M and the process then continues to step 614, where the increased placeholder M is compared to the number of phrases in sentence N.

Otherwise, if, at step 623 the phrase is not a noun phrase, a query is made to determine if phrase M is a prepositional phrase at step 624. If the phrase M is a prepositional phrase, it is annotated as such at step 634. Then at step 616, 1 is added to M and the process then continues to step 614, where the increased placeholder M is compared to the number of phrases in sentence N.

Otherwise, if, at step 624 the phrase is not a prepositional phrase, a query is made to determine if phrase M is an adjective phrase at step 625. If the phrase M is an adjective phrase, it is annotated as such at step 635. Then at step 616, 1 is added to M and the process then continues to step 614, where the increased placeholder M is compared to the number of phrases in sentence N.

Otherwise, if, at step 625 the phrase is not an adjective phrase, a query is made to determine if phrase M is a nominal phrase at step 626. If the phrase M is a nominal phrase, it is annotated as such at step 636. Then at step 616, 1 is added to M and the process then continues to step 614, where the increased placeholder M is compared to the number of phrases in sentence N.

Otherwise, if, at step 626 the phrase is not a nominal phrase, a query is made to determine if phrase M is a gerund verb phrase at step 627. If the phrase M is a gerund verb phrase, it is annotated as such at step 637. Then at step 616, 1 is added to M and the process then continues to step 614, where the increased placeholder M is compared to the number of phrases in sentence N.

Else, if, at step 627 the phrase is not a gerund verb phrase, 1 is added to M at step 616. The process then continues to step 614, where the increased placeholder M is compared to the number of phrases in sentence N.

Figure 7:
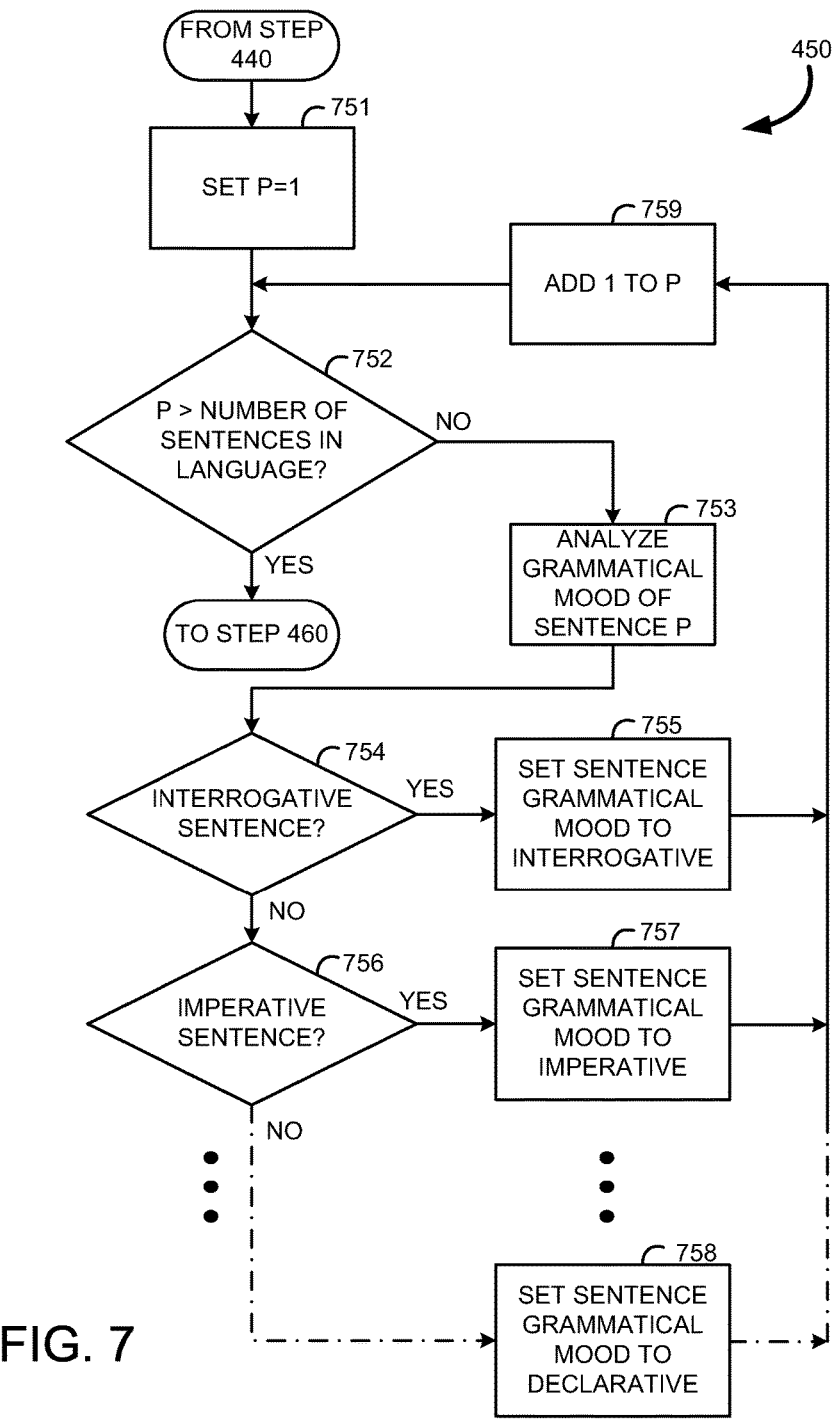
FIG. 7 shows a flow chart illustrating the process for setting grammatical mood for the natural language processor system of FIG. 1.

FIG. 7 shows a flow chart illustrating the process for setting grammatical mood shown generally at 450. The beginning of this process is from step 440, of FIG. 4. At step 751, a placeholder P is set to a base value of 1. Then at step 752 the placeholder P is compared to the number of sentences in the text. If P is greater that the total sentences in the text, then the process ends by returning to step 460 of FIG. 4. This ensures that all sentences within the text are analyzed for grammatical mood prior to the progression of the natural language processing.

Otherwise, if, at step 752, P is less than the total number of sentences within the text, the grammatical mood of sentence P is analyzed at step 753. At step 754, a query is made whether sentence P is an interrogative sentence. The definition for an interrogative sentence may be found at Table 3 above. Alternatively, a rule, statistical or hybrid identification system may be utilized as is discussed above. If the sentence is an interrogative sentence, the grammatical mood of sentence P is set to an interrogative structure at step 755. Then, at step 759, 1 is added to P and the process then continues to step 752, where the increased placeholder P is compared to the total number of sentences within the text.

Otherwise, if, at step 754, sentence P is not in an interrogative structure, a query is made whether sentence P is an imperative sentence at step 756. The definition for an imperative sentence may be found at Table 3 above. Alternatively, a rule, statistical or hybrid identification system may be utilized as is discussed above. If the sentence is an imperative sentence, the grammatical mood of sentence P is set to an imperative structure at step 757. Then, at step 759, 1 is added to P and the process then continues to step 752, where the increased placeholder P is compared to the total number of sentences within the text.

In FIG. 7, additional grammatical mood inquiries may occur after step 756, and before setting the sentence mood to declarative in step 758. Additionally, other mood types may be incorporated within some embodiments. The illustration is intended to reflect this adaptability of grammatical mood analysis.

Else, if, at step 756, sentence P is not in an imperative structure, the grammatical mood of sentence P is set to a declarative structure at step 758. This provides that the declarative structure is default for both true declarative sentences, and in the case of sentences whose grammatical mood is difficult to ascertain. Then, at step 759, 1 is added to P and the process then continues to step 752, where the increased placeholder P is compared to the total number of sentences within the text.

Figure 8:
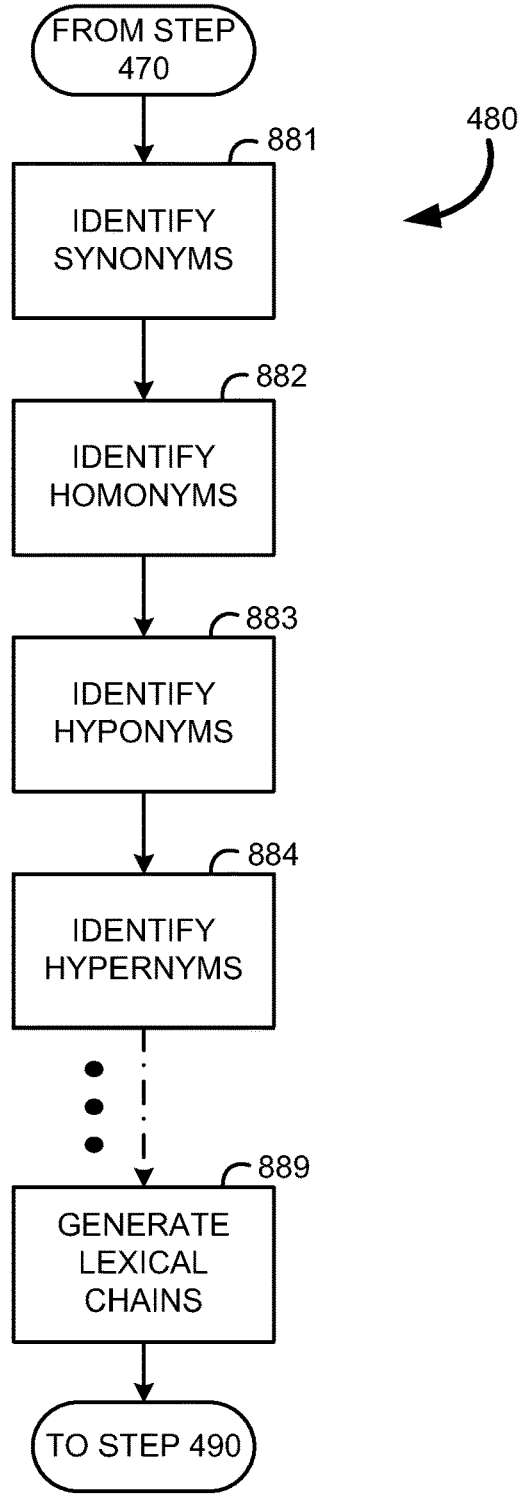
FIG. 8 shows a flow chart illustrating the process for pattern recognition for the natural language processor system of FIG. 1.

FIG. 8 shows a flow chart illustrating the process for pattern recognition shown generally at 480. The beginning of this process is from step 470, of FIG. 4. At step 881 synonyms are identified for the elements of the text. Synonyms are different lexemes with the same meaning Often, words are not synonyms for each other in any context but they are context bound. Then, at step 882, homonyms are identified for the elements of the text. Homonyms are words of the same orthographic and/or phonographic form with unrelated meaning e.g. mouse (computer input device) and mouse (animal). This type of relationship is typically, from a semantic perspective, of little interest. At step 883 hyponyms are identified for the elements of the text. Hyponyms are the more specific lexeme of a pair of lexemes, when one lexeme denotes a subclass of the other. For example, a 'human' is a hyponym of 'primate'. At step 884 hypernyms are identified for the elements of the text. Hypernyms are the less specific lexeme of a pair of lexemes, when one lexeme denotes a subclass of the other. Following the previous example, a 'primate' is a hypernym of 'human'. Synonyms, hyponyms, hypernyms and homonyms are identified through the referencing of the elements through dictionaries and thesauruses as well as statistical pattern recognition.

In FIG. 8, additional semantic analyses may occur after step 884, and before lexical chain generation in step 889. The illustration is intended to reflect this adaptability of semantic analysis.

At step 889 lexical chains are generated for the text. As stated earlier, lexical chains are data-structures that represent the semantics of a given text at a very abstract level. A lexical chain is made up of a set of different nouns and/or verbs that represent the semantics of a given text. They occur in any order. Moreover, a text may usually be represented by more than one lexical chain. After lexical chains are generated, the process ends by proceeding to step 490 of FIG. 4.

Figure 9:
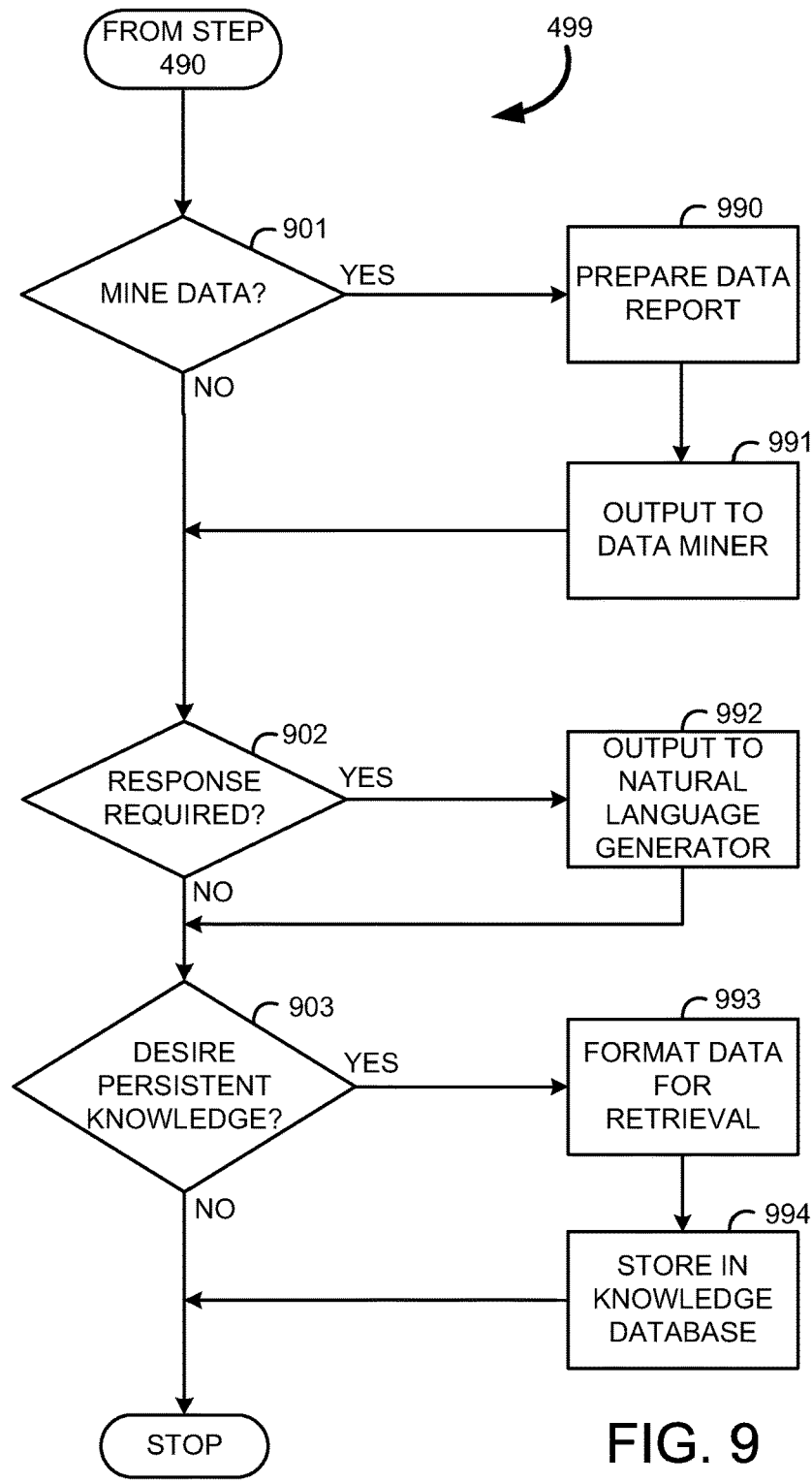
FIG. 9 shows a flow chart illustrating the process for post operations for the natural language processor system of FIG. 1.

FIG. 9 shows a flow chart illustrating the process for outputting post operations shown generally at 499. The beginning of this process is from step 490, of FIG. 4. At step 901 a query is made whether data mining is to be performed upon the semantically analyzed language. If data mining is desired, a data report is generated, at step 990, wherein trends, semantics, ad targets and product placement suggestions are compiled for Data Miner 120 consumption. The generated data report may be personalized to the Language Source 103a to 103z providing the dialogue, or language. The semantic analysis data report is output to the Data Miner 120, in step 991. Then the process proceeds to step 902.

Else if data mining is not desired at step 901, the process progresses to step 902, where a query is made as to whether a response is required. Grammatical mood plays an important role in the determination of when responses are required. If a response is required, the semantic analysis is output to the Natural Language Generator 140 in step 992. Then the process proceeds to step 903.

Else if a response is not desired at step 902, the process progresses to step 903, where a query is made as to whether persistent knowledge of the conversation is required. The type of avatar, content of conversation and length of conversation may all play a role in the persistence of the dialogue. For example, in a game scenario it may be advantageous for an avatar to "remember" lengthy or involved conversation, but "forget" smaller and insignificant dialogue. Not only does this provide the avatar with a believable behavior scheme, but less data-rich content (for data mining purposes) may be eliminated, thus reducing the resources required for storage. If persistent knowledge is required, the semantic analysis is formatted for retrieval in step 993. Then, in step 994, the formatted semantic analysis is stored within the conversation history database. The process then ends. Else if persistent knowledge is not desired, at step 903, the process ends.

Figure 10:
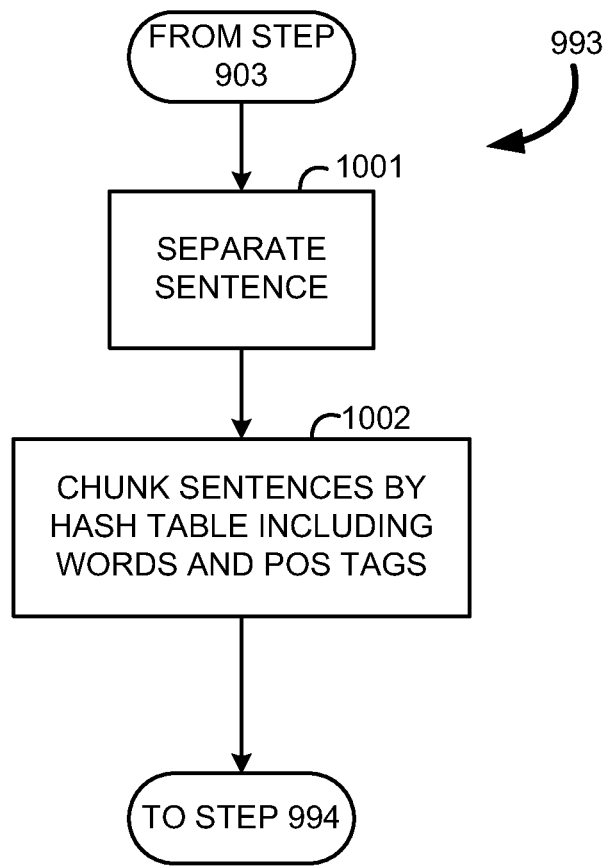
FIG. 10 shows a flow chart illustrating the process for preparing processed text for retrieval for the natural language processor system of FIG. 1.

FIG. 10 shows a flow chart illustrating the process for formatting processed text for retrieval shown generally at 993. The beginning of this process is from step 903, of FIG. 9. At step 1001 the processed sentences are separated. Then, at step 1002, the sentences are chunked by a hash table, wherein the hash table includes the Part-of-Speech tags and words, thus allowing for rapid retrieval of the processed conversation. Additionally, stored conversation may be referenced by the conversant. After hash table formatting, the process ends by proceeding to step 994 of FIG. 9.

III. Specific Implementations of Natural Language Processor

The following FIGS. 11 to 16 disclose specific implementations of the Natural Language Processor 190 discussed above in FIGS. 1 to 10. While the methods disclosed in FIGS. 11 to 16 illustrate specific implementations of some embodiments, these figures and descriptions are intended to be exemplary in nature.

Figure 11:
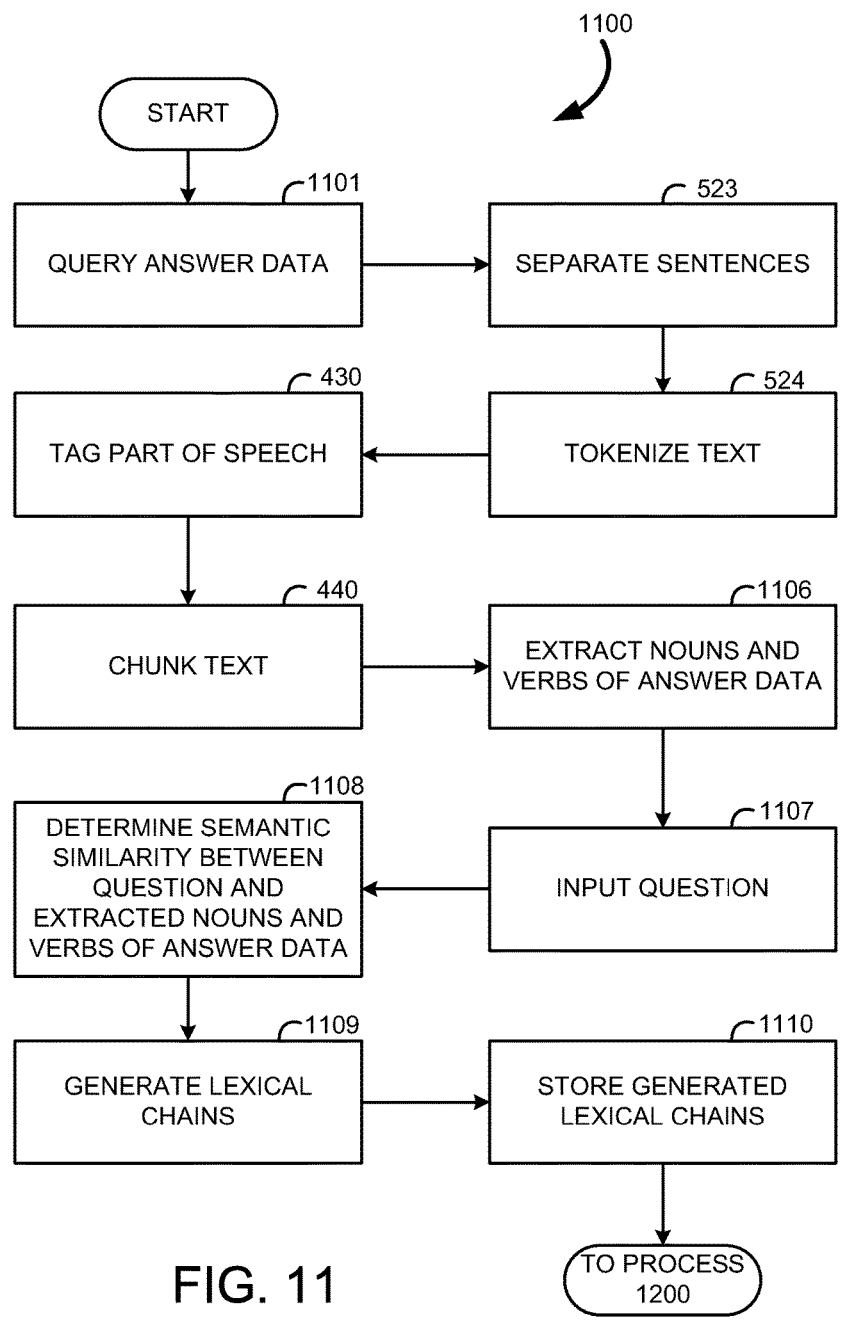
FIG. 11 shows a flow chart illustrating the process for an embodiment of data preparation for semantic searches utilizing the natural language processor system of FIG. 1.

FIG. 11 shows a flow chart illustrating the process for an embodiment of data preparation for semantic searches, shown generally at 1100, utilizing the Natural Language Processor 190 of the Autonomous Avatar Driver System 100. The illustrated method in FIG. 11 is intended to be useful in conjunction with a Frequently Asked Question (FAQ) style data set. A FAQ typically includes a set of predefined questions, followed by an answer to said question. As such, this embodiment of the semantic searching has particularly important implications for corporate customers and guide avatars. For example, a corporation could, in some embodiments, replace its existing FAQ page on its website with a helper avatar. The avatar may be graphically represented, but may often have no physical embodiment. In such embodiments, there may be a field where the inquirer, the user, may type her question. Such an embodiment may mimic a chat style conversation that currently occurs with a customer representative. The avatar may then perform the semantic search of the FAQ database to return the question-answer pairs that are the most relevant to the inquiry. Current help menus provide searching for troubleshooting purposes, however these searches are greatly limited in their ability to comprehend semantics, and inability to process natural language dialogue. When the inquirer is technically sophisticated, these hurdles may be minor due to the proficient usage of search terms. However, many corporations cater to less technically sophisticated clientele, and the ability for these companies to outreach effectively to their customers may be greatly enhanced by allowing natural language searches that often provide better search results than a traditional troubleshooting search; even one performed by a sophisticated and proficient searcher. Moreover, within the gamming and entertainment environments, guide characters, or tutorial characters, may be desired. In these circumstances, it is of particular importance to be able to interpret natural language and provide meaningful responses for the avatar to be believable, and to enhance the experience for the user.

The process begins at step 1101, where the answer data is queried. The answer data is the answer portion of a FAQ question-answer pair. Each answer is queried, and in step 523 sentence detection is performed upon the answer data. Then, in step 524, the answer data is tokenized to clean up the answer data by removing all special character and replacing them with meaningful tokens. The parts of speech are tagged in step 430, utilizing, in some embodiments, the tags defined in Table 1. The answer data is then chunked, in step 440, in a manner similar to that previously discussed, and in reference to Table 2. After chunking the process diverges from the prototypical method of natural language processing disclosed earlier in the present invention. At step 1106, the nouns and verbs of the answer data are extracted. Then the question portion of the FAQ question-answer pair is inputted at step 1107. The semantic similarity between the noun and verbs extracted from the answer, and the question is then determined in step 1108.

Semantics of the answers is performed by determining the semantics of the nouns and verbs extracted through cross referencing the words and through pattern recognition. Similarly, the semantics of the inputted question are determined through cross referencing the words and pattern recognition. The overlap between the semantic analysis of the question, and semantic analysis of the noun-verb list of the answer, results in the semantic similarity.

The semantic similarity is then utilized in 1109 to generate a lexical chain. Then, in step 1110, the generated lexical chain is stored in reference to the question-answer pair it originated from. This process is, in some embodiments, performed for all question-answer pairs. Moreover, this procedure is only required to be completed once, and repeated only whenever new data is introduced in the FAQ. It should be noted that there are many methods of preparing a lexical chain for a question-answer pair in a FAQ; however, due to the semantically similar relationship between the question and its answer the abovementioned process develops a finely tuned lexical chain that is highly relevant to the core meanings of the FAQ pair. By storing these lexical chains, referenced back to their original question-answer pairs, subsequent inquiries may leverage these chains to provide meaningful semantic searches, as may be seen in FIG. 12.

Figure 12:
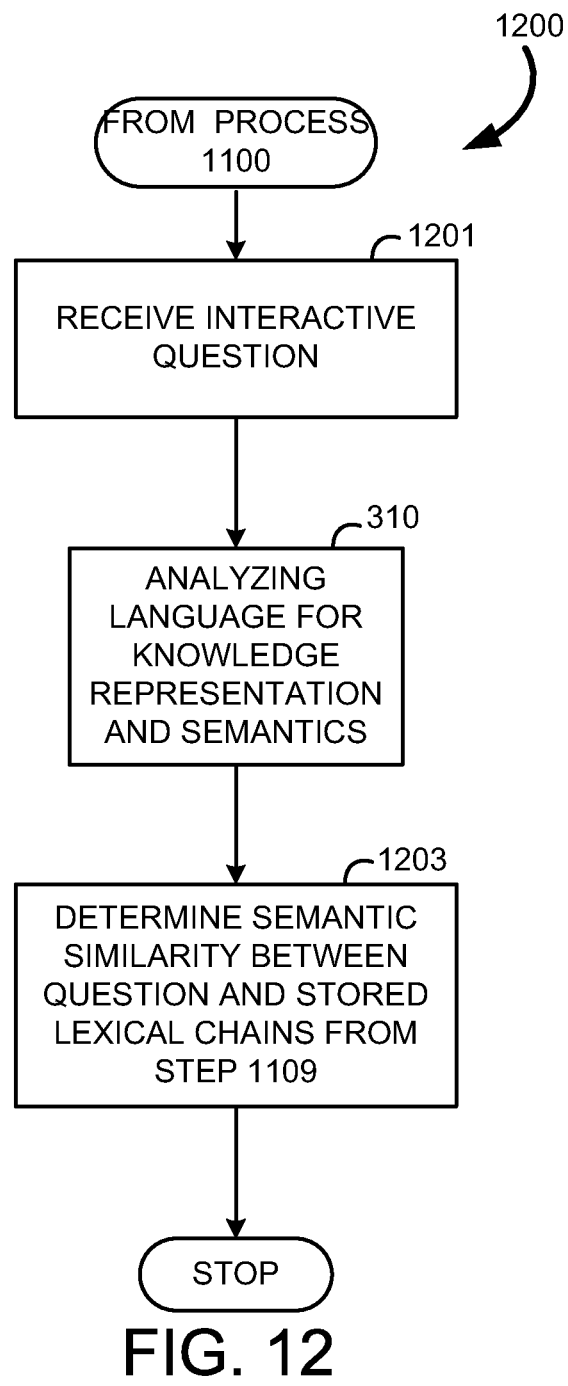
FIG. 12 shows a flow chart illustrating the process for an embodiment of semantic searches for frequently-asked-questions utilizing the natural language processor system of FIG. 1.

FIG. 12 shows a flow chart illustrating the process for an embodiment of semantic searches for frequently-asked-questions, shown generally at 1200. This process follows the process illustrated generally at 1100 at FIG. 11.

The instant process begins at step 1201 when an interactive question is inputted. Interactive question refers to a question originating from an end-user of the avatar. This end-user may be the corporation's customer accessing their FAQ on the website, or may be a gamer interacting with a guide avatar. These interactive questions do not, in these embodiments, refer to the question portions of the FAQ.

Then, at step 310, the interactive question is processed for semantics and knowledge representation by the Natural Language Analyzer 130 through a process similar to that disclosed at FIG. 4. The results of the semantic analysis of the question are then compared to the lexical chains generated in step 1109 of FIG. 11 for semantic similarity at step 1203. The lexical chains with the greatest semantic similarity to the semantics of the interactive question may then be referenced to the question-answer pair that gave birth to it. These question-answer pairs may be displayed to the end user. Alternatively, only the answer portion of the question-answer pairs may be displayed to the end user. Moreover, in some embodiments the answer may be displayed after being reprocessed through the Natural Language Analyzer 130 and the Natural Language Generator 140 in order to provide an answer that is uniquely tailored to the interactive question, and that may include knowledge representation. In such a way, a guide character, traditionally avoided by gamers due to its daunting monotony and longwinded rigidity, may provide a continuation of the game narrative that is believable and enjoyable to the gamer.

Figure 13A:
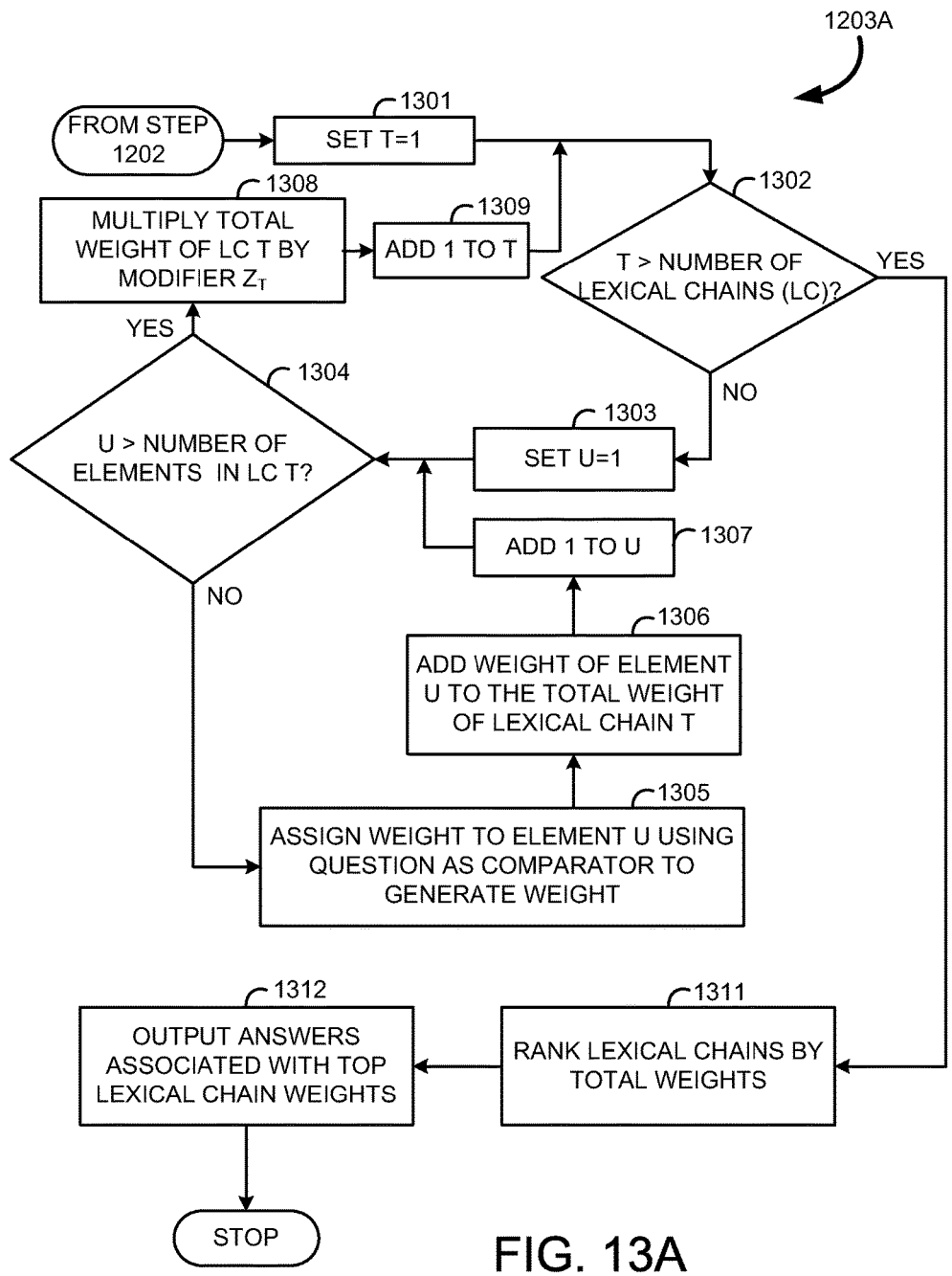
FIG. 13A shows a flow chart illustrating the process for one embodiment of determining semantic similarities for semantic searches utilizing the natural language processor system of FIG. 1.

FIG. 13A shows a flow chart illustrating the process for one embodiment of determining semantic similarities for semantic searches shown generally at 1203A. The beginning of this process is intended to be from step 1202, of FIG. 12. However, this process 1203A is not limited to such context, and may be employed in many suitable semantic similarity comparisons. At step 1301 a placeholder T is set to a base value of 1. Then at step 1302 the placeholder T is compared to the number of lexical chains that were generated in step 1109 of FIG. 11 for the question-answer pairs of the FAQ. If T is greater that the total number of lexical chains, then the process proceeds to step 1311 where lexical chains are ranked by total weights. This ensures that all lexical chains generated for the FAQ are compared prior to the ranking of semantic similarities.

Otherwise, if, at step 1302, T is less than the total number lexical chains of the FAQ, a second placeholder U is set to 1 at step 1303. Then at step 1304 the placeholder U is compared to the number of elements in lexical chain T. If U is greater than the total elements in the lexical chain T, then the weight of the lexical chain T is multiplied by a modifier $Z_T$ at step 1308. Modifier $Z_T$ provides for corrections to be made for differences between lexical chains, such as for chain length. For example, a highly refined question-answer pair will tend to produce a relatively short lexical chain, since the subject matter explored by the FAQ entry is refined and specific. However, a broad question and answer pair may result in a very long lexical chain. In some circumstances, the interactive question may have more aggregate similarities with the long lexical chain due to its broad nature; however the interactive question is better answered by the narrower, in-depth FAQ entry. In such an instance the modifier $Z_T$ may be applied to increase the weight of the shorter lexical chain's semantic similarities.

Then a value of 1 is added to T in step 1309. This ensures that all elements within the lexical chain T are compared to the semantics of the interactive question. The process then returns to step 1302, where the increased placeholder T is compared to the number of lexical chains for the FAQ.

Else, if, at step 1304, U is less than the total elements in the lexical chain T, then, at step 1305, a weight is assigned to element U by comparing the semantics of the interactive question to element U. A direct semantic match may generate a higher weight value to element U than a more attenuated semantic relationship. At step 1306 the weight assigned to element U is added to the total weight of lexical chain T. Then, at step 1307, a value of 1 is added to U. The process then returns to step 1304, where the increased placeholder U is compared to the number of elements of the lexical chain T. In this manner the total weight of the lexical chain T is the sum of the weights of its respective elements.

After all lexical chains have been processed for their total weights; the lexical chains may be ranked by said total weights in step 1311. Then, in step 1312, the lexical chains with the largest total weights are referenced back to their parent question-answer pairs, and the question-answer pair is outputted for display or processing. The process then ends. In this way, the interactive question returns the FAQ entry or entries that are most relevant to the inquiry.

Figure 13B:
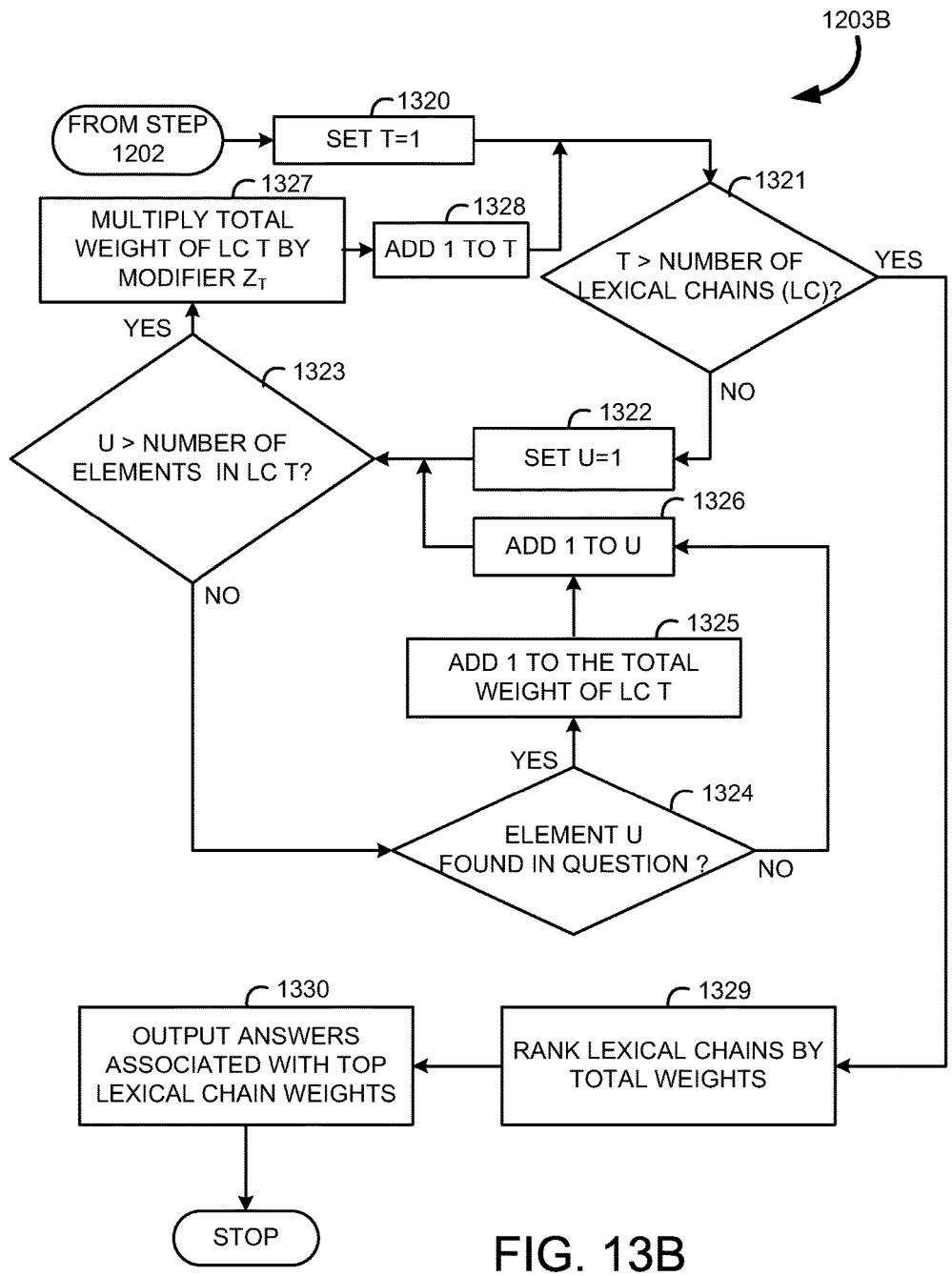
FIG. 13B shows a flow chart illustrating the process for another embodiment of determining semantic similarities for semantic searches utilizing the natural language processor system of FIG. 1.

FIG. 13B shows a flow chart illustrating the process for another embodiment of determining semantic similarities for semantic searches shown generally at 1303B. This process is similar to the process outlined in FIG. 13A, but requires less computational resources and may produce minor variation in results. The beginning of this process is intended to be from step 1202, of FIG. 12. However, this process 1203B is not limited to such context, and may be employed in many suitable semantic similarity comparisons. At step 1320 a placeholder T is set to a base value of 1. Then at step 1321 the placeholder T is compared to the number of lexical chains that were generated in step 1109 of FIG. 11 for the question-answer pairs of the FAQ. If T is greater that the total number of lexical chains, then the process proceeds to step 1329 where lexical chains are ranked by total weights.

This ensures that all lexical chains generated for the FAQ are compared prior to the ranking of semantic similarities.

Otherwise, if, at step 1321, T is less than the total number lexical chains of the FAQ, a second placeholder U is set to 1 at step 1322. Then at step 1323 the placeholder U is compared to the number of elements in lexical chain T. If U is greater than the total elements in the lexical chain T then the weight of the lexical chain T is multiplied by a modifier $Z_T$ at step 1327. Modifier $Z_T$ provides for corrections to be made for differences between lexical chains, such as for chain length. For example, a highly refined question-answer pair will tend to produce a relatively short lexical chain, since the subject matter explored by the FAQ entry is refined and specific. However, a broad question and answer pair may result in a very long lexical chain. In some circumstances, the interactive question may have more aggregate similarities with the long lexical chain due to its broad nature; however the interactive question is better answered by the narrower, in-depth FAQ entry. In such an instance the modifier $Z_T$ may be applied to increase the weight of the shorter lexical chain's semantic similarities.

Then a value of 1 is added to T in step 1328. This ensures that all elements within the lexical chain T are compared to the interactive question. The process then returns to step 1321, where the increased placeholder T is compared to the number of lexical chains for the FAQ.

Else, if, at step 1323, U is less than the total elements in the lexical chain T, then, at step 1324, a query is made if the element U of lexical chain T is matched by any element in the interactive question. If element U matches an element in the question, then 1 is added to the total weight of the lexical chain T in step 1325. Then, in step 1326, a value of 1 is added to U. This ensures that all elements U within the lexical chain T are compared to the interactive question. The process then returns to step 1323, where the increased placeholder U is compared to the number of elements of the lexical chain T.

Else, if at step 1324, element U does not match any element in the question, then a value of 1 is added to U at step 1326. This ensures that all elements U within the lexical chain T are compared to the interactive question. The process then returns to step 1323, where the increased placeholder U is compared to the number of elements of the lexical chain T. In this manner the total weight of the lexical chain T is the sum of the direct matches of its elements and the question.

After all lexical chains have been processed for their total weights; the lexical chains may be ranked by said total weights in step 1329. Then, in step 1330, the lexical chains with the largest total weights are referenced back to their parent question-answer pairs, and the question-answer pair is outputted for display or processing. The process then ends. In this way, the interactive question returns the FAQ entry or entries that are most relevant to the inquiry.

Figure 14:
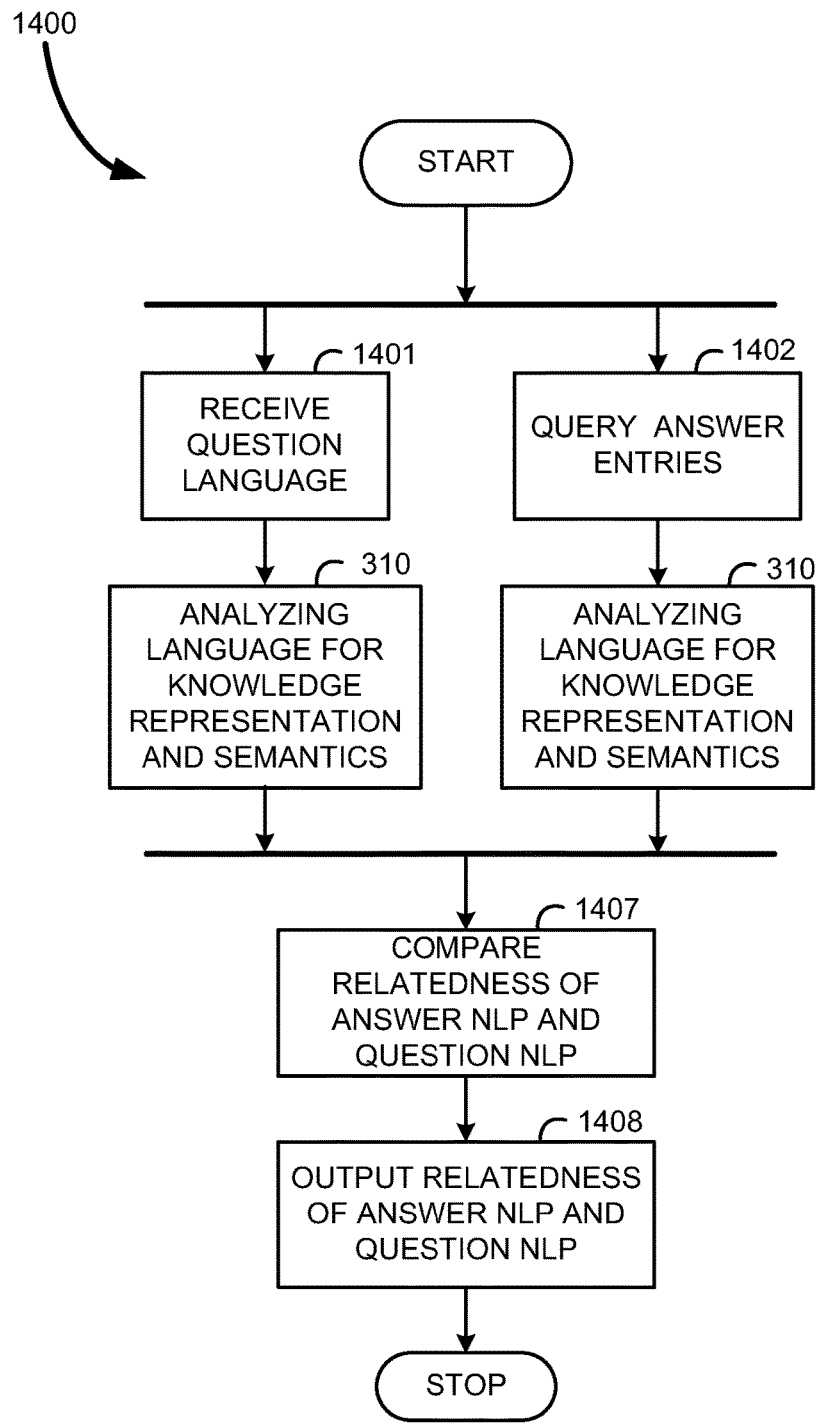
FIG. 14 shows a flow chart illustrating the process for an embodiment of a general semantic search utilizing the natural language processor system of FIG. 1.

FIG. 14 shows a flow chart illustrating the process for an embodiment of a general semantic search utilizing the natural language processor system, shown generally at 1400. Process 1400 is a more general semantic searching method then those embodiments disclosed in FIGS. 11 to 13B. For example, process 1400 does not require a FAQ style data set, but rather answer data in the form of a plurality of answer entries. These answer entries may include separate data sources, previous dialogue conversations, news articles, press releases, or virtually any series of informational text.

The process begins by parallel process of Step 1401 and 1402. Either step 1401 or 1402 may be performed first, or they may be performed simultaneously. At step 1401 a question language is received. At step 310 the language question is processed through natural language analysis as illustrated in FIG. 4. At step 1402, answer entries are queried. Said answer entries are analyzed through the Natural Language Analyzer 130 for semantics at step 310. At step 1407 the semantics for each answer entry is compared for relatedness to the results the semantics for the question determined at steps 310. At step 1408, the results of the relatedness between the semantics of each answer entry and the question are outputted for further processing. The process then ends.

Figure 15A:
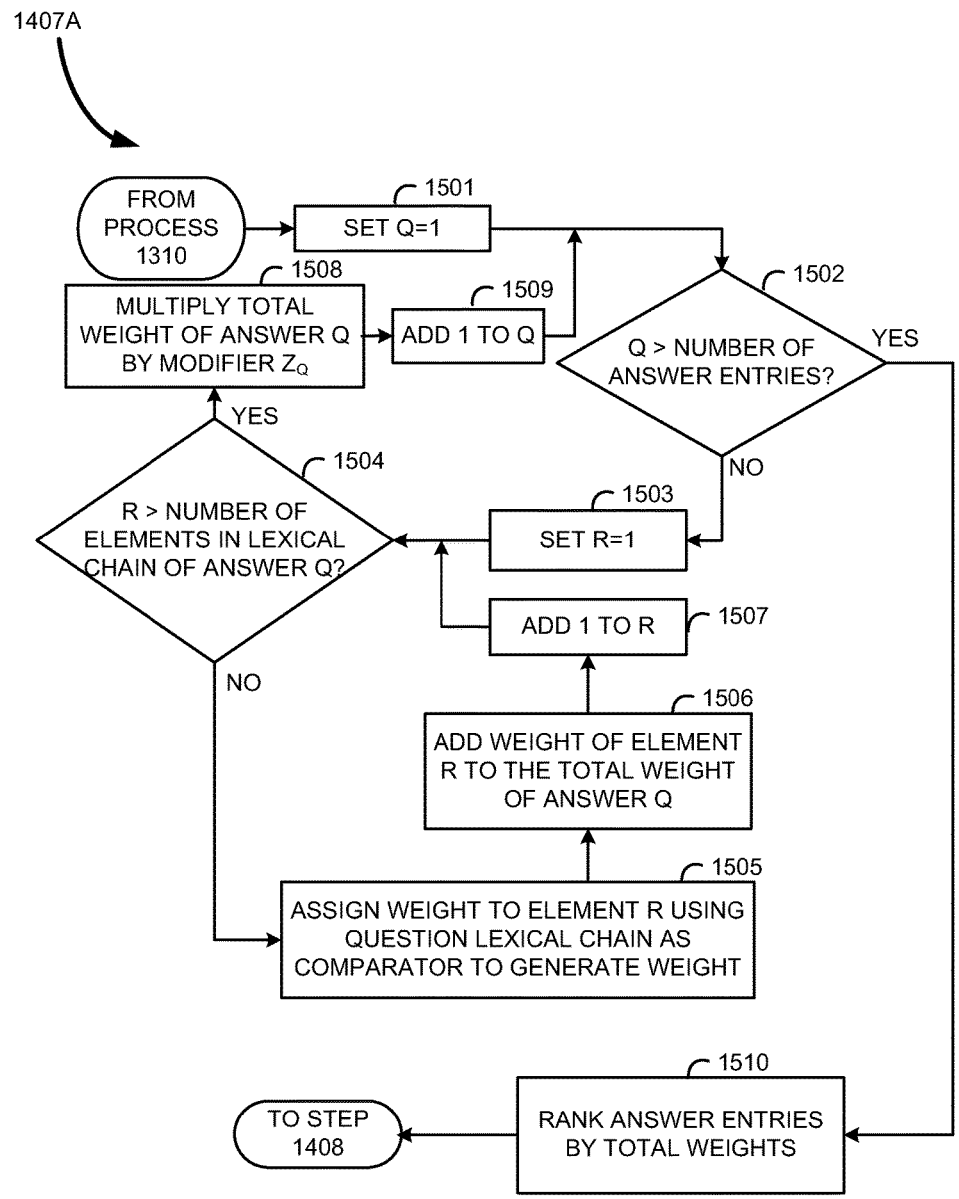
FIG. 15A shows a flow chart illustrating the process for one embodiment of determining semantic similarities for general semantic searches utilizing the natural language processor system of FIG. 1.

FIG. 15A shows a flow chart illustrating the process for one embodiment of determining semantic similarities for general semantic searches utilizing the Autonomous Avatar Driver System 100 shown generally at 1407A. The beginning of this process is intended to be from step 1406, of FIG. 14. However, this process 1407A is not limited to such context, and may be employed in any suitable semantic similarity comparison. At step 1501 a placeholder Q is set to a base value of 1. Then at step 1502 the placeholder Q is compared to the number of answer entries in the answer data set. If Q is greater that the total number of answer entries then the process proceeds to step 1510 where answer entries are ranked by total weights. This ensures that all answer entries are compared prior to the ranking of semantic similarities.

Otherwise, if, at step 1502, Q is less than the total number answer entries, a second placeholder R is set to 1 at step 1503. Then at step 1504 the placeholder R is compared to the number of elements in lexical chain of answer entry Q. If R is greater than the total elements in the lexical chain of answer entry Q then the weight of the lexical chain of answer entry Q is multiplied by a modifier $Z_Q$ at step 1508. Modifier $Z_Q$ provides for corrections to be made for differences between lexical chains, such as for chain length. For example, a highly refined answer entry will tend to produce a relatively short lexical chain. However, a broad answer entry may result in a very long lexical chain. In some circumstances, the interactive question may have more aggregate similarities with the long lexical chain due to its broad nature; however the interactive question is better answered by the narrower, in-depth answer entry. In such an instance the modifier $Z_Q$ may be applied to increase the weight of the shorter lexical chain's semantic similarities.

Then a value of 1 is added to Q in step 1509. This ensures that all elements within the lexical chain of answer entry Q are compared to the semantics of the question. The process then returns to step 1502, where the increased placeholder Q is compared to the number of answer entries.

Else, if, at step 1504, R is less than the total elements in the lexical chain of answer entry Q, then, at step 1505, a weight is assigned to element R by comparing the semantics of the question to element R. A direct semantic match may generate a higher weight value to element R than a more attenuated semantic relationship. At step 1506 the weight assigned to element R is added to the total weight of answer entry Q. Then, at step 1507, a value of 1 is added to R. The process then returns to step 1504, where the increased placeholder R is compared to the number of elements of the lexical chain of answer entry Q. In this manner the total weight of the lexical chain of answer entry Q is the sum of the weights of its respective elements.

After all lexical chains have been processed for their total weights; the answer entries may be ranked by said total weights in step 1510. The process then ends by proceeding to step 1408 in FIG. 14.

Figure 15B:
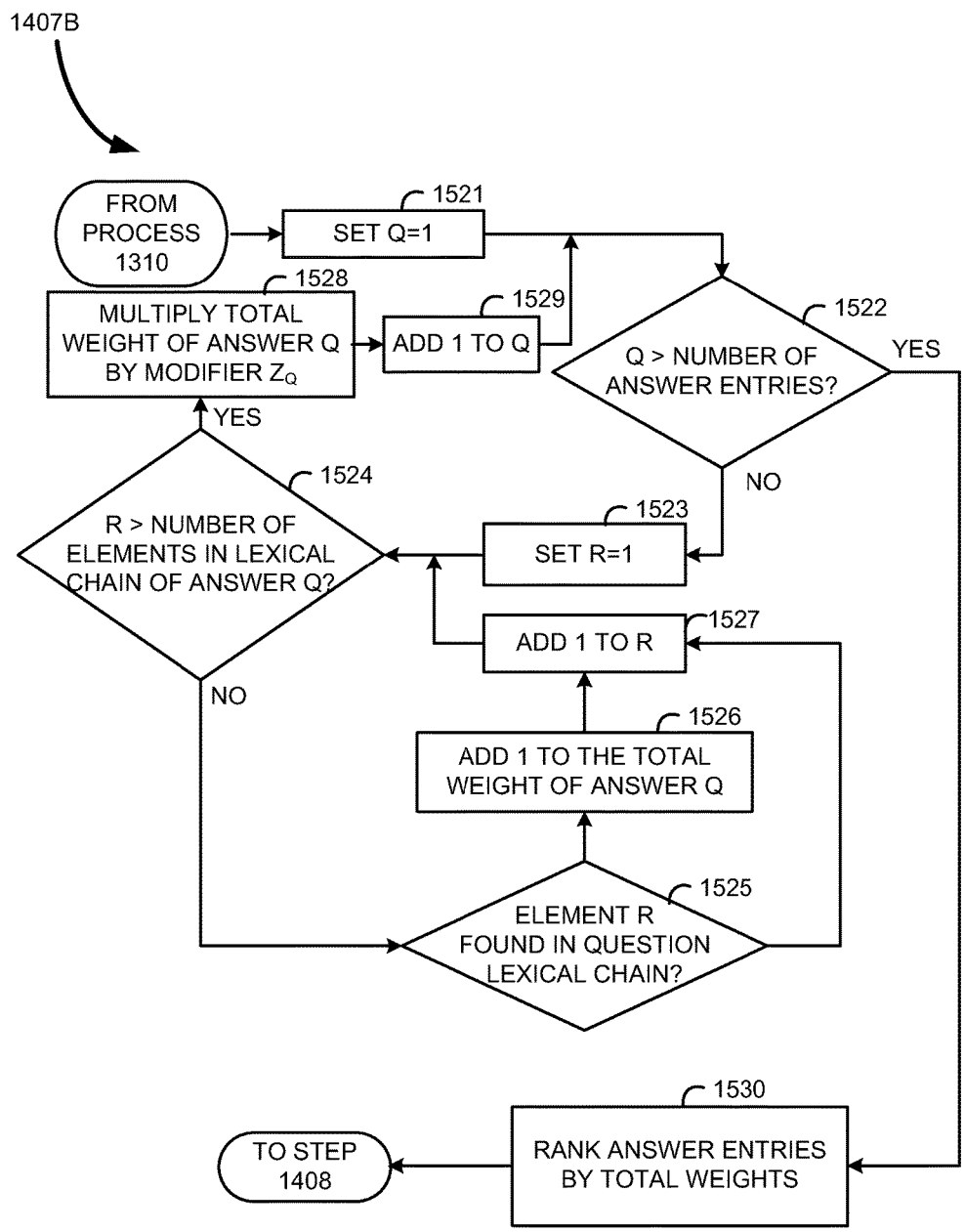
FIG. 15B shows a flow chart illustrating the process for another embodiment of determining semantic similarities for general semantic searches utilizing the natural language processor system of FIG. 1.

FIG. 15B shows a flow chart illustrating the process for another embodiment of determining semantic similarities for general semantic searches utilizing the Autonomous Avatar Driver System 100, shown generally at 1407B. This process is similar to the process outlined in FIG. 15A, but requires less computational resources and may produce minor variation in results. The beginning of this process is intended to be from step 1406, of FIG. 14. However, this process 1407B is not limited to such context, and may be employed in any suitable semantic similarity comparison. At step 1521 a placeholder Q is set to a base value of 1. Then at step 1522 the placeholder Q is compared to the number of answer entries. If Q is greater that the total number of answer entries then the process proceeds to step 1530 where answer entries are ranked by total weights. This ensures that all answer entries are compared prior to the ranking of semantic similarities.

Otherwise, if, at step 1522, Q is less than the total number answer entries, a second placeholder R is set to 1 at step 1523. Then at step 1524 the placeholder R is compared to the number of elements in lexical chain of answer entry Q. If R is greater than the total elements in the lexical chain of answer entry Q then the weight of the lexical chain of answer entry Q is multiplied by a modifier $Z_Q$ at step 1528. Modifier $Z_Q$ provides for corrections to be made for differences between lexical chains, such as for chain length. For example, a highly refined answer entry will tend to produce a relatively short lexical chain. However, a broad answer entry may result in a very long lexical chain. In some circumstances, the question may have more aggregate similarities with the long lexical chain due to its broad nature; however the interactive question is better answered by the narrower, in-depth answer entry. In such an instance the modifier $Z_Q$ may be applied to increase the weight of the shorter lexical chain's semantic similarities.

Then a value of 1 is added to Q in step 1529. This ensures that all elements within the lexical chain of answer entry Q are compared to the question. The process then returns to step 1522, where the increased placeholder Q is compared to the number of answer entries.

Else, if, at step 1524, R is less than the total elements in the lexical chain of answer entry Q, then, at step 1525, a query is made if the element R of lexical chain of answer entry Q is matched by any element in the question. If element R matches an element in the question, then 1 is added to the total weight of answer entry Q in step 1526. Then, in step 1527, a value of 1 is added to R. This ensures that all elements R within the lexical chain of answer entry Q are compared to the question. The process then returns to step 1524, where the increased placeholder R is compared to the number of elements of the lexical chain of answer entry Q.

Else, if at step 1525, element R does not match any element in the question, then a value of 1 is added to R at step 1527. This ensures that all elements R within the lexical chain of answer entry Q are compared to the question. The process then returns to step 1524, where the increased placeholder R is compared to the number of elements of the lexical chain of answer entry Q. In this manner the total weight of answer entry Q is the sum of the direct matches of its lexical chain's elements and the question.

After all answer entries have been processed for their total weights; the answer entries may be ranked by said total weights in step 1530. The process then ends by proceeding to step 1408 in FIG. 14.

Figure 16:
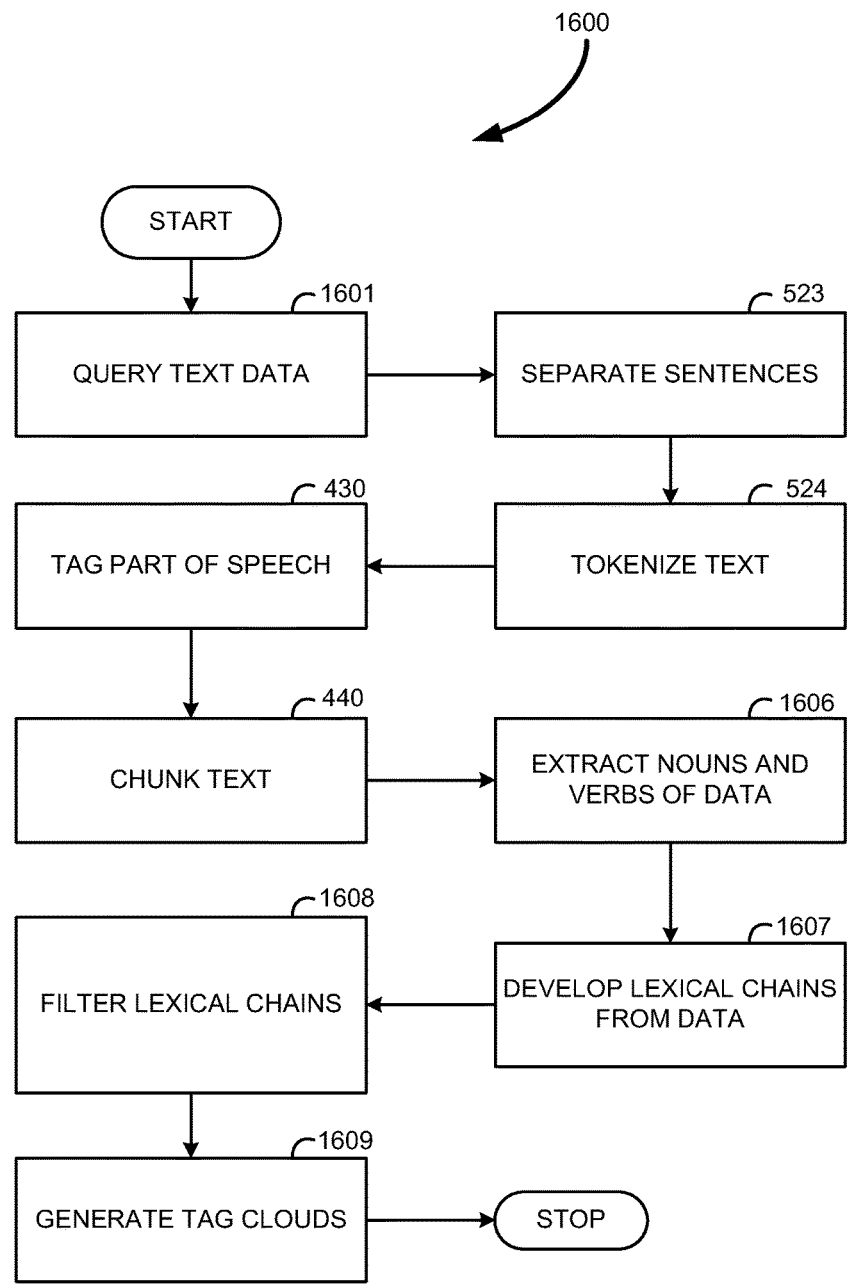
FIG. 16 shows a flow chart illustrating the process for generating tag clouds in accordance with an embodiment of the present invention.

FIG. 16 shows a flow chart illustrating the process for generating tag clouds shown generally at 1600. Tag clouds are a collection of keywords that may be used in order to enable the user to interact more efficiently with a user interface. Tag clouds are well known by those skilled in the art; however, the usage of tag clouds that are responsive to natural language processing is unique to the present invention. This embodiment of the present invention deviates from the semantic searching embodiments; however, this embodiment is intended to illustrate another useful application of the Autonomous Avatar Driver System 100.

The process begins at step 1601, where conversation text data is queried for downstream semantic processing. Beyond conversation data, additional data may be available for query, such as conversation histories, databases and external data sources. In this way the avatar may be able to generate tag clouds that provide somewhat impulsiveness conversation developments. Such impulsiveness allows more avenues of conversation to develop, thereby enhancing the users' experience. Additionally, impulsiveness is a decidedly human trait, thus adding to the believability of the avatar. For example, in a gaming context if the avatar is assigned a role as a farmer, and the user engages in language regarding the weather, the tag cloud may provide keywords about weather, weather predictions and weather's effects upon crops. This is made possible by supplying the avatar with knowledge templates regarding farming practices, as is discussed previously.

At step 523 sentence detection is performed on the queried text. Then, in step 524, the data is tokenized, thereby cleaning the text by removing special characters. Then, in step 430, the cleansed text is tagged as is discusses above at Table 1. The tagged text is then parsed, or chunked, in step 440, as was seen at Table 2. Then at step 1606, the nouns and verbs are extracted from the text in order to generate lexical chains at step 1607. The lexical chains are then filtered at step 1608 to generate tag clouds. At 1609 the tag clouds are generated.

The filtering, at step 1608, may filter individual chains, or filter multiple chains. For instance, the available lexical chains may be compared for similar content. Lexical chains that are too similar may be synthesized, or one of them may be eliminated. This reduces the redundancy of lexical chains used in the construction of the tag clouds. For individual lexical chains, it may be advantageous to reduce each chain to a predetermined number of elements. Redundant elements may be synthesized or eliminated first. Among strings of hyponyms and hypernyms an element with a medium level of detail may be retained and the remaining hyponyms and hypernyms may be discarded. Again, the purpose of such filtering is the reduction of the redundant elements used in the construction of the tag clouds.

The generation of the tag clouds may be as simple as the displaying of the remaining elements of the lexical chains. Alternatively, intact chains may be displayed. Moreover, in some embodiments, the tag clouds could even include dialog from the Natural Language Generator 140, which may utilize the lexical chains generated in step 1607 to generate natural language "thoughts" or conversation suggestions in natural language.

IV. Autonomous Avatar Driver Systems and Methods

Figure 17:
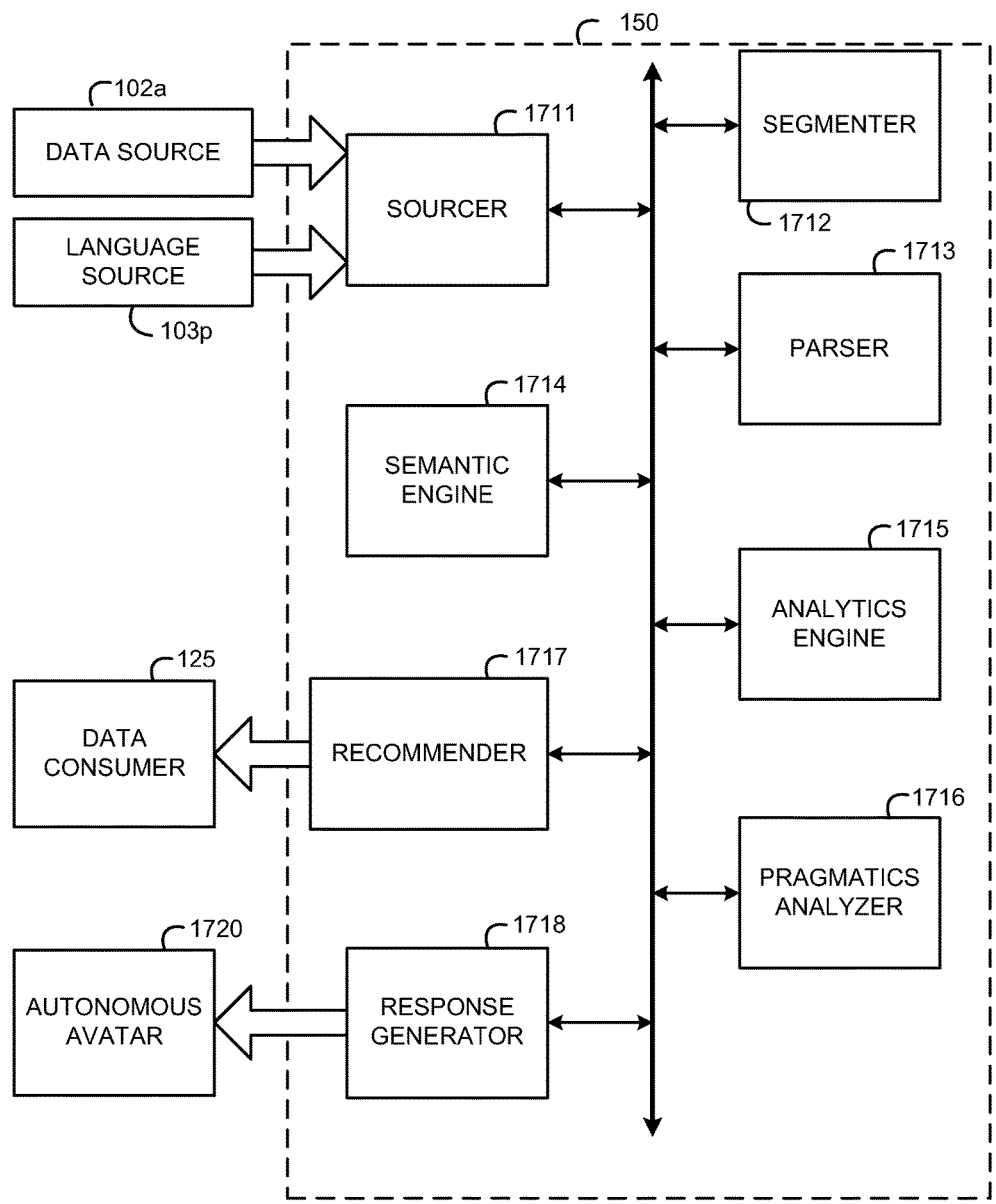
FIG. 17 shows a schematic block diagram illustrating an autonomous avatar driver system with recommendation ability in accordance with some embodiments of the present invention.

FIG. 17 shows a schematic block diagram illustrating the Autonomous Avatar Driver 150. The Autonomous Avatar Driver 150 includes a Sourcer 1711, a Segmenter 1712, a Parser 1713, a Semantic Engine 1714, an Analytics Engine 1715, a Pragmatics Analyzer 1716, a Recommender 1717 and a Response Generator 1718. Each component of the Autonomous Avatar Driver 150 may be coupled with one another, thereby enabling communication between the respective components of the Autonomous Avatar Driver 150. It should be noted that additional, or fewer, components may be included in the Autonomous Avatar Driver 150 as is desired. The illustrated Autonomous Avatar Driver 150 is intended to be purely exemplary in nature. In some embodiments, the Autonomous Avatar Driver 150 may utilize the Natural Language Processor 190 for many of the analytic and semantic analysis of the avatar dialog.

The exemplary Data Source 102*a* and Language Source 103*a* may provide input to the Autonomous Avatar Driver 150 via the Sourcer 1711. The Segmenter 1712 may segment the language, and the Parser 1713 may parse the language. The Semantic Engine 1714 may receive the segmented and parsed language and perform a semantic analysis. Details of these processes, as performed for these particular embodiments of the Autonomous Avatar Driver 150 are further explained below. Of course alternate methods of segmenting, parsing and semantic analysis of the received language may be utilized. For example the generic Natural Language Processor 190 may segment, parse and analyze for the received language semantics as previously disclosed.

The Analytics Engine 1715 performs analytic analysis to the semantically analyzed language. Analytics may include filtering for common words, token frame statistics and N-gram analysis. The Pragmatics Analyzer 1716 may take the language and resolve pragmatic issues, such as slang usage, knowledge template application, grouping of proper nouns, and estimation of affect.

The Recommender 1717 provides recommendations from the analyzed language to the Data Consumer 125. These recommendations may include highly relevant contextual advertising, statistical analysis, and improvement of the user's experience through user recommendations. For example, if the dialog is regarding music, the analyzed language could identify the user's preference of bands. These preferences may then be compared to statistical databases of similar user's preferences to provide music that is likely to be enjoyed by the user. Such "product recommendation" is not new by itself, however by intelligently and contextually analyzing a dialog the Autonomous Avatar Driver 150 may provide highly relevant, accurate and useful recommendations.

Likewise the Recommender 1717 may provide recommendations within a social network environment of other individuals that have similar interests, and/or compatible personalities. This may be of particular use in casual social networks such as Facebook®, as well dating style social networks such as match.com®.

The Response Generator 1718 may utilize the analyzed language to generate relevant responses that may in turn drive the Autonomous Avatar 1720. Such response information may include graphical information, such as avatar expression, as well as relevant dialog. In some embodiments, the Response Generator 1718 may, additionally, receive recommendation information from the Recommender 1717 to incorporate the generated recommendation within the response. Therefore, new and relevant topics, tailored to the conversation, may be included in the response. Additionally, Autonomous Avatar 1720 may provide relevant and contextual advertising when appropriate.

Figure 18:
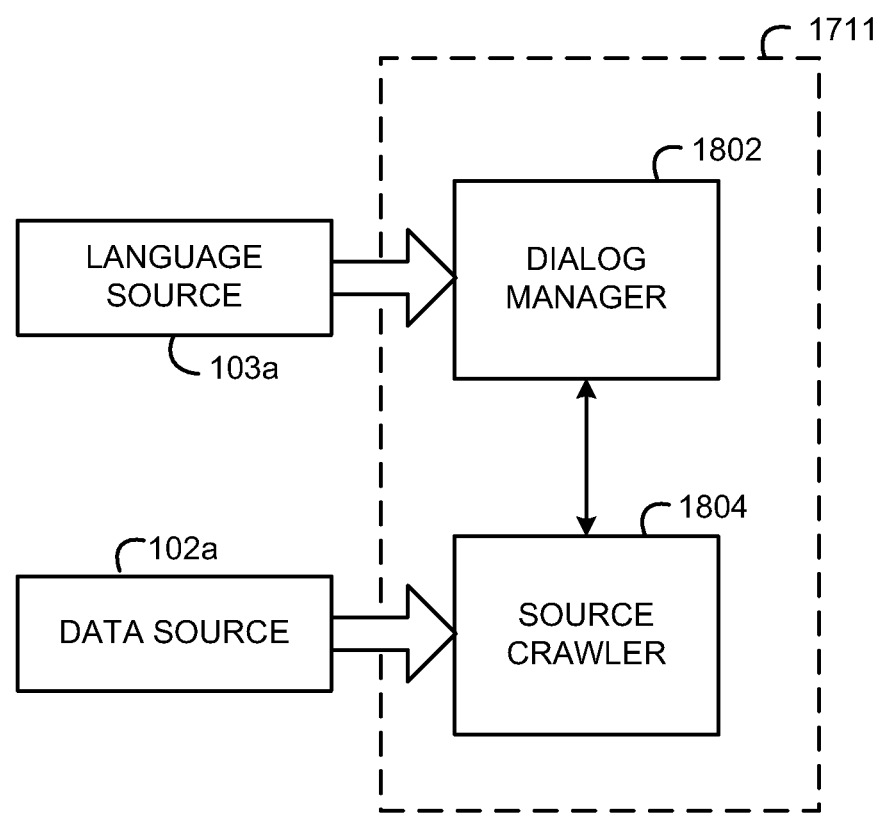
FIG. 18 shows a schematic block diagram illustrating a sourcer in accordance with the autonomous avatar driver system of FIG. 17.

FIG. 18 shows a schematic block diagram illustrating the Sourcer 1711 of the Autonomous Avatar Driver 150. The Sourcer 1711 may include a Dialog Manager 1802 and a Source Crawler 1804. The Dialog Manager 1802 may receive dialog information from the Language Source 103*p*. Of course the Sourcer 1711 may include more, or fewer, components as is required for the desired functionality of the Autonomous Avatar Driver 150. The Source Crawler 1804 may, in some embodiments, provide a more active role of crawling the Data Source 102*a* for information as pertains to the dialog received by the Dialog Manager 1802. The Dialog Manager 1802 may be coupled to the Source Crawler 1804 to facilitate the searching for relevant information by the Source Crawler 1804. The Source Crawler 1804 may utilize any crawling technology, as is well known by those skilled in the art.

The Source Crawler 1804 may search any appropriate Data Source 102*a*; however, social media, and structured data sources, such as Wikipedia, may be routinely sourced due to the ease of searching, as well as the utility of the data gathered for most interactions. For example, the format of typical web-logs, or blogs, is very similar to a screenplay. Screenplays and blogs typically have topical formats, which are highly useful for gathering additional contextual information.

Figure 19:
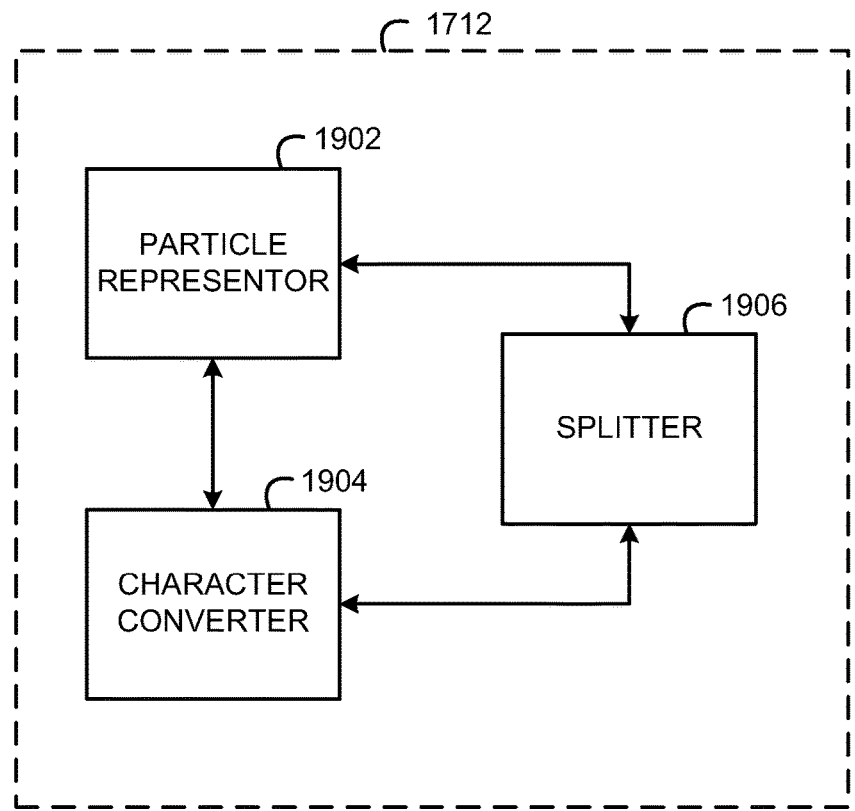
FIG. 19 shows a schematic block diagram illustrating a segmenter in accordance with the autonomous avatar driver system of FIG. 17.

FIG. 19 shows a schematic block diagram illustrating the Segmenter 1712 of the Autonomous Avatar Driver 150. The Segmenter 1712 includes a Particle Representor 1902, a Character Converter 1904 and a Splitter 1906, each couple to one another. Of course the Segmenter 1712 may include more, or fewer, components as is required for the desired functionality of the Autonomous Avatar Driver 150. The Particle Representor 1902 may separate the dialog into "particles", or discrete logical subsections of the dialog. For example, "particles" of a screenplay would include the individual acts and scenes. This particle representation may then represent the language in a data structure format. Particle representation may additionally include speaker detection.

The Character Converter 1904 may convert the dialog characters. In some embodiments, the Character Converter 1904 will convert the dialog to UTF-8 encoding. However, additional conversion formats may be utilized by the Character Converter 1904 as is known by those skilled in the art.

The Splitter 1906 may split the sentences of the dialog. In some embodiments, a max entropy splitter may be utilized for the Splitter 1906.

Figure 20:
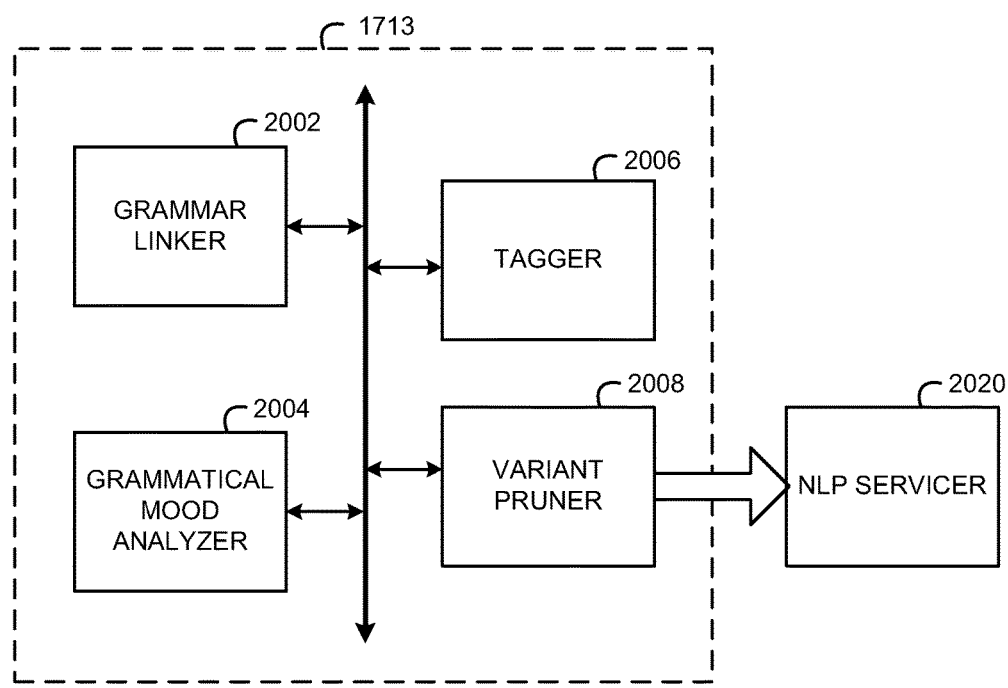
FIG. 20 shows a schematic block diagram illustrating a parser in accordance with the autonomous avatar driver system of FIG. 17.

FIG. 20 shows a schematic block diagram illustrating the Parser 1713 of the Autonomous Avatar Driver 150. The Parser 1713 may include a Grammar Linker 2002, a Grammatical Mood Analyzer 2004, a Tagger 2006 and a Variant Pruner 2008, each coupled to one another. Of course the Parser 1713 may include more, or fewer, components as is required for the desired functionality of the Autonomous Avatar Driver 150. The Grammar Linker 2002 may link grammatically useful word combinations. These combinations provide precision of the language when transformed into computer language. An example of words that may be linked includes "have" and "being". These word combinations denote specific grammatical stances when paired and conjugated.

The Grammatical Mood Analyzer 2004 may determine the grammatical mood of the language. The grammatical moods include interrogative, declarative and imperative. See table 3 above. Of course additional moods may be determined, such as energetic and conditional, as is desired for functionality.

The Tagger 2006 may tag the words of the dialog, as is discussed above in the natural language processor section. Tagging the language is fundamental to the generation of lexical chains, as well as the ability for the Autonomous Avatar Driver 150 to derive accurate semantic information from the language. In some embodiments, a max entropy tagger may be utilized for the Tagger 2006.

The Variant Pruner 2008 may prune variants within the dialog by utilizing Bayesian statistics. Results from the Variant Pruner 2008 may be output to the NLP Servicer 2020. The NLP Servicer 2020 may include any entity that requires the parsed language. Examples of the NLP Servicer 2020 include chat rooms or other data compilers.

Figure 21:
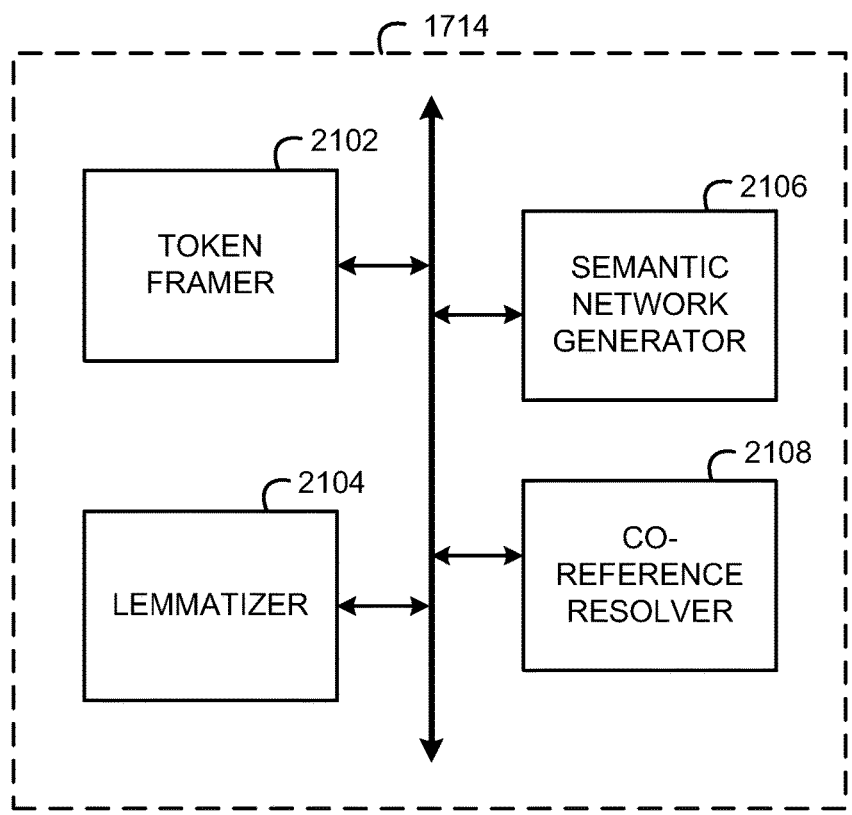
FIG. 21 shows a schematic block diagram illustrating a semantic engine in accordance with the autonomous avatar driver system of FIG. 17.

FIG. 21 shows a schematic block diagram illustrating the Semantic Engine 1714 of the Autonomous Avatar Driver 150. The Semantic Engine 1714 may include a Token Framer 2102, a Lemmatizer 2104, a Semantic Network Generator 2106 and a Co-reference Resolver 2108, each coupled to one another. Of course the Semantic Engine 1714 may include more, or fewer, components as is required for the desired functionality of the Autonomous Avatar Driver 150. The Token Framer 2102 may tokenize the dialog as discussed previously. The Lemmatizer 2104 may lemmatize the dialog, wherein the verbs and nouns are reduced back into basic forms. The Semantic Network Generator 2106 may generate meaningful graphs of the concepts, wherein relationships of the concepts are defined. Statistical profiling may be utilized in the generation of the semantic networks.

Such semantic networks may require significant processing power and time to complete. Thus, in some embodiments, corpuses may be utilized to pre-compute semantic networks, which may be updated as required. These pre-computed semantic networks may then be referenced when the analyzed language contains nodes of commonality. Thus processing time may be reduced for accurate semantic network generation.

Lastly, the Co-reference Resolver 2108 may resolve co-referencing ambiguities within the dialog. The Co-reference Resolver 2108 may resolve the co-references via pattern matching, context appropriateness and by utilizing verb reference to a subject.

Figure 22:
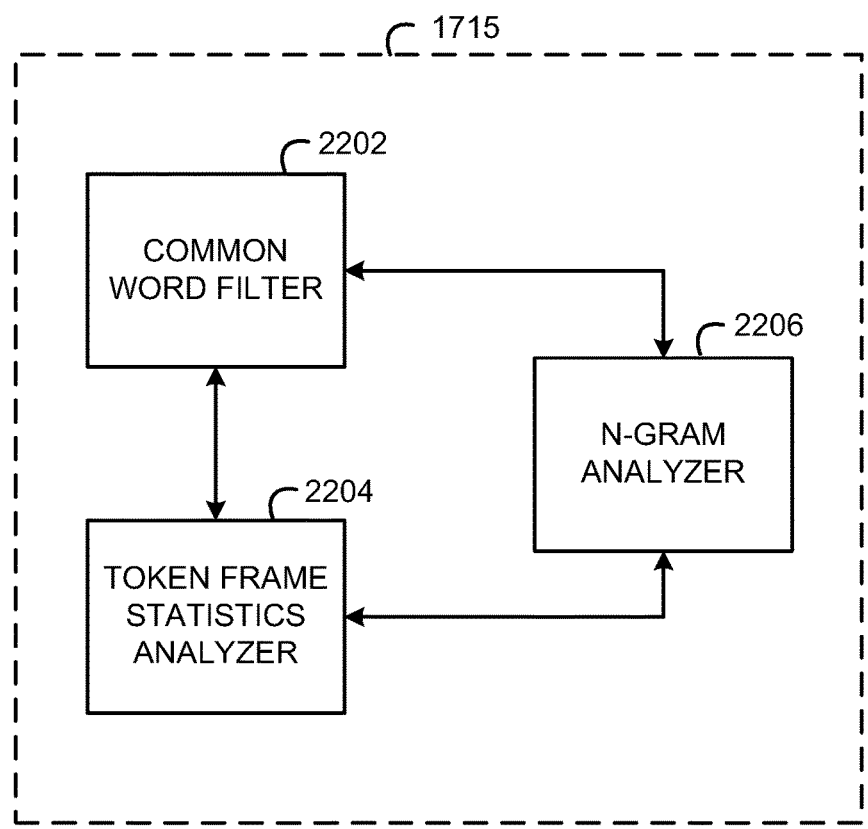
FIG. 22 shows a schematic block diagram illustrating an analytics engine in accordance with the autonomous avatar driver system of FIG. 17.

FIG. 22 shows a schematic block diagram illustrating the Analytics Engine 1715 of the Autonomous Avatar Driver 150. The Analytics Engine 1715 may include a Common Word Filter 2202, a Token Frame Statistics Analyzer 2204, and an N-gram Analyzer 2206, each coupled to one another. Of course the Analytics Engine 1715 may include more, or fewer, components as is required for the desired functionality of the Autonomous Avatar Driver 150. The Common Word Filter 2202 may filter the dialog for common words, thereby reducing redundancy.

The Token Frame Statistics Analyzer 2204 may sum lemmatized dialog. Such a count is akin to "keyword hits" utilized by standard searching systems; however by counting the lemmatized dialog, more contextually accurate searches are possible. Additionally, the Token Frame Statistics Analyzer 2204 may also perform additional statistical analysis on the dialog as is desired for system functionality. An example would include nodal analysis of the semantic network.

The N-gram Analyzer 2206 may perform an N-gram analysis on the dialog. In the English language, typically 3 or 4 words may be utilized for the N-gram analysis. Of course different word numbers may be utilized as is desired. Additionally, the number of words utilized for the N-gram analysis is highly language dependent. In an N-gram analysis, a sliding window along N words may be utilized to generate popularity statistics.

Figure 23:
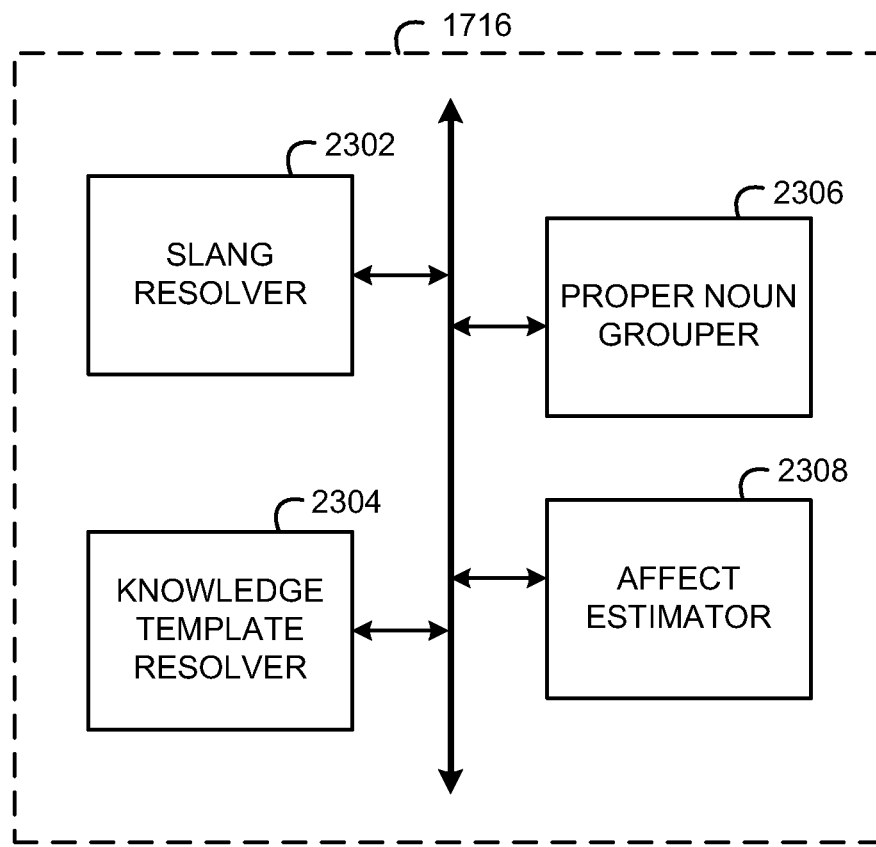
FIG. 23 shows a schematic block diagram illustrating a pragmatics analyzer in accordance with the autonomous avatar driver system of FIG. 17.

FIG. 23 shows a schematic block diagram illustrating the Pragmatics Analyzer 1716 of the Autonomous Avatar Driver 150. The Pragmatics Analyzer 1716 may include a Slang Resolver 2302, a Knowledge Template Resolver 2304, a Proper Noun Grouper 2306 and an Affect Estimator 2308, each coupled to one another. Of course the Pragmatics Analyzer 1716 may include more, or fewer, components as is required for the desired functionality of the Autonomous Avatar Driver 150. The Pragmatics Analyzer 1716 enables the Autonomous Avatar Driver 150 to filter certain behaviors of human users that make contextual analysis of the dialog problematic.

The Slang Resolver 2302 may resolve slang language utilizing statistical collection of word usage as gained from ongoing corpuses, such as blogs. These slang terms may then populate a slang database for rapid retrieval when resolving slang in the dialog.

The Knowledge Template Resolver 2304 may provide knowledge representation via knowledge templates as disclosed above in the discussion of the natural language processing. The Proper Noun Grouper 2306 may group together proper nouns as identified by grammatical form. The Affect Estimator 2308 may estimate dialog affect, or emotion, by analyzing the lemmatized dialog in conjunction with the grammatical mood of the dialog.

Figure 24:
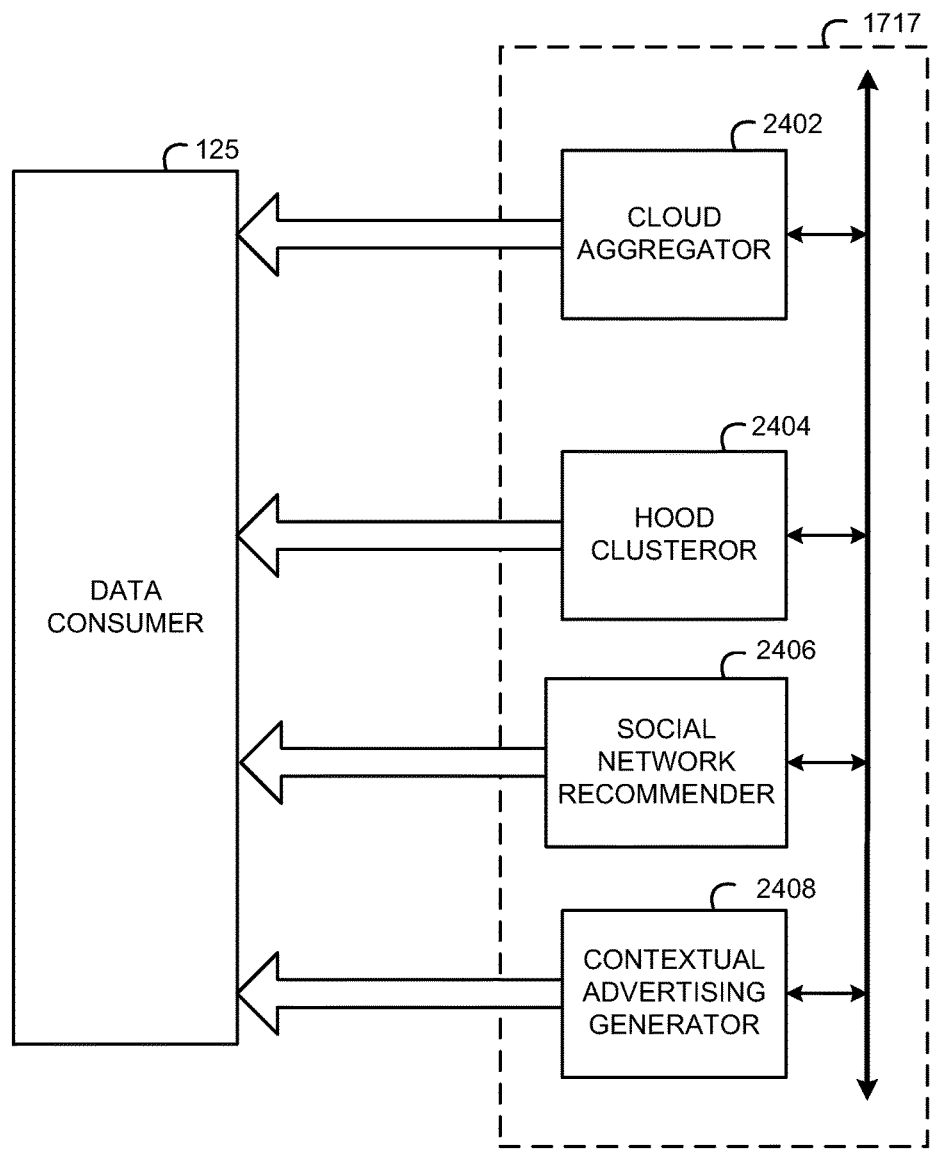
FIG. 24 shows a schematic block diagram illustrating a recommender in accordance with the autonomous avatar driver system of FIG. 17.

FIG. 24 shows a schematic block diagram illustrating the Recommender 1717 of the Autonomous Avatar Driver 150. The Recommender 1717 may include a Cloud Aggregator 2402, a Hood Clusteror 2404, a Social Network Recommender 2406 and a Contextual Advertising Generator 2408, each coupled to one another. Of course the Recommender 1717 may include more, or fewer, components as is required for the desired functionality of the Autonomous Avatar Driver 150. Each component of the Recommender 1717 may output their recommendations to the Data Consumer 125.

The Cloud Aggregator 2402 may aggregate the tag clouds of related dialog. The Hood Clusteror 2404 may cluster people by their closest distance by interest or compatibility. This may have particular utility for "people fit" services on social networks and dating services. The Social Network Recommender 2406 may recommend contacts on social networks. This may be of particular use for business to business contact generation. Lastly, the Contextual Advertising Generator 2408 may generate highly contextual and highly targeted advertising. Such advertising recommendations are only possible by analyzing not only content, but also meaning of the dialog.

Additionally, it should be noted that the Recommender 1717 may assist the Response Generator 1718 to provide dialog for the Autonomous Avatar 1720 that is not only responsive, but also that may include recommendations that are relevant to the user.

Figure 25:
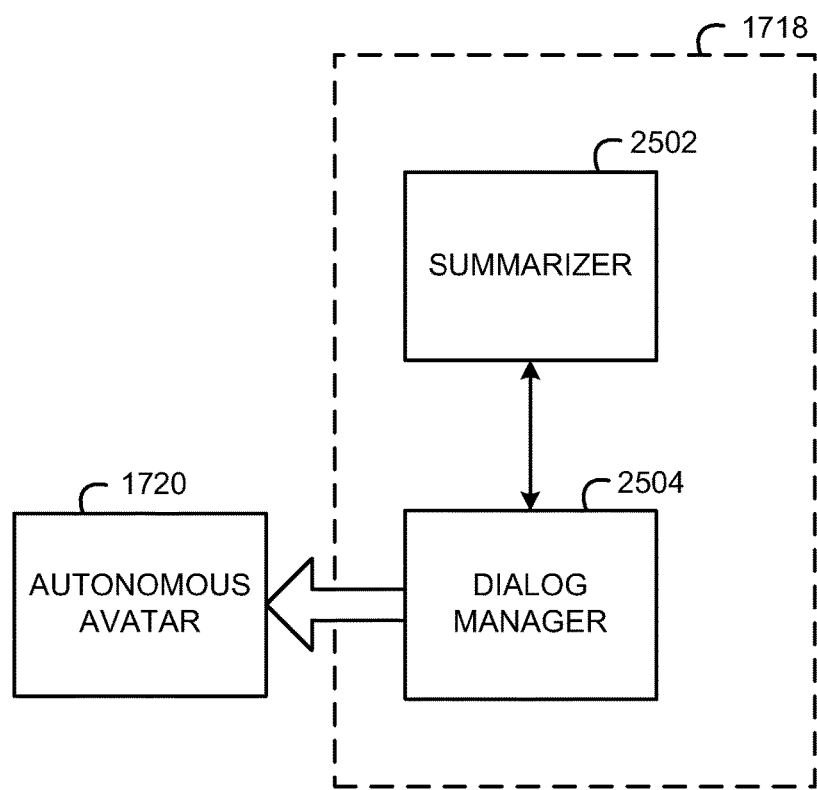
FIG. 25 shows a schematic block diagram illustrating a response generator in accordance with the autonomous avatar driver system of FIG. 17.

FIG. 25 shows a schematic block diagram illustrating the Response Generator 1718 of the Autonomous Avatar Driver 150. The Response Generator 1718 may include a Summarizer 2502 and a Dialog Manager 2504 coupled to one another. Of course the Response Generator 1718 may include more, or fewer, components as is required for the desired functionality of the Autonomous Avatar Driver 150. The Summarizer 2502 may summarize the response that is generated. The Dialog Manager 2504 may then manage the dialog for the Autonomous Avatar 1720. It should be noted that while the Response Generator 1718 is discussed as generating dialog, additional responses may be generated by the Response Generator 1718, including but not limited to graphical emotional expressions, movements and non-word exclamations.

Figure 26A:
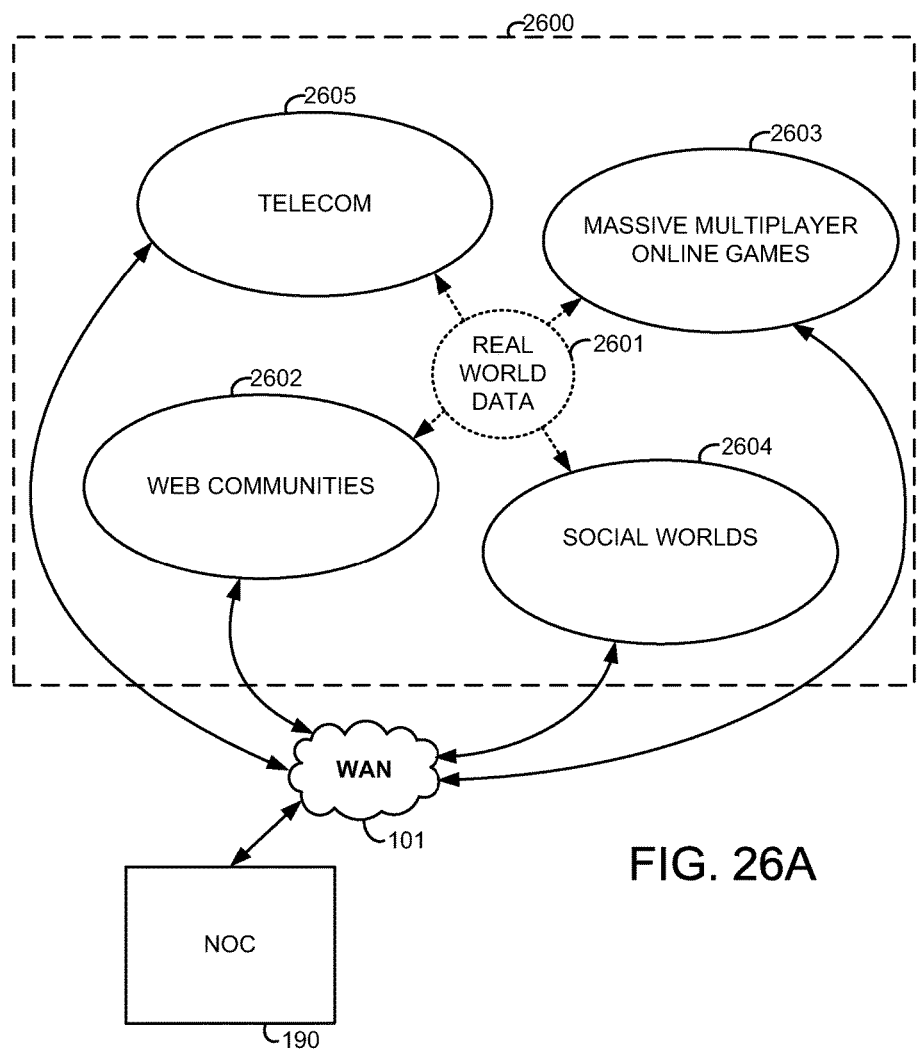
FIG. 26A shows a schematic block diagram of the virtual universe for the autonomous avatar driver system of FIG. 17.

FIG. 26A shows a schematic block diagram of the Virtual Universe 2600 for the autonomous avatar driver system of FIG. 17. The Virtual Universe 2600 may be broken down into five subcategories: Virtual Overlays of Real World Data 2601, WEB Communities 2602, Massively Multiplayer Online Games (MMOGs) 2603, Social Worlds 2604, and Telecom 2605. Examples of Virtual Overlays of Real World Data 2601 include, but are not limited to, Google Earth and Microsoft Flight Simulator X. Examples of WEB Communities 2602 include, but are not limited to, YouTube and MySpace. Examples of MMOGs 2603 include, but are not limited to, World of Warcraft, Guild Wars and Hive. Examples of Social Worlds 2604 include, but are not limited to, Second Life and Neopets. Examples of Telecom 2605 include, but are not limited to, cell phones, BlackBerry Devices and Personal Digital Assistants (PDA). Additional subcategories may exist, or may emerge with new technology. It is intended that these additional subcategories be incorporated into the Virtual Universe 2600. The Autonomous Avatar Driver 150 is coupled to the subcategories of the Virtual Universe 2600 through the WAN 101.

Figure 26B:
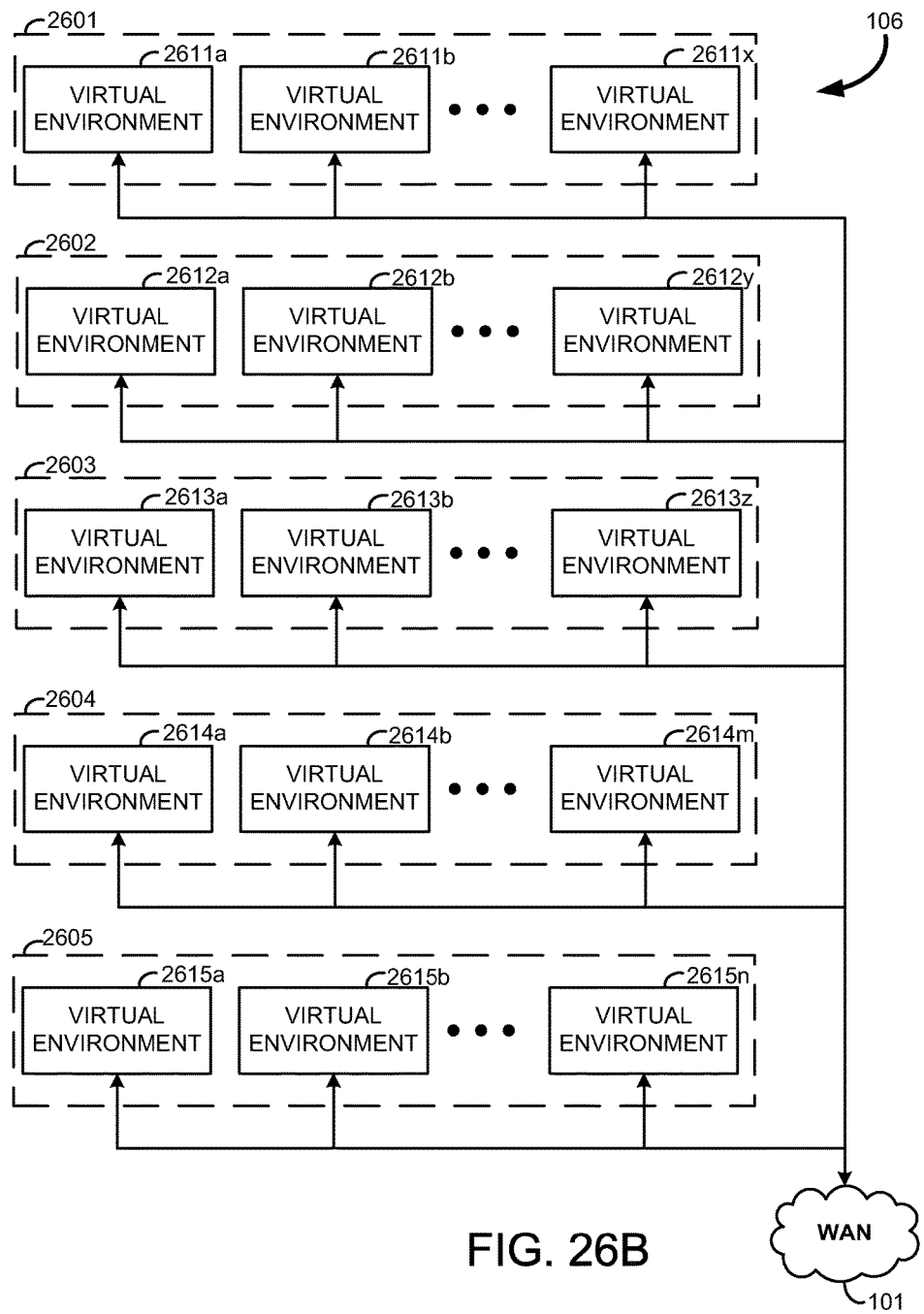
FIG. 26B shows a logical block diagram of virtual environments for the autonomous avatar driver system of FIG. 17.

A logical block diagram of the Virtual Universe 2600 is shown in FIG. 26B. Each Virtual Environments 2611a, 2611b to 2611x, 2612a, 2612b to 2612y, 2613a, 2613b to 2613z, 2614 a, 2614b to 2614m, 2615 a, 2615b to 2615n is coupled to the WAN 101. Each subcategory, Virtual Overlays of Real World Data 2601, WEB Communities 2602, MMOGs 2603, and Social Worlds 2604, and Telecom 2605, may include multiple Virtual Environments 2611a to 2615n. Moreover, some Virtual Environments 2611a to 2615n may be hybrids of these subcategories. Thus, while the line between specific subcategories may become increasingly indistinct, the boundaries between individual Virtual Environments 2611a to 2615n are distinct and nearly impassable. Occasionally, the Virtual Overlays of Real World Data 2601 have provided some connectivity between Virtual Environments 2611a to 2615n as shown in FIG. 25; however this connectivity is limited in scope. The Autonomous Avatar Driver 150, on the other hand, is able to access all the Virtual Environments 2611a to 2615n thereby enabling the driving of the Autonomous Avatar 1720 in any Virtual Environment 2611b.

Figure 26C:
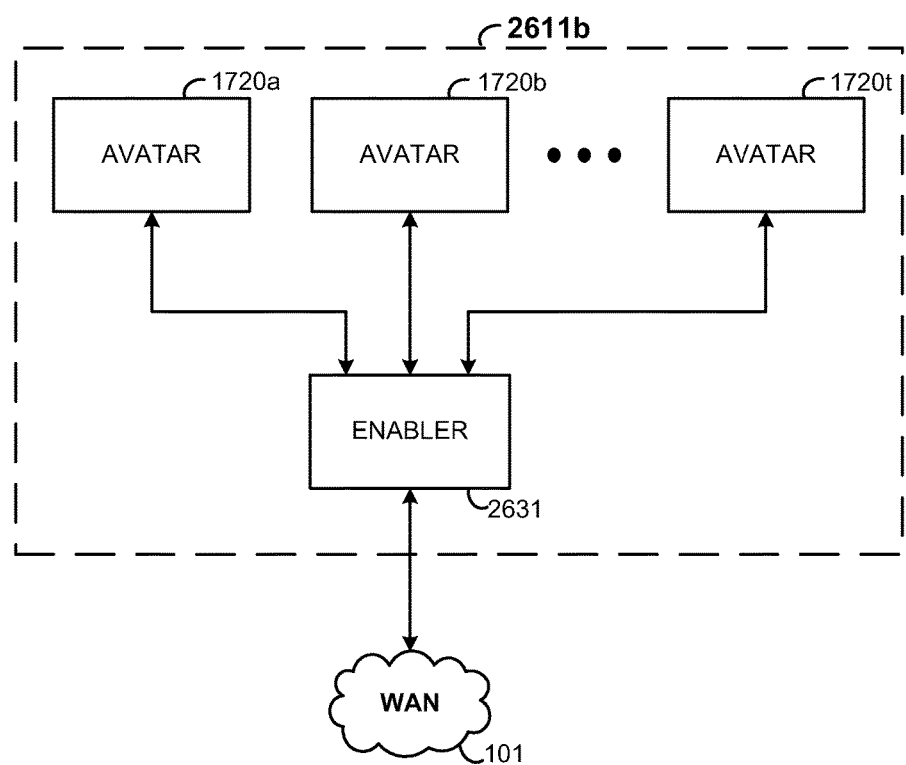
FIG. 26C shows a schematic block diagram of a virtual environment for the autonomous avatar driver system of FIG. 17.

A logical block diagram of an exemplary Virtual Environment 2611b is shown in FIG. 26C. Within each Virtual Environment 2611b exists an Enabler 2631. The Enabler 2631 allows for Autonomous Avatar 1720a, 1720b to 1720t to access the WAN 101, and eventually the Autonomous Avatar Driver 150. In some embodiments, each Virtual Environment 2611b has a corresponding Enabler 2631. However, any number of Autonomous Avatars 1720a to 1720t may exist within a Virtual Environment 2611b at any given time.

Figure 26D:
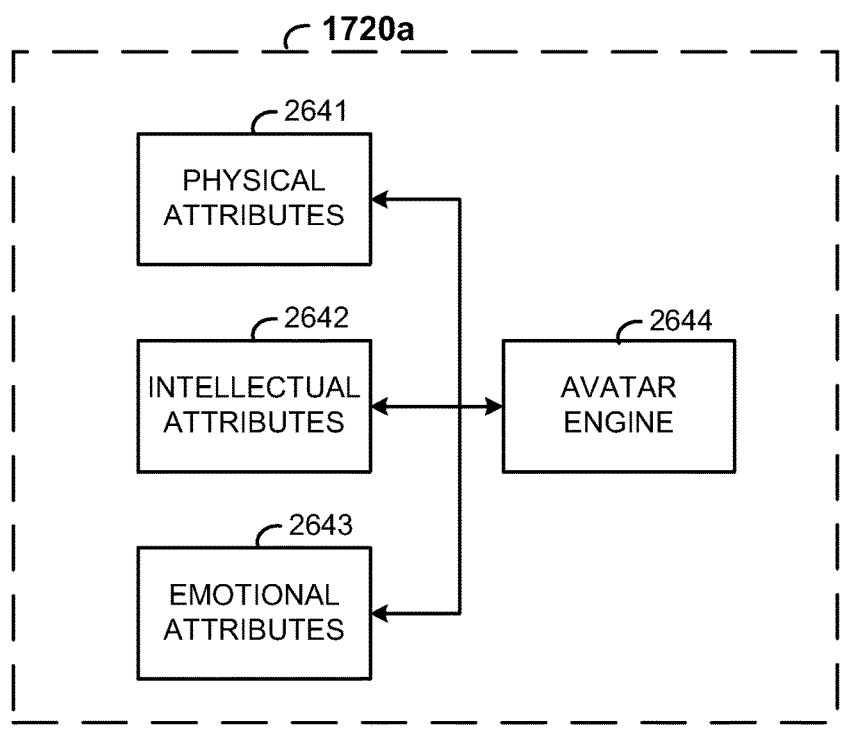
FIG. 26D shows a schematic block diagram of an autonomous avatar for the autonomous avatar driver system of FIG. 17.

A logical block diagram of an exemplary Autonomous Avatar 1720a is shown in FIG. 26D. In some embodiments, Autonomous Avatar 1720a may include Physical Attributes 2641, Intellectual Attributes 2642 and Emotional Attributes 2643. Each attribute may be coupled to an Avatar Engine 2644 which may coordinate and manage each attribute. Physical Attributes 2641 may include Autonomous Avatar's 1720a physical statistics, such as strength, and appearance data. Intellectual Attributes 2642 may include the Autonomous Avatar's 1720a backstory, history and memory. Emotional Attributes 2643 may include the Autonomous Avatar's 1720a emotional disposition, and reaction and response algorithms.

Figure 27:
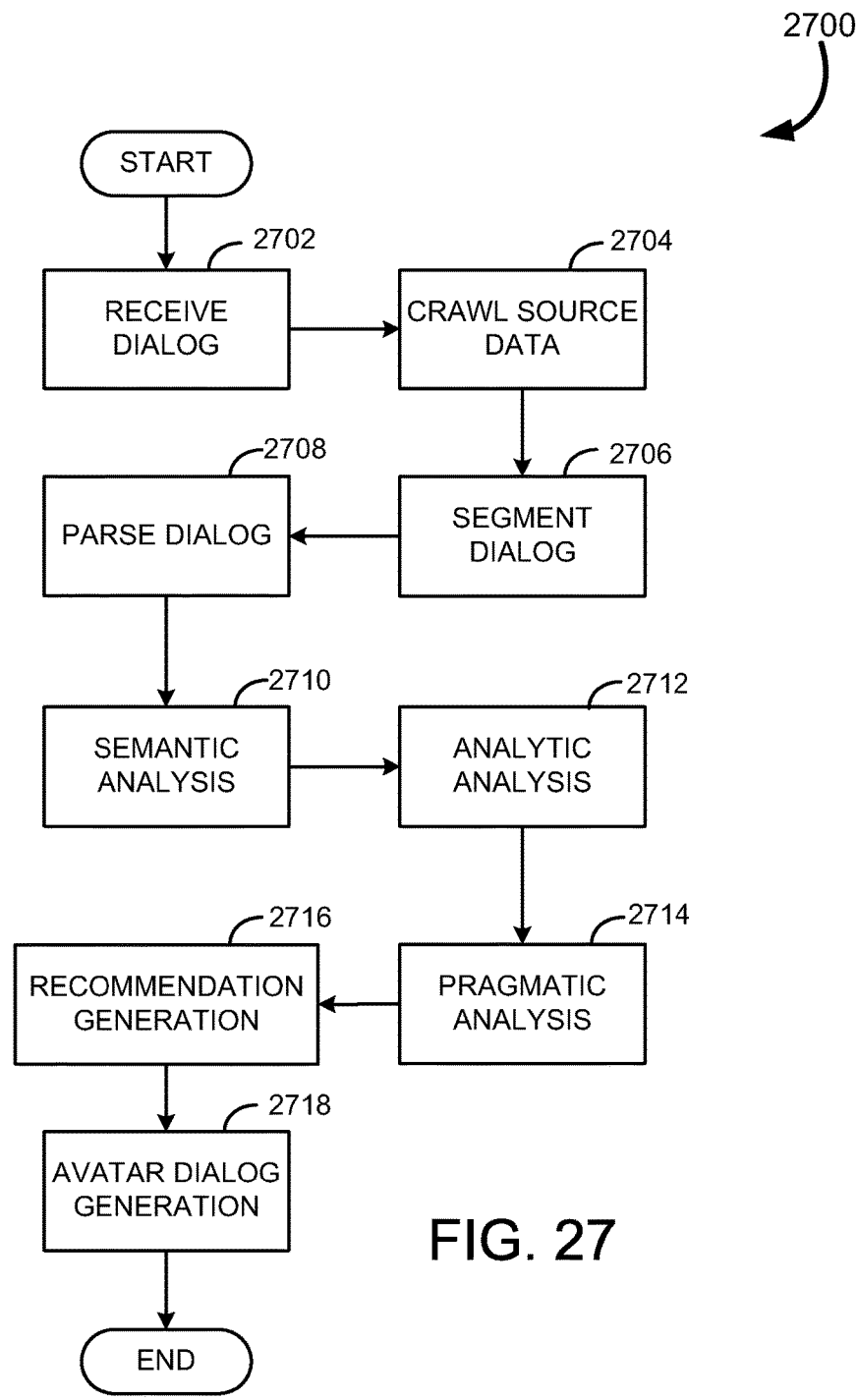
FIG. 27 shows a flow chart illustrating the process for driving the autonomous avatar in accordance with some embodiments of the present invention.

FIG. 27 shows a flow chart illustrating the process for driving the Autonomous Avatar 1720, shown generally at 2700. The process begins from step 2702 where the dialog is received by Dialog Manager 1802. Typically a user, driving a personal avatar may interact with the Autonomous Avatar 1720, thereby generating the dialog. However, it is intended that any Language Source 103p may provide the dialog.

Then, at step 2604 the data source is crawled by the Source Crawler 1804. The process then proceeds to step 2706 where the received dialog is segmented by utilizing the Segmenter 1712. Then, at step 2608 the dialog is parsed by utilizing the Parser 1713. The process then proceeds to step 2710 where semantic analysis is performed by utilizing the Semantic Engine 1714. At 2712 analytic analysis is performed by utilizing the Analytics Engine 1715. Pragmatic analysis is then performed by utilizing the Pragmatics Analyzer 1716, at step 2714. The process then proceeds to step 2716 where recommendations are generated by utilizing the Recommender 1717. Lastly, at step 2718, dialog is generated for the Autonomous Avatar 1720 by utilizing the Response Generator 1718. The process then ends.

Figure 28:
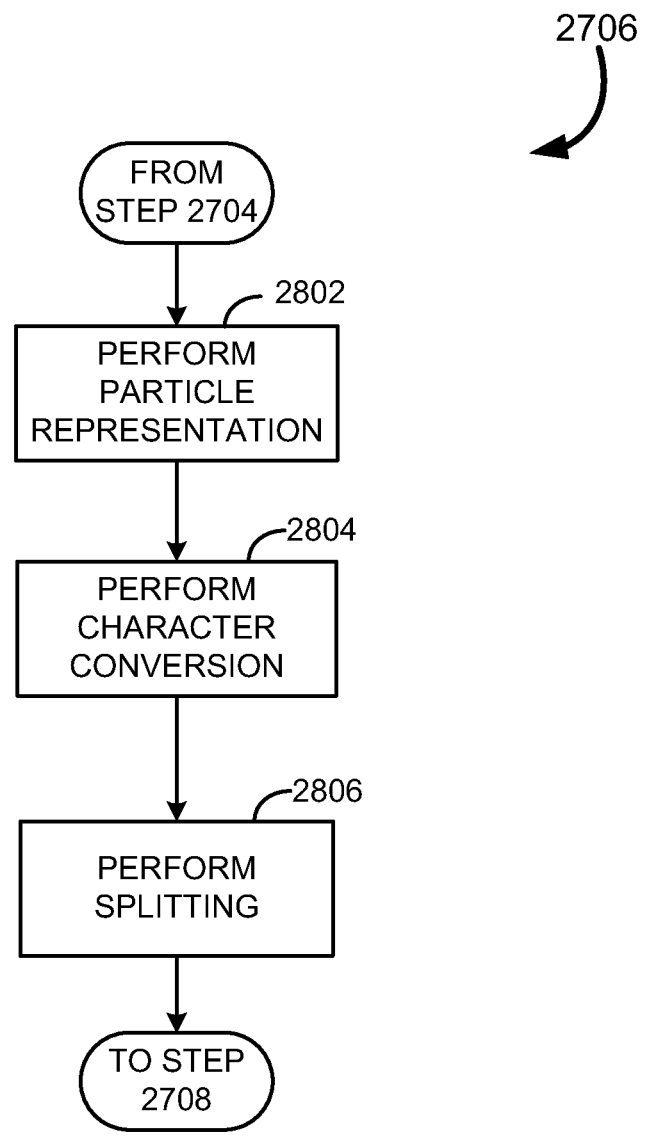
FIG. 28 shows a flow chart illustrating the process for dialog segmentation in accordance with some embodiments of the present invention.

FIG. 28 shows a flow chart illustrating the process for dialog segmentation, shown generally at 2706. The process begins from step 2704 of FIG. 27. The process then proceeds to step 2802 where particle representation is performed. Particle representation includes organizing the dialog into a data structure by utilizing the Particle Representor 1902.

The process then proceeds to step 2804 where character conversion is performed. Character conversion may utilize the Character Converter 1904. The process then proceeds to step 2806 where the dialog is split into individual sentences. The Splitter 1906 may be utilized for dialog splitting. The process then concludes by proceeding to step 2708 of FIG. 27.

Figure 29:
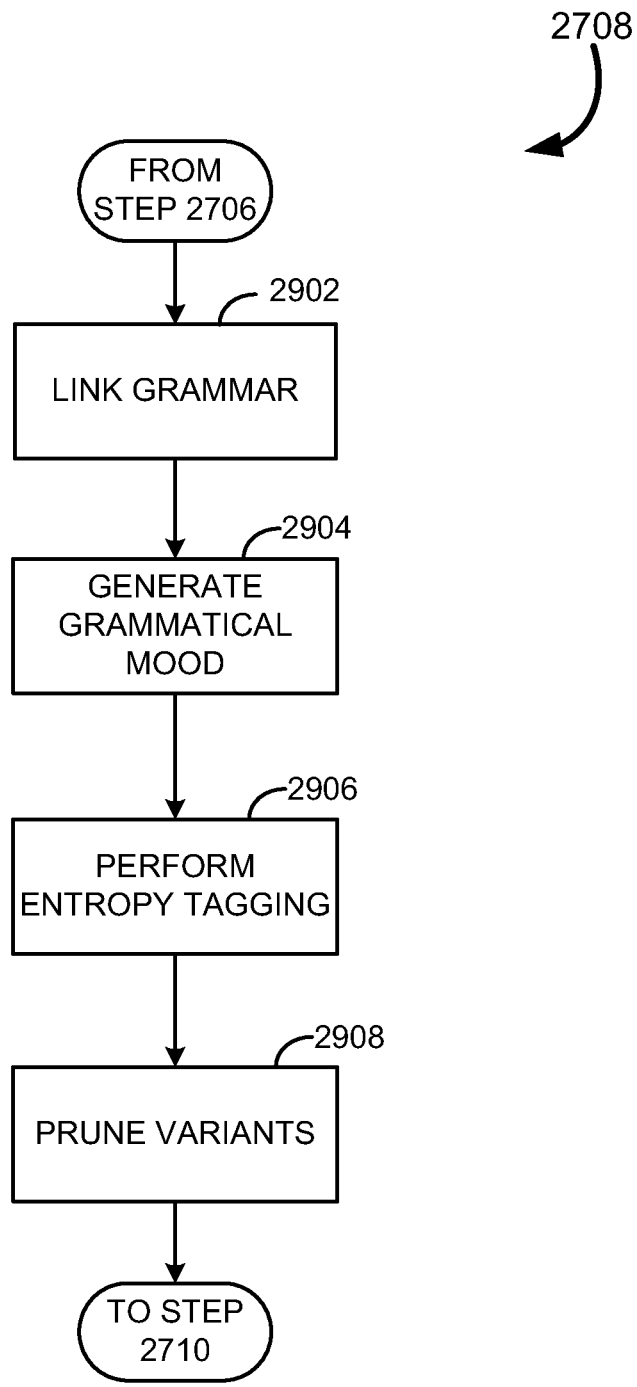
FIG. 29 shows a flow chart illustrating the process for dialog parsing in accordance with some embodiments of the present invention.

FIG. 29 shows a flow chart illustrating the process for dialog parsing, shown generally at 2708. The process begins from step 2706 of FIG. 27. The process then proceeds to step 2902 where grammar is linked. As previously discussed, grammar linking of particular word groups, such as "have" and "being" may be particularly useful for providing precision of the dialog when converted to computer language. Grammatical linking may utilize the Grammar Linker 2002.

Then at step 2904 grammatical mood is determined by utilizing the Grammatical Mood Analyzer 2004. The process then proceeds to step 2906 where tagging of the dialog is performed. As previously mentioned, tagging of the dialog provides an abundance of information as to the sentence structure, and ultimately to the meaning of the dialog. Tagging may be performed by the Tagger 2006. Lastly, at step 2908 variants are pruned by utilizing the Variant Pruner 2008. Variant pruning may utilize Bayesian statistics or other statistical methodologies. The process then concludes by proceeding to step 2710 of FIG. 27.

Figure 30:
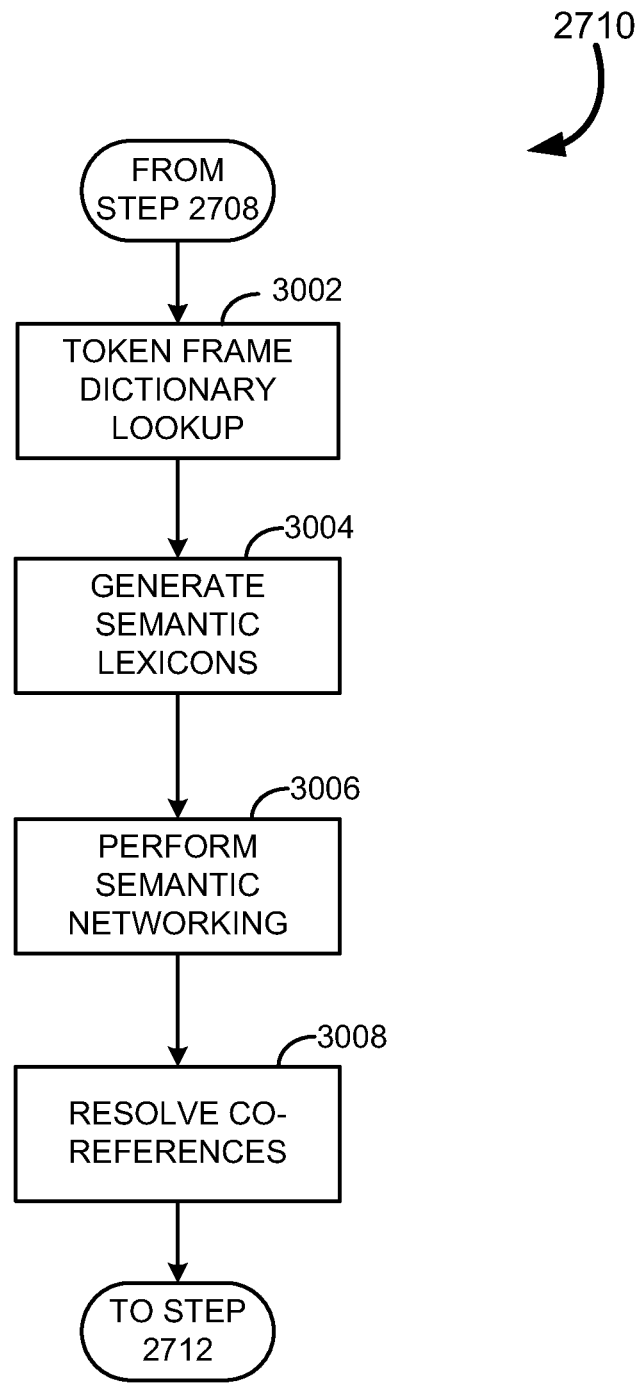
FIG. 30 shows a flow chart illustrating the process for semantic analysis in accordance with some embodiments of the present invention.

FIG. 30 shows a flow chart illustrating the process for semantic analysis, shown generally at 2710. The process begins from step 2708 of FIG. 27. The process then proceeds to step 3002 where the dialog is tokenized by utilizing a token frame dictionary lookup. The tokenization may utilize the Token Framer 2102.

The process then proceeds to step 3004 where semantic lexicons are generated by utilizing the Lemmatizer 2104. A detailed discussion of the generation of semantic lexicons is provided above in the discussion of natural language processing.

Then, at step 3006 semantic networking may be performed, by utilizing the Semantic Network Generator 2106. As previously noted, prototypical semantic networks may be pre-computed for access later by commonalities to the dialog, thereby reducing the processing demands on the Autonomous Avatar Driver 150.

The process then proceeds to step 3008 where co-references are resolved by utilizing the Co-reference Resolver 2108. Co-references may be resolved in three ways: pattern matching, context appropriateness, and verb reference to a subject. The process then concludes by proceeding to step 2712 of FIG. 27.

Figure 31:
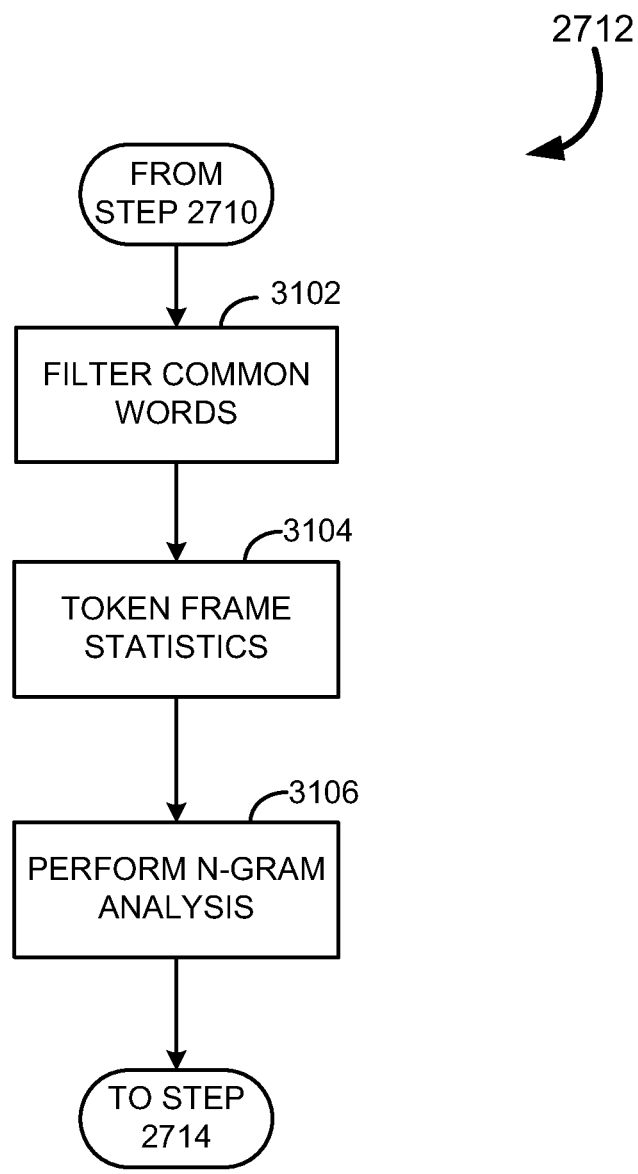
FIG. 31 shows a flow chart illustrating the process for analytic analysis in accordance with some embodiments of the present invention.

FIG. 31 shows a flow chart illustrating the process for analytic analysis, shown generally at 2712. The process begins from step 2710 of FIG. 27. The process then proceeds to step 3102 where common words are filtered for by utilizing the Common Word Filter 2202. Common words may include such regularly used words as "the" and "a". The process then proceeds to step 3104 where token frame statistics are performed by utilizing the Token Frame Statistics Analyzer 2204. Token frame statistics may include counting lemmatized words and nodal analysis. However, additional statistical inquiries may be preformed as is desired for Autonomous Avatar Driver 150 functionality.

The process then proceeds to step 3106 where the N-gram analysis is performed by utilizing the N-gram Analyzer 2206. As previously noted, the N-gram analysis includes sliding a window of N words along the dialog to generate statistics on word popularity. The number of N words may vary dependent upon language of the dialog. The process then concludes by proceeding to step 2714 of FIG. 27.

Figure 32:
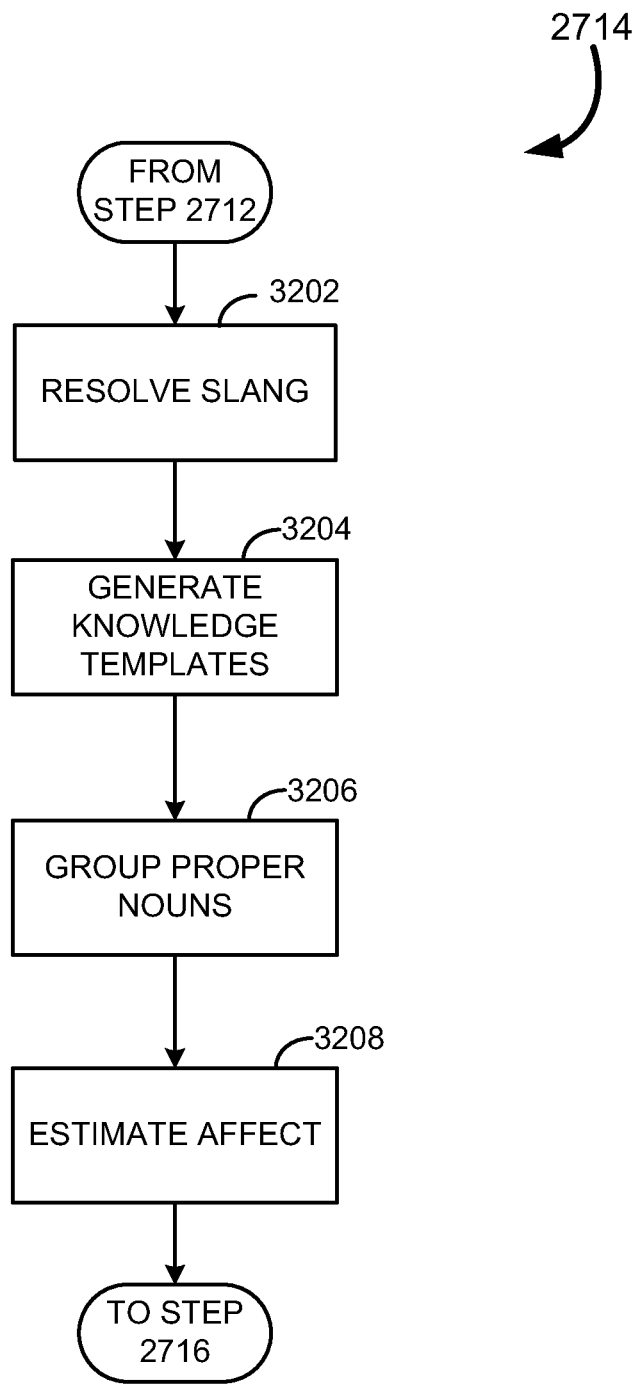
FIG. 32 shows a flow chart illustrating the process for pragmatic analysis in accordance with some embodiments of the present invention.

FIG. 32 shows a flow chart illustrating the process for pragmatic analysis, shown generally at 2714. The process begins from step 2712 of FIG. 27. The process then proceeds to step 3202 where slang is resolved by utilizing the Slang Resolver 2302. Then, at step 3204 knowledge may be represented using knowledge templates. The Knowledge Template Resolver 2304 may be utilized to generate the knowledge templates. The process then proceeds to step 3206 where proper nouns may be grouped by utilizing the Proper Noun Grouper 2306. Lastly, at step 3208 affect may be estimated using a combination of grammatical mood analysis and contextual referencing. Affect estimation may utilize the Affect Estimator 2308. The process then concludes by proceeding to step 2716 of FIG. 27.

Figure 33:
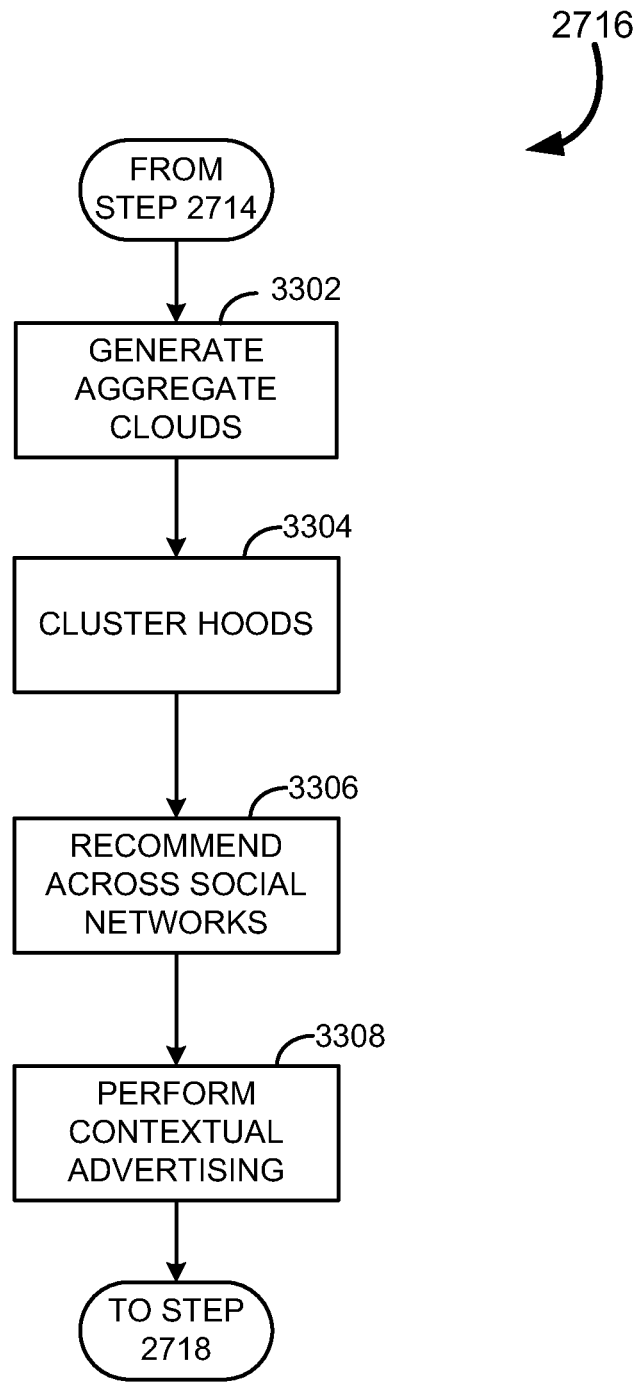
FIG. 33 shows a flow chart illustrating the process for recommendation generation in accordance with some embodiments of the present invention.

FIG. 33 shows a flow chart illustrating the process for recommendation generation, shown generally at 2716. The process begins from step 2714 of FIG. 27. The process then proceeds to step 3302 where tag clouds are aggregated by utilizing the Cloud Aggregator 2402. Then, at step 3304, individuals may be clustered into "neighborhoods" by related interest or compatibility. Additional clustering criteria may also be utilized, such as abilities, political ideologies or diversity. Clustering may utilize the Hood Clusteror 2404.

The process then proceeds to step 3306 where individuals may be recommended to one another across a social network by utilizing the Social Network Recommender 2406. Lastly, at step 3308, contextual advertising may be recommended by utilizing the Contextual Advertising Generator 2408. The process then concludes by proceeding to step 2718 of FIG. 27.

Figure 34:
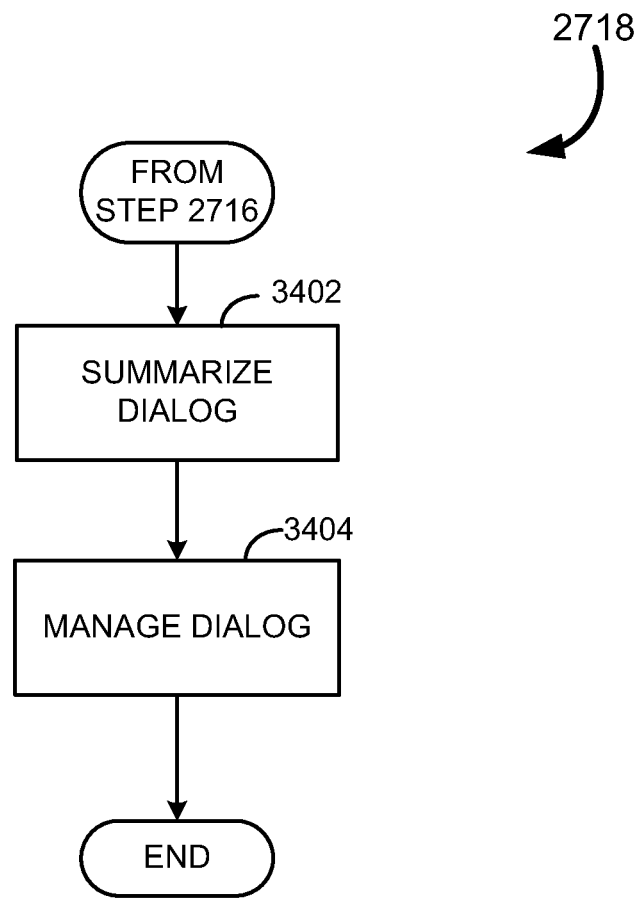
FIG. 34 shows a flow chart illustrating the process for avatar dialog generation in accordance with some embodiments of the present invention.

FIG. 34 shows a flow chart illustrating the process for avatar dialog generation, shown generally at 2718. The process begins from step 2716 of FIG. 27. The process then proceeds to step 3402 where dialog is summarized by utilizing the Summarizer 2502. This dialog may then be managed at step 3404 by utilizing the Dialog Manager 2504. The process then ends.

In sum, the present invention provides an Autonomous Avatar Driver System 100 that provides for advanced dialog management that is highly contextual, and which provides highly relevant recommendation based upon conversation dialog. Such autonomous avatar drivers are useful for driving believable avatars in conjunction with massively multiplayer Online Games, virtual social worlds, online web communities corporate web sites, health care and educational programs and websites. Autonomous avatar driver systems may be entirely software, entirely hardware, or a combination of software and hardware. The advantages of such an efficient system include enhancing the believability of avatars, having knowledge representation from vast data sources, improved searching which utilizes semantics, improved tag clouds, improved corporate relations, advanced recommendation abilities and positive repercussions for the healthcare and education industries.

While this invention has been described in terms of several preferred embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A computer implemented method for driving a graphical autonomous avatar, comprising:
    receiving, by a processor, an electronic communication including dialogue of at least one language source;
    generating, by the processor, a parsed data structure for the dialog, wherein the parsed data structure includes segmented portions derived from discrete logical subsections of the dialogue and parsed portions derived from linking a grammatical mood identified in the dialog;
    generating, by the processor, a pragmatics report based on a pragmatics analysis of the parsed data structure;
    generating, by the processor, automated responses for the autonomous avatar based on the pragmatics report and a unique personality of the graphical autonomous avatar, the unique personality delineated by an intellectual attribute and an emotional attribute,
        wherein the intellectual attribute includes a backstory, a history, and a memory, and
        wherein the emotional attribute includes a prescribed emotional disposition and at least one reaction and/or response procedure; and
    wherein the processor utilizes a translation matrix to analyze, mine, and generate responses based on the electronic communication corresponding to any of a variety of languages.

2. The computer implemented method, as recited in claim 1, further comprising executing on the processor the step of receiving external data from at least one data source; and wherein the generating responses for the autonomous avatar also includes incorporating the external data.

3. The computer implemented method, as recited in claim 1, further comprising segmenting the dialog by at least one of performing particle representation, converting characters and splitting dialog.

4. The computer implemented method, as recited in claim 1, further comprising parsing the segmented dialog by at least one of linking grammar, generating grammatical mood, tagging the dialog and pruning variants.

5. The computer implemented method, as recited in claim 1, further comprising analyzing the parsed dialog for semantics by at least one of lookup of token frame, generation of semantic lexicons, generation of semantic networks and resolving co-reference ambiguity.

6. The computer implemented method, as recited in claim 1, further comprising analyzing the semantically analyzed dialog for analytics by at least one of filtering for common words, generating token frame statistics and analyzing N-grams for word popularity; and wherein the generating token frame statistics includes at least one of counting lemmatized words, and nodal analysis.

7. The computer implemented method, as recited in claim 1, wherein generating the pragmatics report includes at least one of resolving slang, generating knowledge templates, grouping proper nouns and estimating affect.

8. The computer implemented method, as recited in claim 1, wherein generating responses for the autonomous avatar based on the pragmatics report includes at least one of generating aggregate tag clouds, clustering the language sources into neighborhoods, recommending social networking, and generating contextual advertising.

9. The computer implemented method of claim 1, further comprising:
a physical attribute including any of strength data and appearance data.

10. The computer implemented method of claim 1, wherein the history includes a tag cloud of conversation history to facilitate conversational development.

11. An automated avatar driver system, comprising:
at least one processor;
a memory hardware module coupled to the at least one processor;
a sourcer hardware module configured to receive dialog from the language source;
a segmentor hardware module configured to segment the dialog of the at least one language source, wherein the segmented portions are derived from discrete logical subsection of the dialogue;
a parser configured to generate a parsed data structure for the segmented dialog, wherein the parsed data structure includes parsed portions derived from linking a grammatical mood identified in the dialog;
a semantic engine hardware module configured to analyze the parsed dialog for semantics;
a translation matrix hardware module configured to receive the analyzed parsed semantic for translating a semantic meaning of the received electronic communication into another language;
an analytics engine hardware module configured to analyze the semantically analyzed dialog for analytics;
a pragmatics analyzer hardware module configured to analyze the analytically analyzed dialog for pragmatics;
a recommender hardware module configured to generate recommendations from the pragmatically analyzed dialog; and
a response generator hardware module configured to generate automated responses for the autonomous avatar based on the pragmatically analyzed dialog and a unique personality of the graphical autonomous avatar, the unique personality including an intellectual attribute and an emotional attribute,
wherein the intellectual attribute includes a backstory, a history, and a memory, and
wherein the emotional attribute includes a prescribed emotional disposition and at least one reaction and/or response procedure.

12. The automated avatar driver system of claim 11, wherein the sourcer module is further configured to receive external data from at least one data source.

13. The automated avatar driver system of claim 11, wherein the segmentor hardware module includes at least one of a particle representor configured to perform particle representation, a character converter configured to convert characters and a splitter configured to split dialog.

14. The automated avatar driver system of claim 11, wherein the parser includes at least one of a linker configured to link grammar, a grammatical mood analyzer configured to generate grammatical mood, a tagger configured to tag the dialog and a variant pruner configured to prune variants of the dialog.

15. The automated avatar driver system of claim 11, wherein the semantics engine hardware module includes at least one of a token framer configured to lookup token frames, a lemmatizer configured to generate semantic lexicons, a semantic network generator configured to generate semantic networks and a co-reference resolver configured to resolve co-reference ambiguity.

16. The automated avatar driver system of claim 11, wherein the analytics engine hardware module includes at least one of a common word filter configured to filter dialog for common words, a token frame statistics engine, and an N-gram analyzer configured to analyze N-grams for word popularity.

17. The automated avatar driver system of claim 16, wherein the token frame statistics engine configured to count lemmatized words, and perform nodal analysis.

18. The automated avatar driver system of claim 11, wherein the pragmatics analyzer hardware module includes at least one of a slang resolver configured to resolve slang, a knowledge template resolver configured to generate knowledge templates, a proper noun grouper configured to group proper nouns and an affect estimator configured to estimate affect of the dialog.

19. The automated avatar driver system of claim 11, wherein the recommender hardware module includes at least one of a cloud aggregator configured to generate aggregate tag clouds, a hood cluster or configured to cluster the language sources into neighborhoods, a social network recommender configured to recommend social networking, and a contextual advertising generator configured to generate contextual advertising.

20. The automated avatar driver system of claim 11, wherein the translation matrix hardware module is located on a front end of translating the electronic communication when into the computer terminal.

21. The automated avatar driver system of claim 11, wherein the input into the translation matrix hardware module is the output from the semantic hardware module for translating the semantic meaning of the received electronic communication into another language.

22. A computer implemented method for driving a graphical autonomous avatar, comprising:
receiving, by a processor, an electronic communication including dialogue of a language;
generating, by the processor, a parsed data structure for the dialog, wherein the parsed data structure includes segmented portions derived from discrete logical subsections of the dialogue and parsed portions derived from linking a grammatical mood identified in the dialog;

analyzing, by the processor, the parsed data structure by resolving pragmatic issues to identify a semantic meaning among the discrete logical subsections;

identifying, by the processor, a unique personality of the graphical autonomous avatar, the unique personality including an intellectual attribute and an emotional attribute, wherein the intellectual attribute includes a backstory, a history, and a memory, and wherein the emotional attribute includes a prescribed emotional disposition and at least one reaction and/or response procedure; and generating, by the processor, responses for the autonomous avatar based on the identified semantic meaning and the identified unique personality of the graphical autonomous avatar.

* * * * *